United States Patent

Yamamoto et al.

Patent Number: 5,898,720
Date of Patent: Apr. 27, 1999

[54] OPTICAL ELEMENT

[75] Inventors: Kazushige Yamamoto; Kouichi Ichimura; Nobuhiro Gemma, all of Yokohama, Japan

[73] Assignee: Kabushiki Kaisha Toshiba, Kawasaki, Japan

[21] Appl. No.: 08/694,246

[22] Filed: Aug. 8, 1996

[30] Foreign Application Priority Data

| Aug. 9, 1995 | [JP] | Japan | 7-203229 |
| Sep. 14, 1995 | [JP] | Japan | 7-236643 |
| Mar. 15, 1996 | [JP] | Japan | 8-059792 |

[51] Int. Cl.$^6$ .................................................. H01S 3/14
[52] U.S. Cl. ............................................ 372/39; 359/244
[58] Field of Search ........................ 359/244; 372/35–42

[56] References Cited

U.S. PATENT DOCUMENTS

| 3,729,690 | 4/1973 | Snitzer | 372/40 |
| 4,015,217 | 3/1977 | Snitzer | 372/40 |
| 4,044,315 | 8/1977 | Snitzer | 372/40 |
| 5,256,849 | 10/1993 | Scully | 219/121.68 |
| 5,337,401 | 8/1994 | Onishi et al. | 372/92 |

OTHER PUBLICATIONS

Changjiang Wei, et al., "Experimental Investigations of Absorption and Dispersion Profiles of a Strongly Driven Transition: V–Shaped Three–Level System With a Strong Probe", Physical Review A, vol. 51, No. 2, Feb. 1995, pp. 1438–1445.

Yifu Zhu, et al., "Intensity Characteristics of Inversionless Lasers from Induced Atomic Coherence", Physical Review A, vol. 49, No. 5, May 1994, pp. 4016–4023.

A. Imamoglu, et al., "Semiconductor Lasers Without Population Inversion", Optics Letters, vol. 19, No. 21, Nov. 1, 1994, pp. 1744–1746.

K.–J. Boller, et al., "Observation Of Electromagnetically Induced Transparency", Physical Review Letters, vol. 66, No. 20, May 20, 1991, pp. 2593–2596.

*Primary Examiner*—Hung Xuan Dang
*Assistant Examiner*—Dawn-Marie Bey
*Attorney, Agent, or Firm*—Oblon, Spivak, McClelland, Maier & Neustadt, P.C.

[57] ABSTRACT

An optical element and a method capable of electromagnetically inducing transparency in a solid. The optical element includes a solid having a number N of sites characterized by at least three energy levels including a first level higher than a second and a third lower than the second, and an excitation device configured to irradiate the solid with a first light having a wavelength corresponding to the energy difference between the first and the second level, and a second light having a wavelength corresponding to the energy difference between the first and the third level. The solid satisfies $\sigma_{23} \leq \sigma_{12}$ and $\sigma_{23} \leq \sigma_{13}$ where $\sigma_{12}$, $\sigma_{13}$ and $\sigma_{23}$ are respectively the standard deviations of the energy differences between the first and second level, between the first and third level, and between the second and third level.

34 Claims, 40 Drawing Sheets

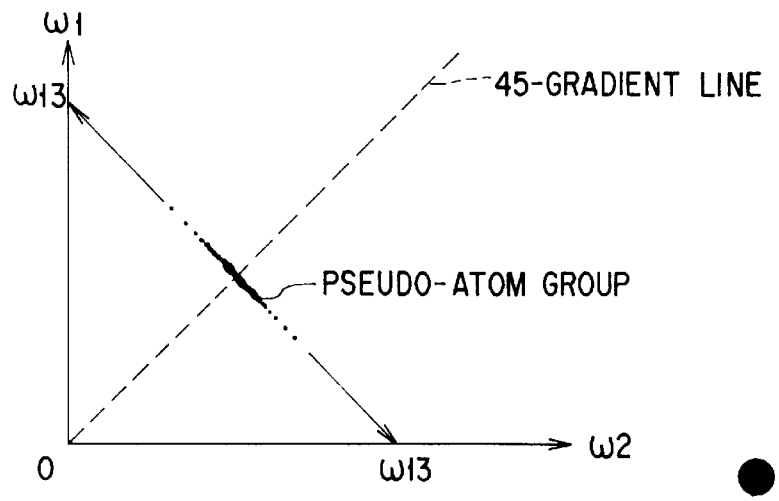
F I G. 8A
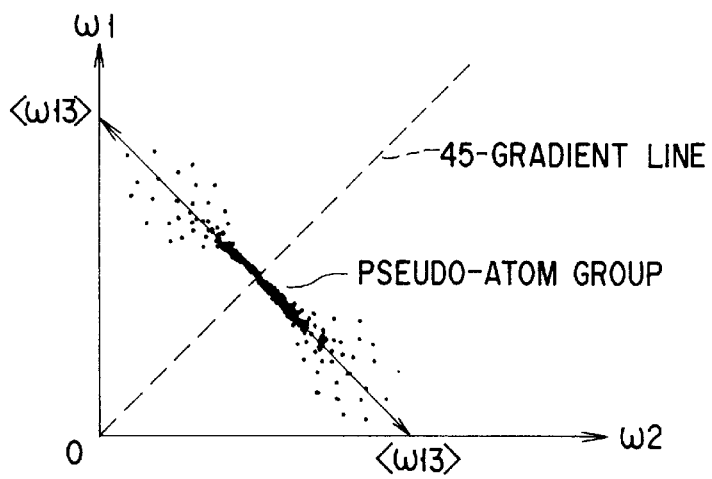
F I G. 8B
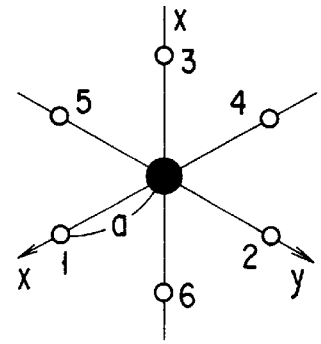
F I G. 9
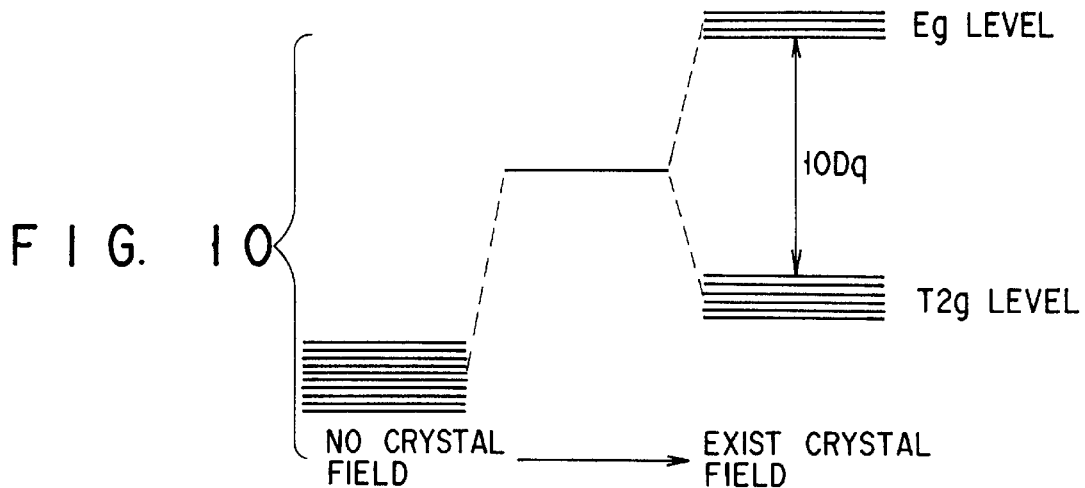
F I G. 10

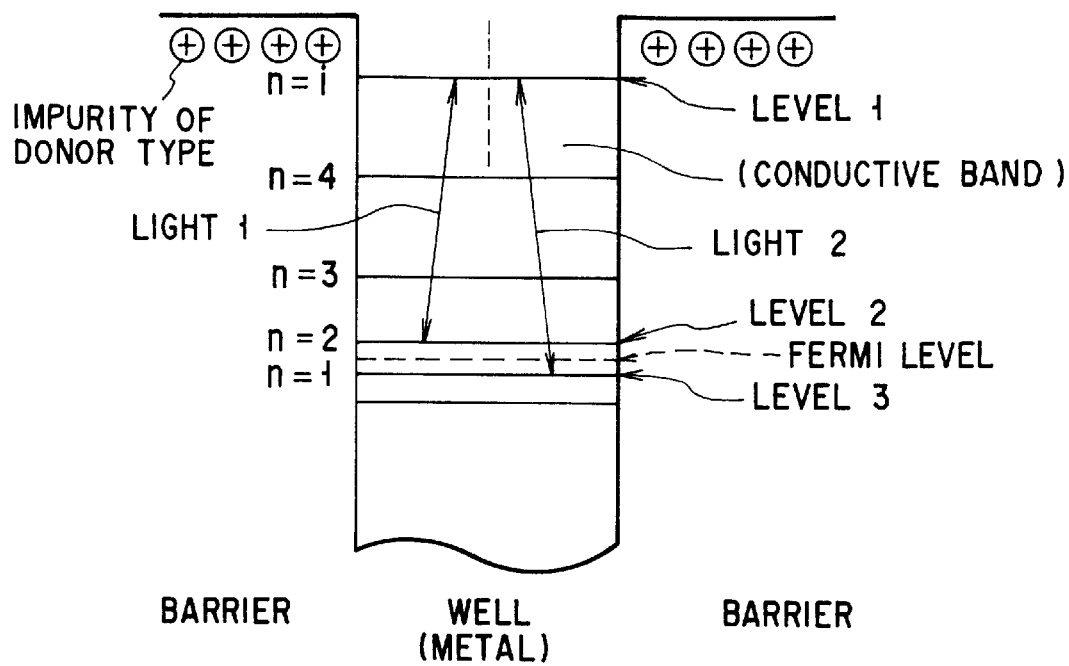
F I G. 16A
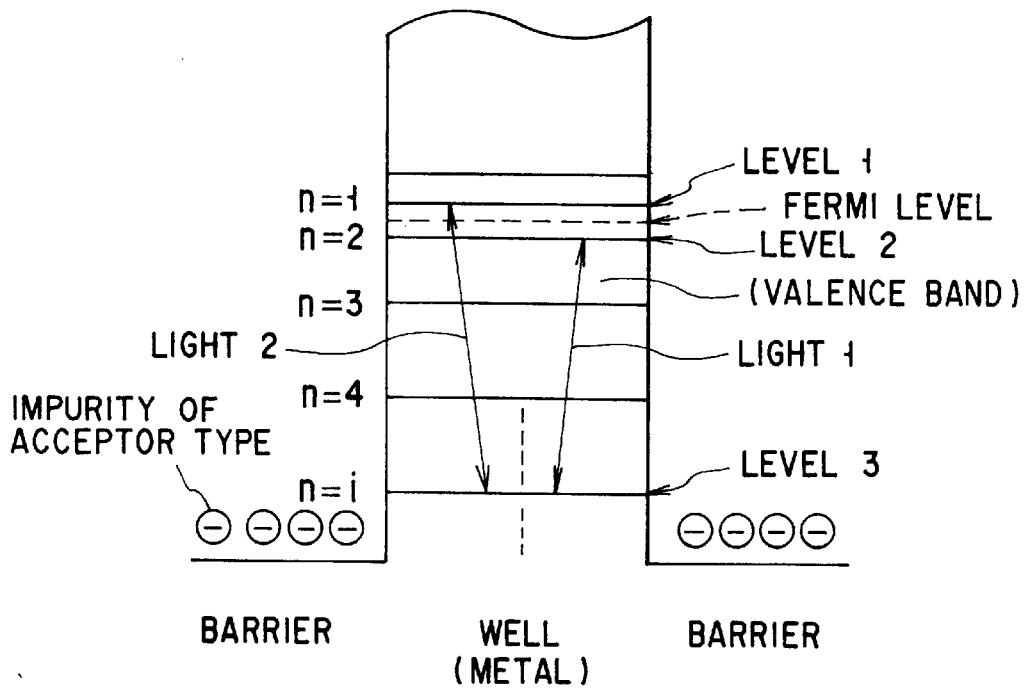
F I G. 16B

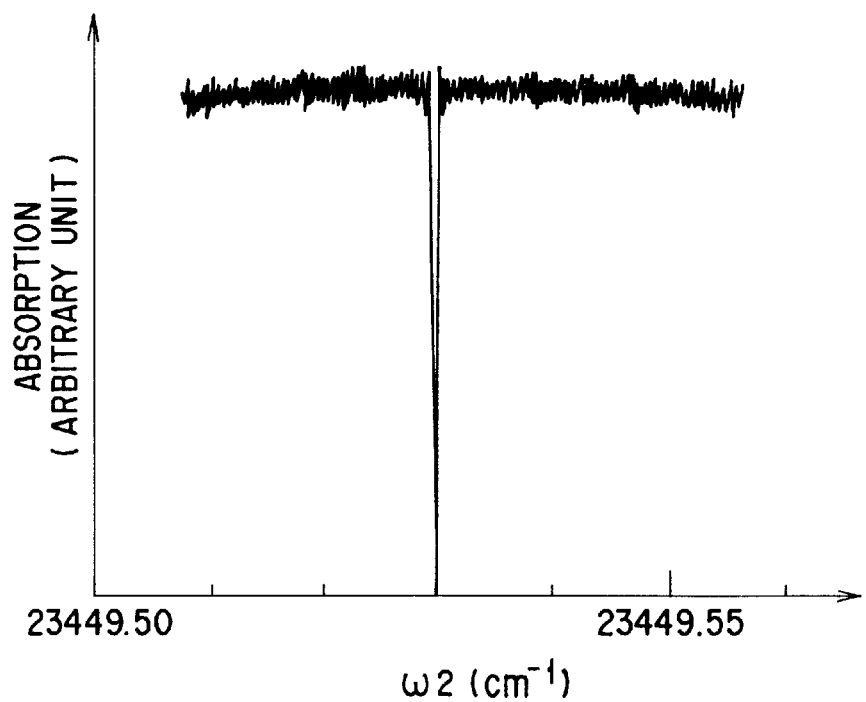
F I G. 22
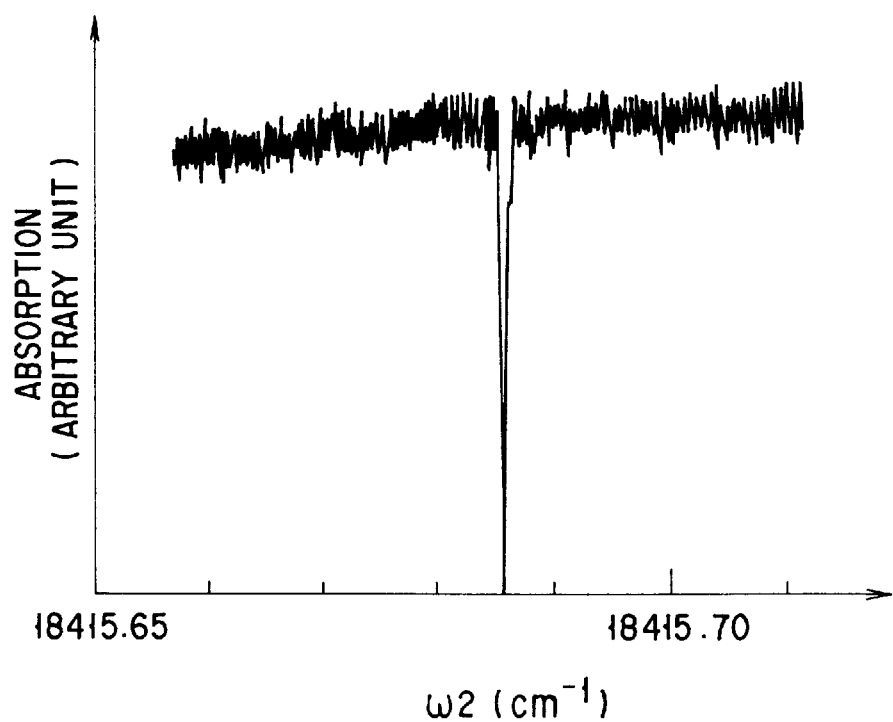
F I G. 24

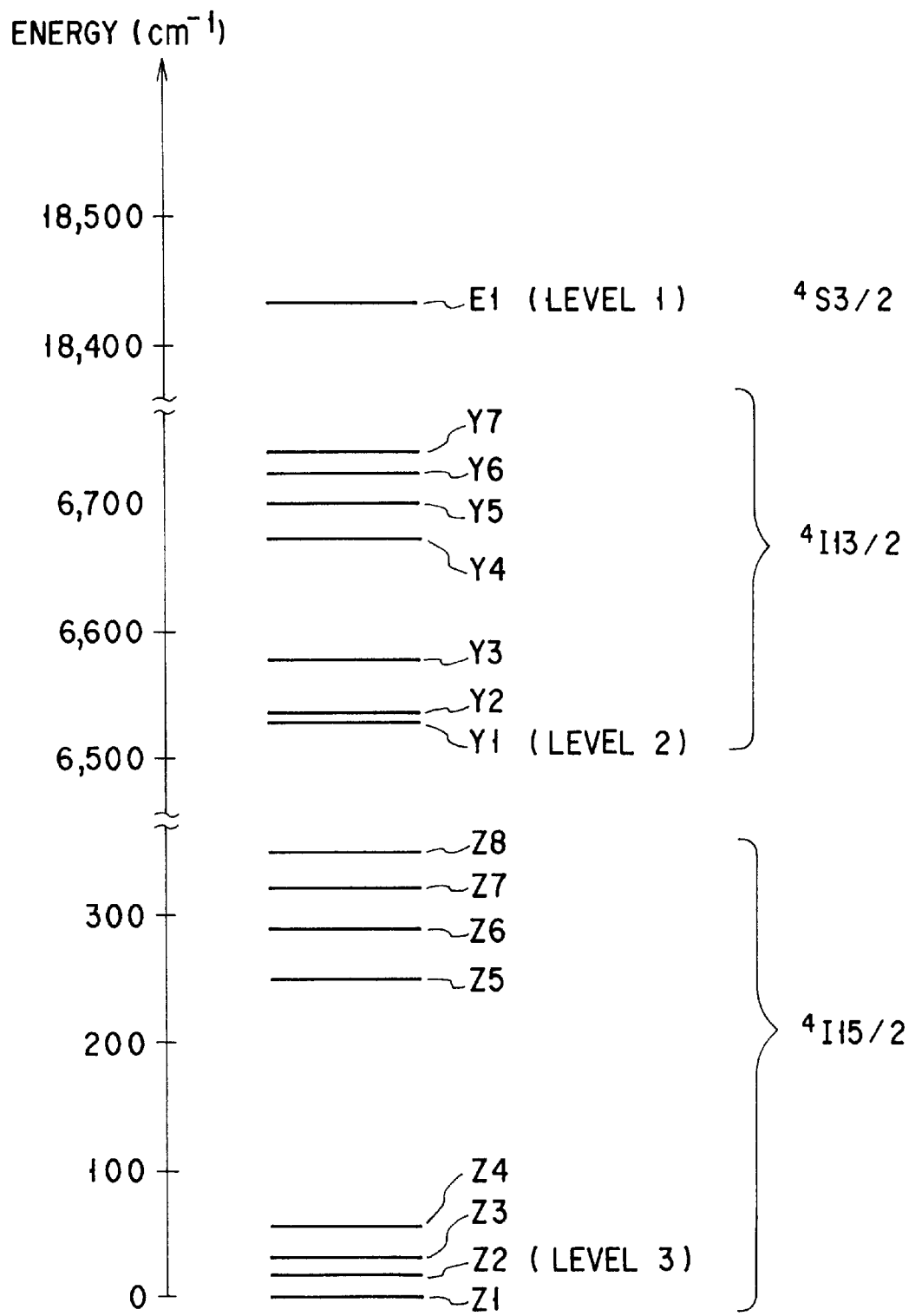
F I G. 23

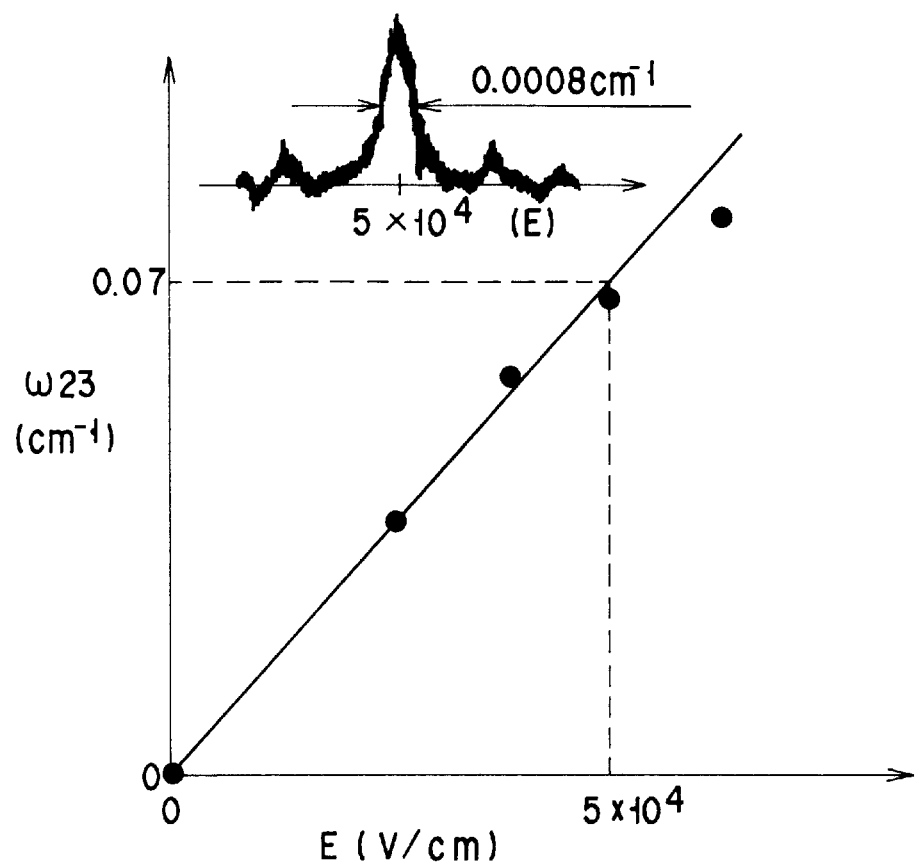
F I G. 32
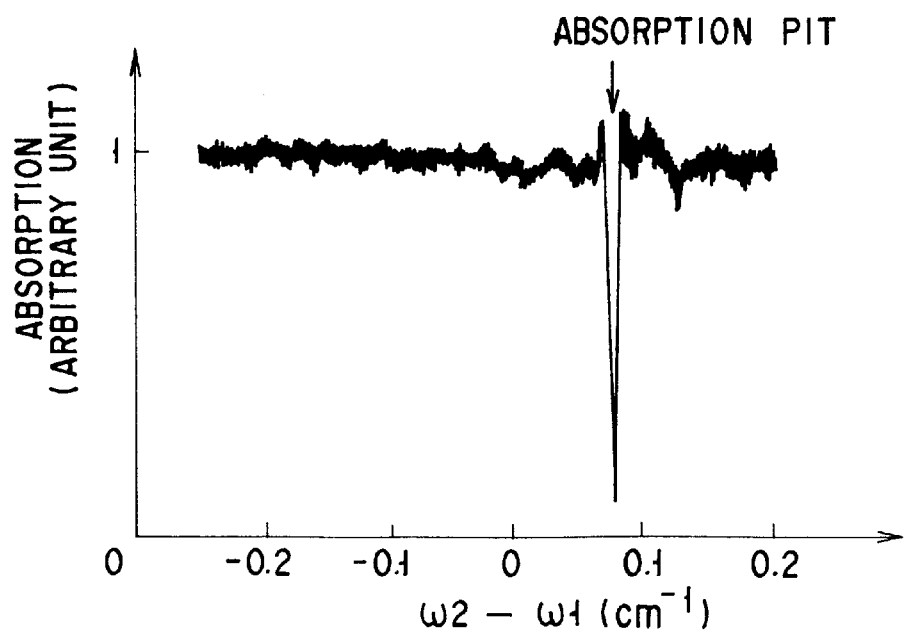
F I G. 33

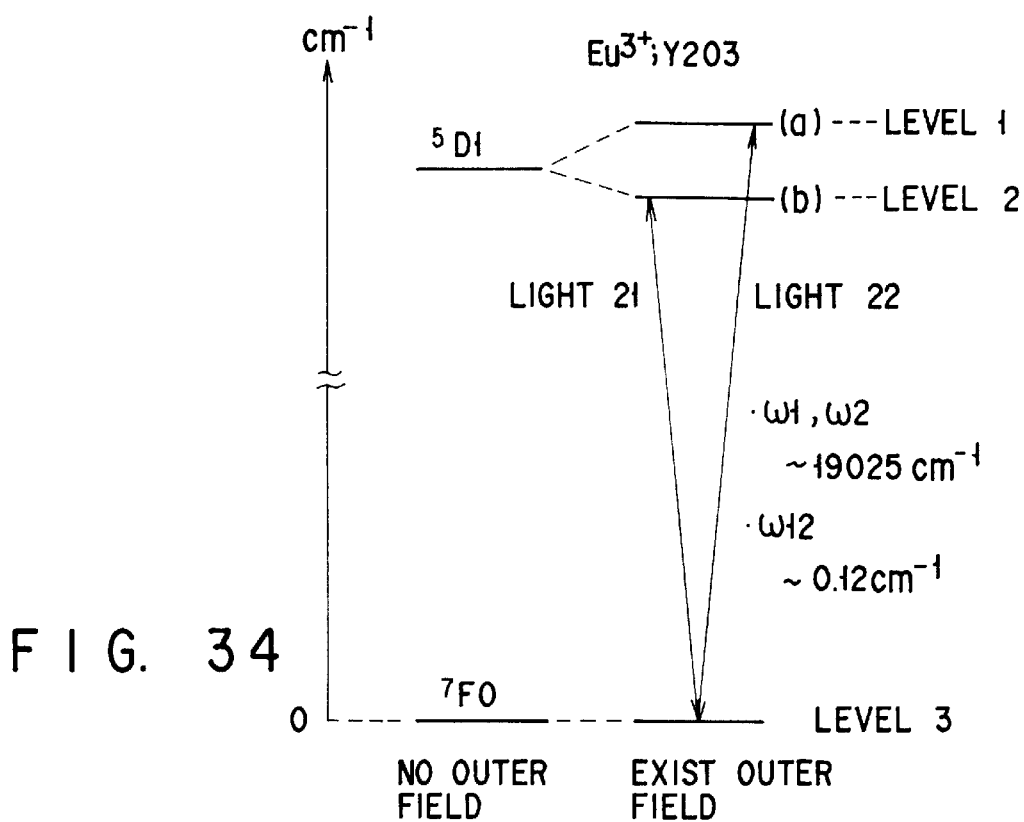
F I G. 34
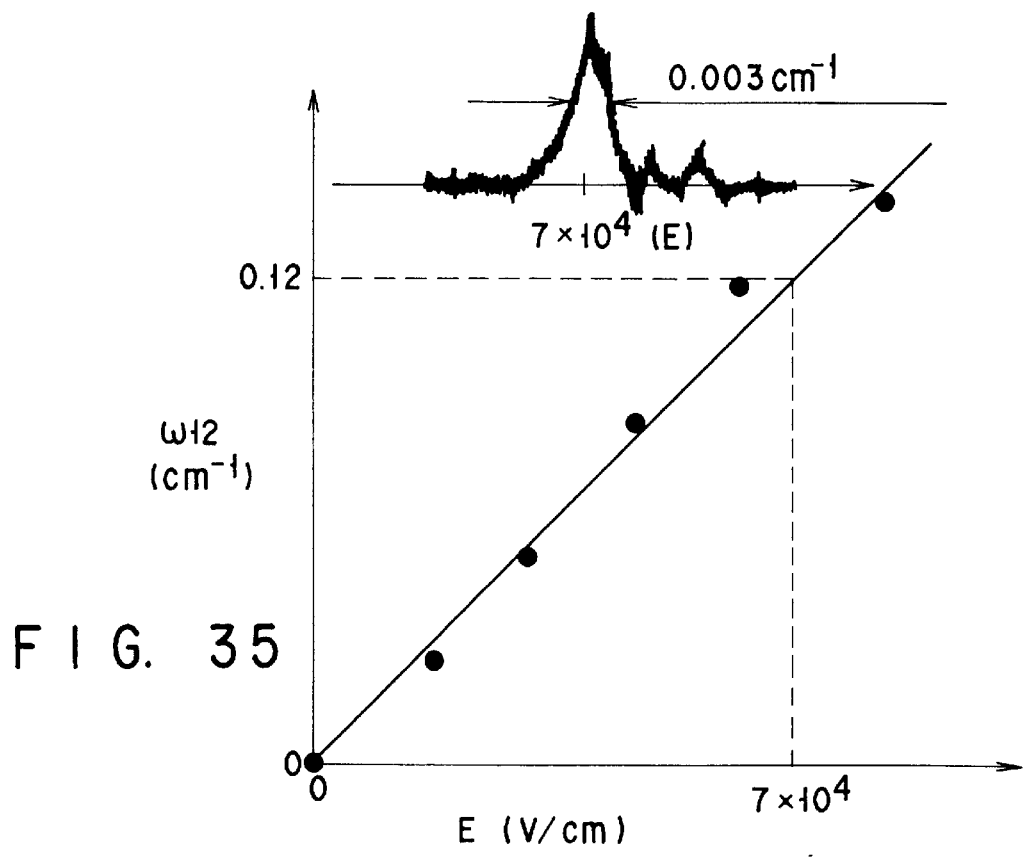
F I G. 35

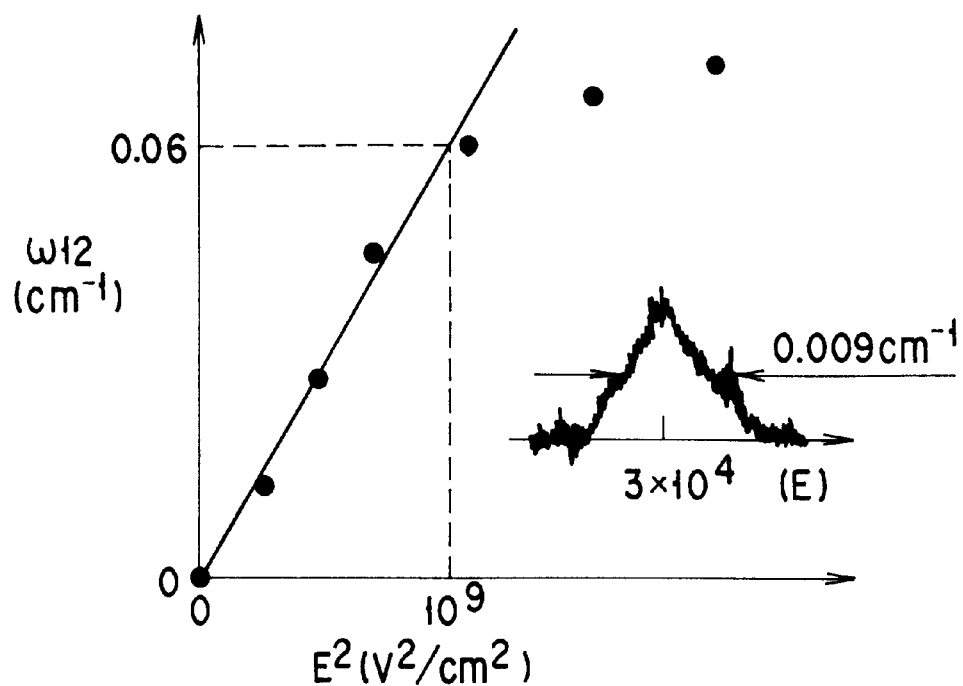
F I G. 38
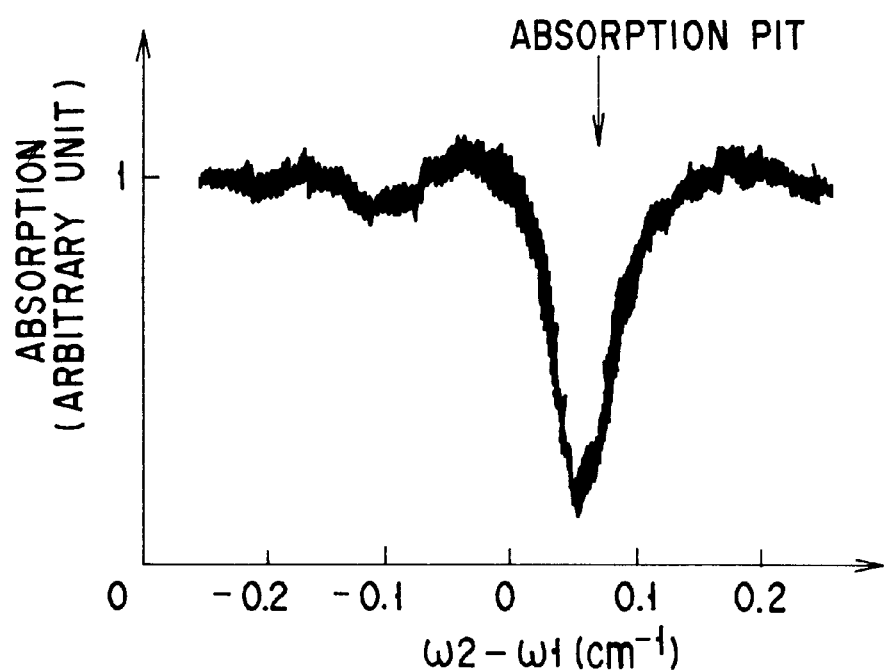
F I G. 39

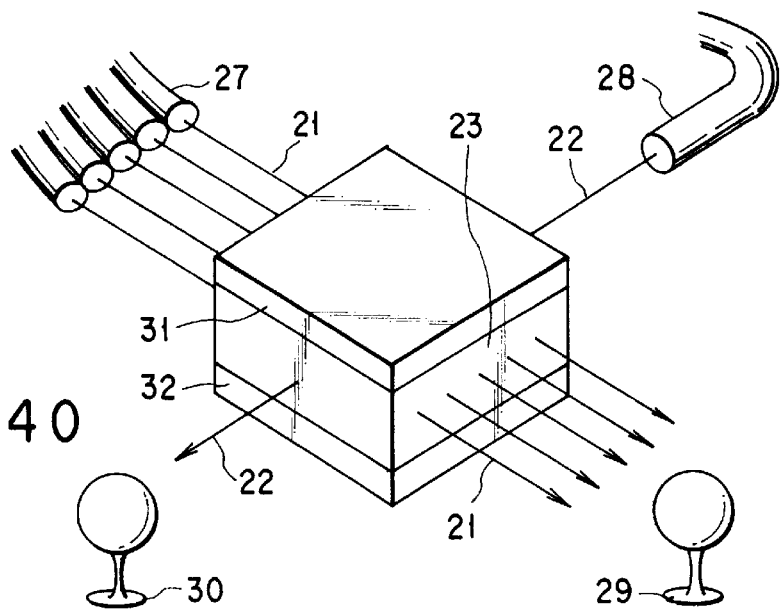
F I G. 40
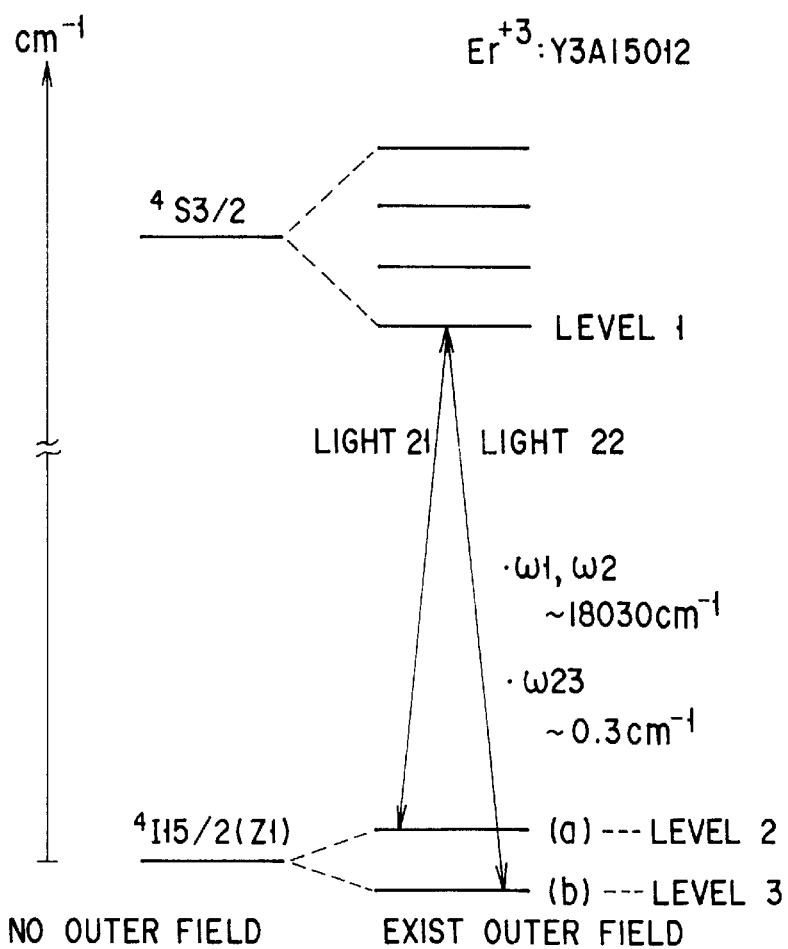
F I G. 41

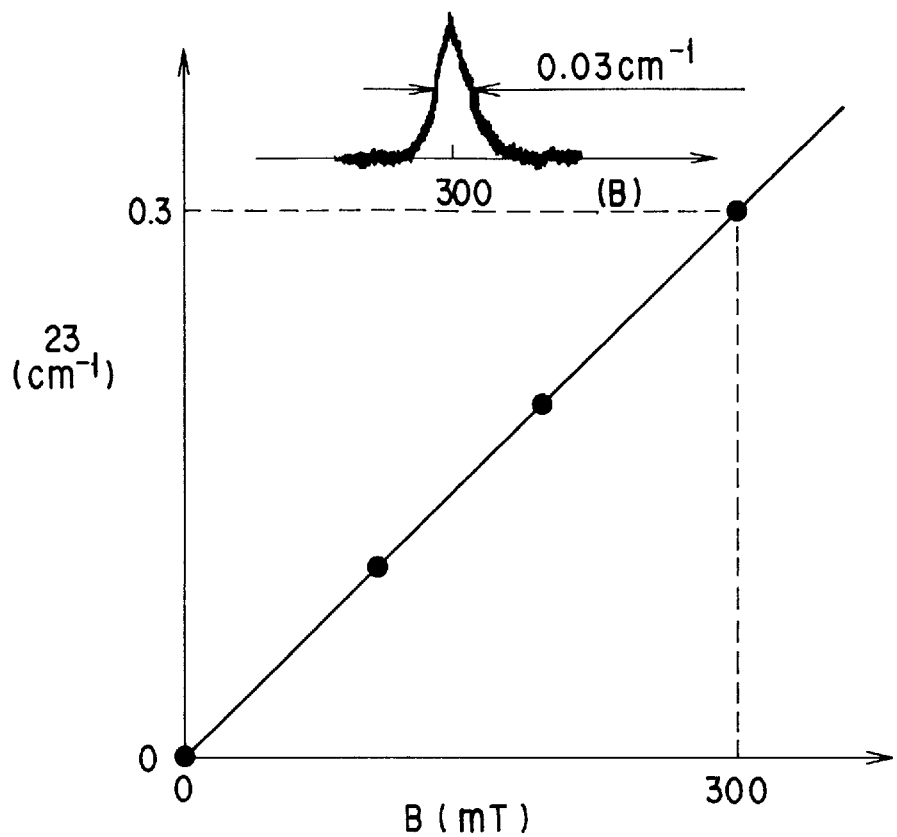
F I G. 42
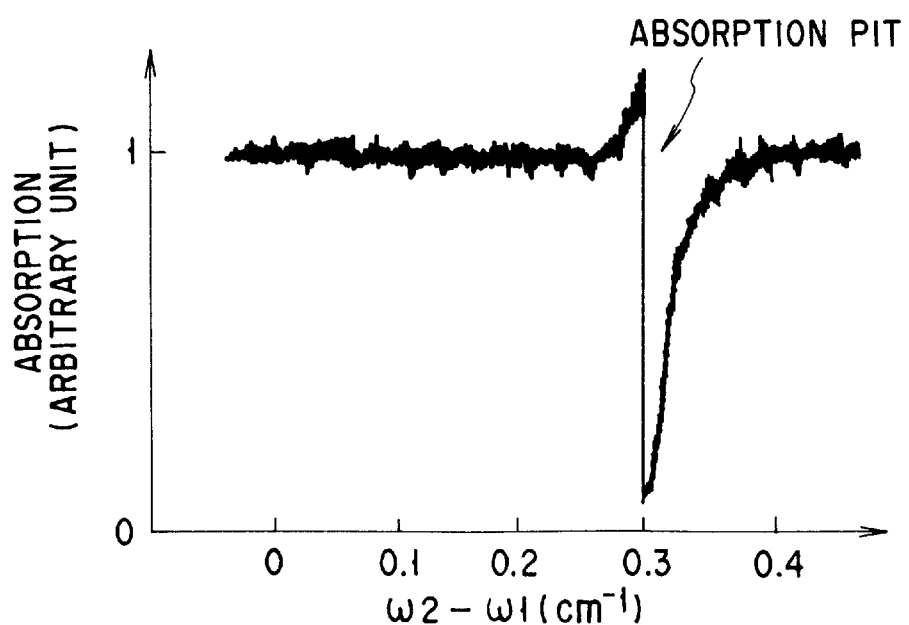
F I G. 43

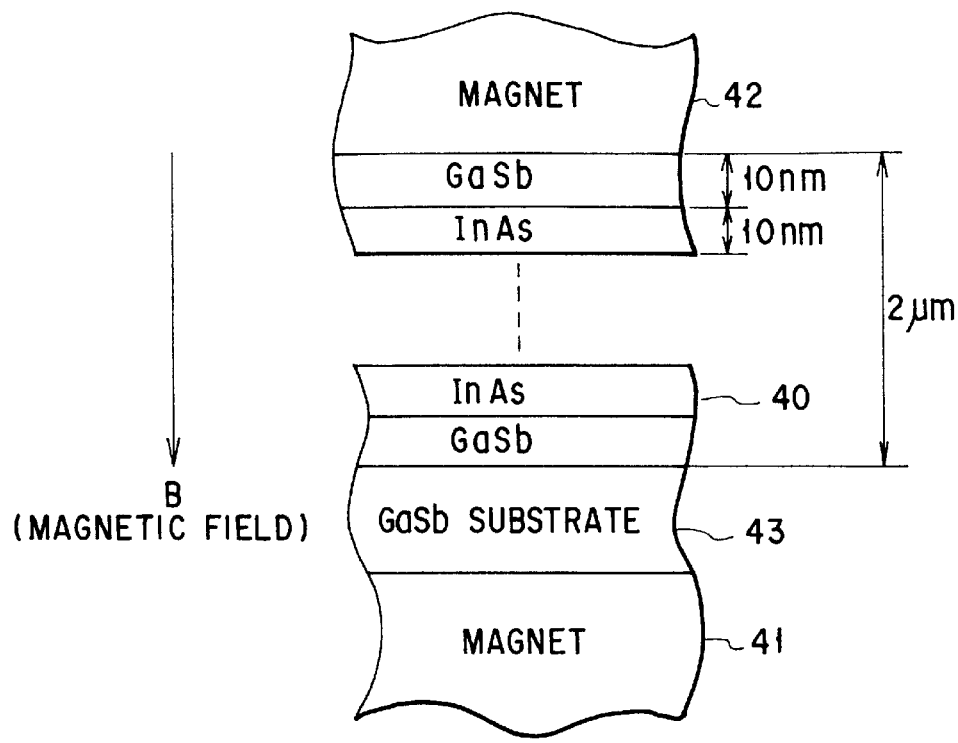
F I G. 44
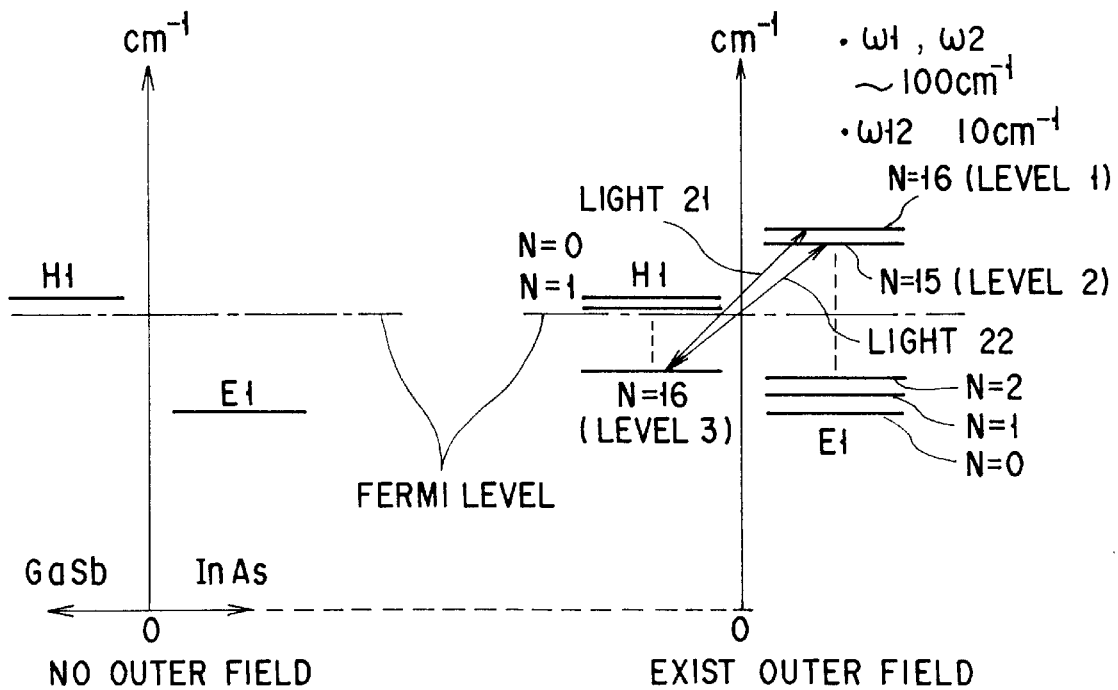
F I G. 45

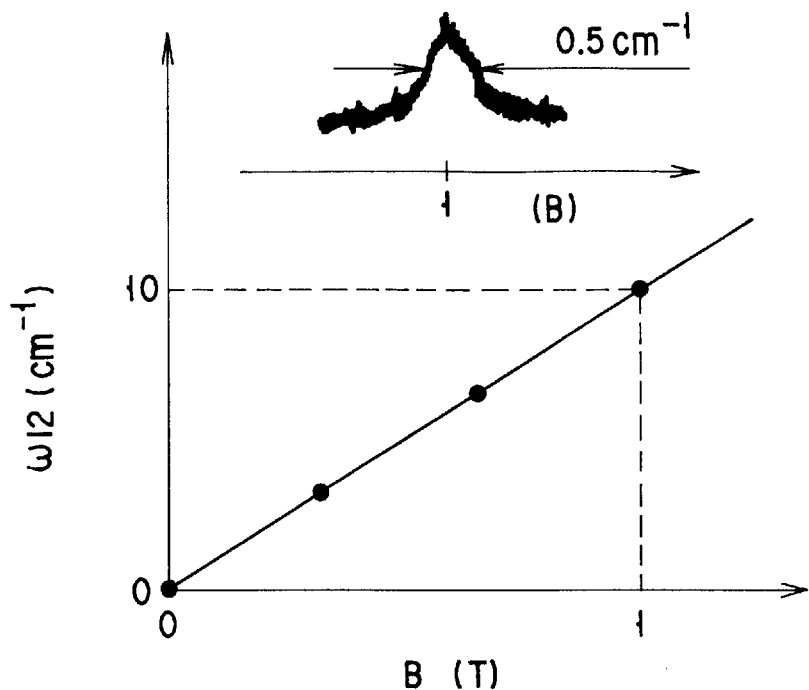
F I G 46
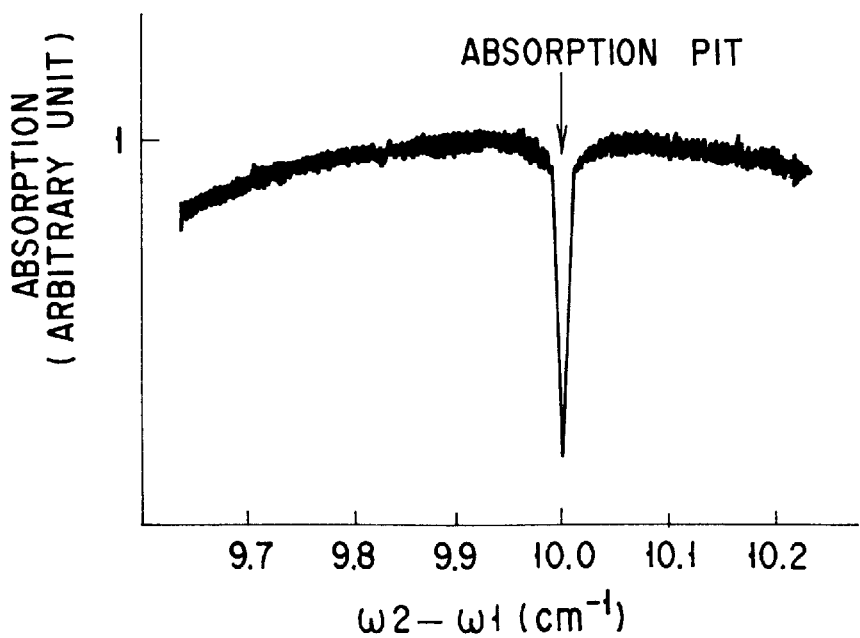
F I G. 47

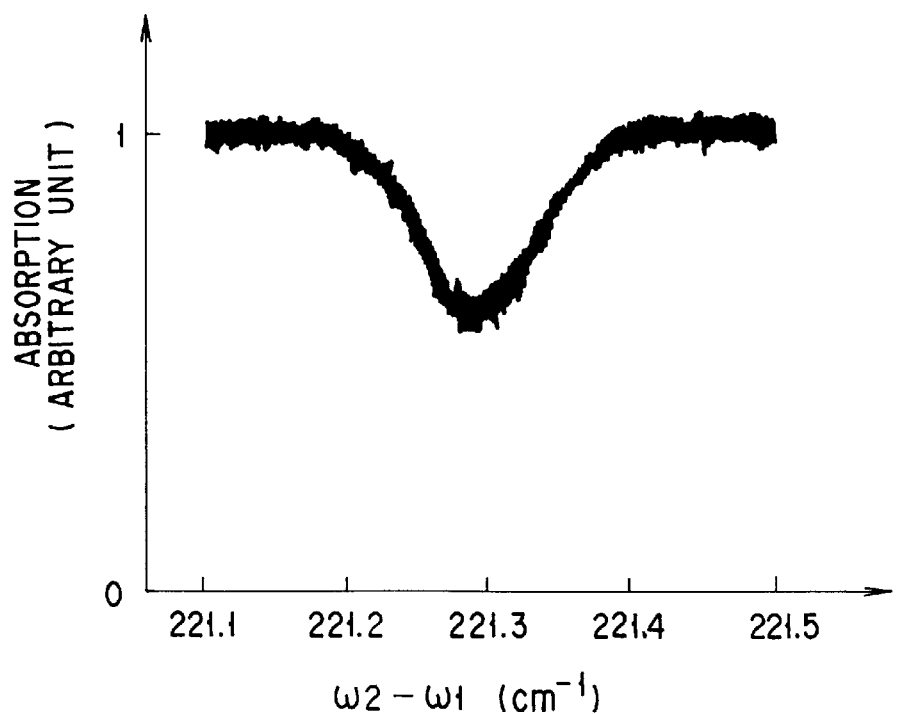
F I G. 52
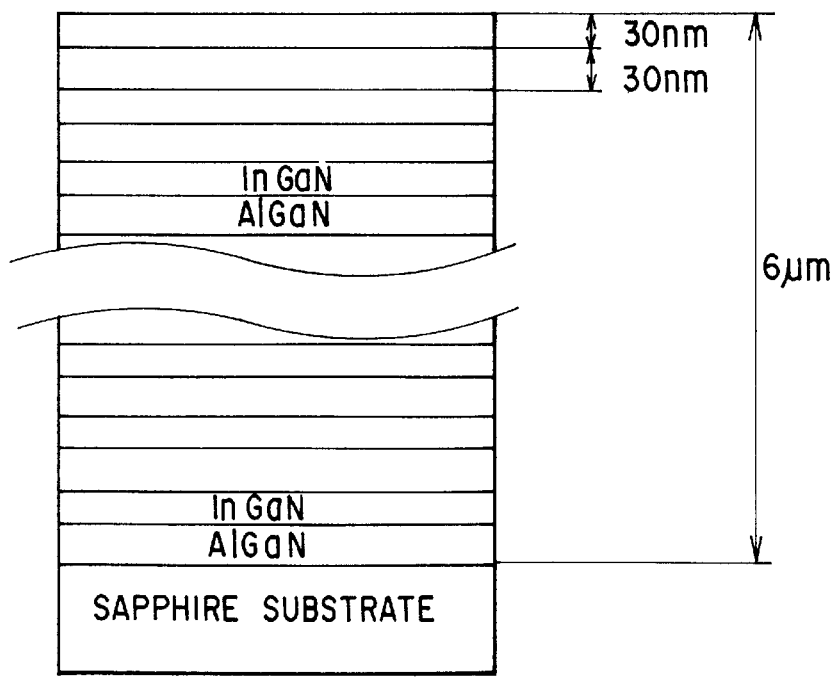
F I G. 53

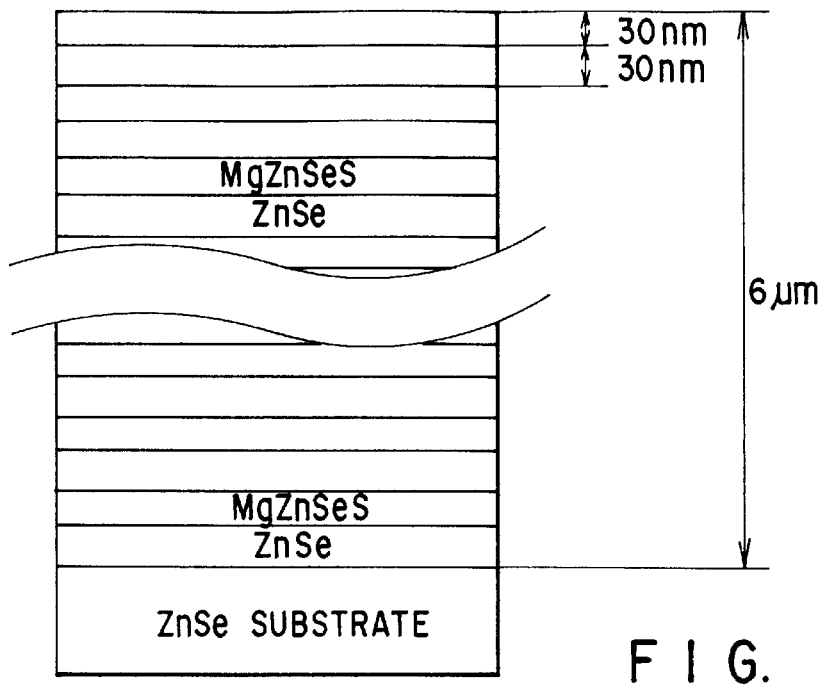
F I G. 56
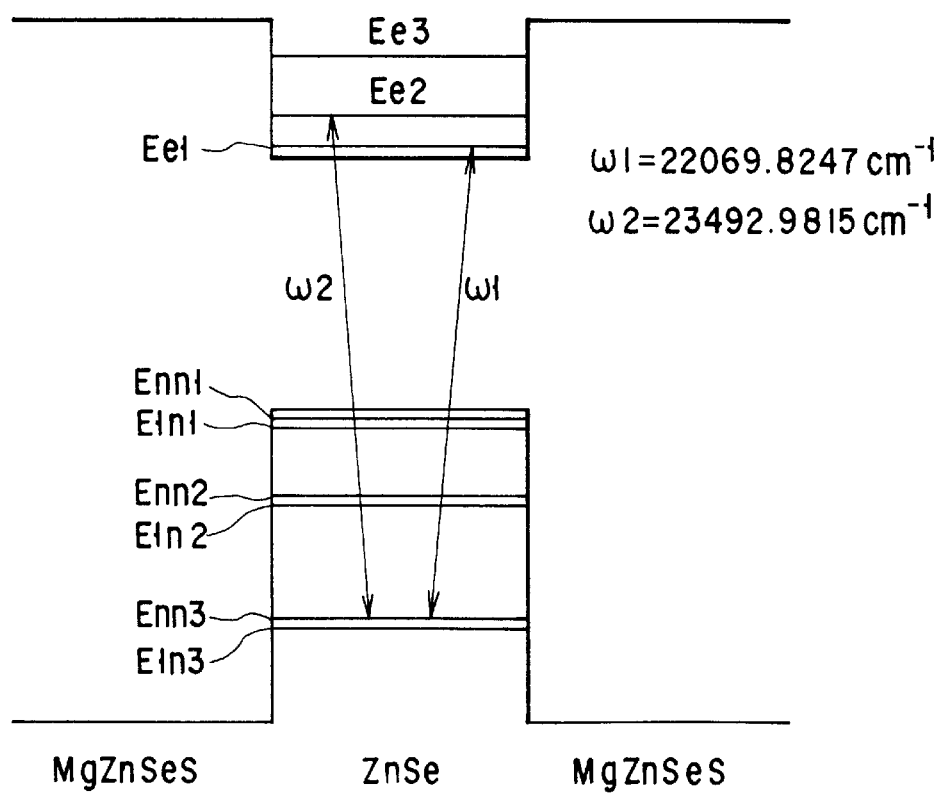
F I G. 57

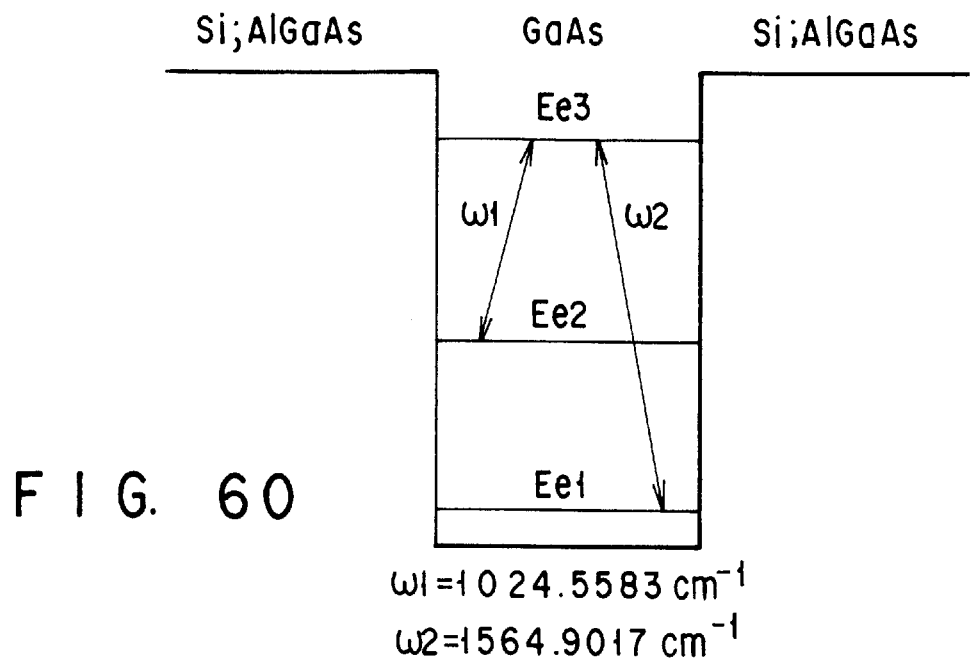
F I G. 60
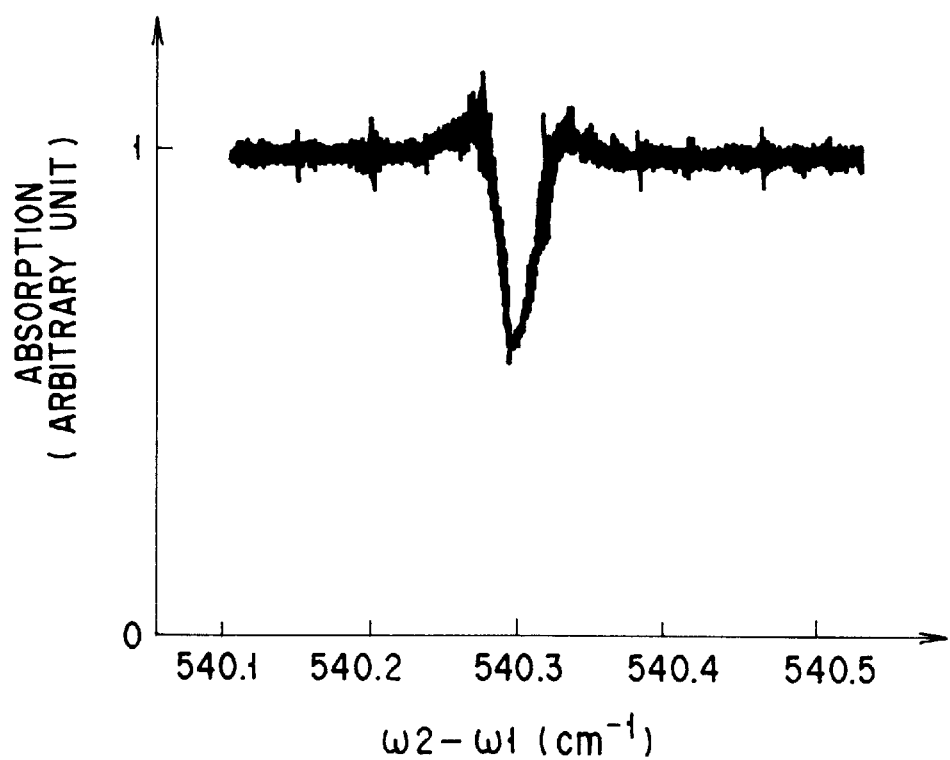
F I G. 61

$\omega_1 = 1115.6902 \, cm^{-1}$ $\omega_2 = 1375.3475 \, cm^{-1}$

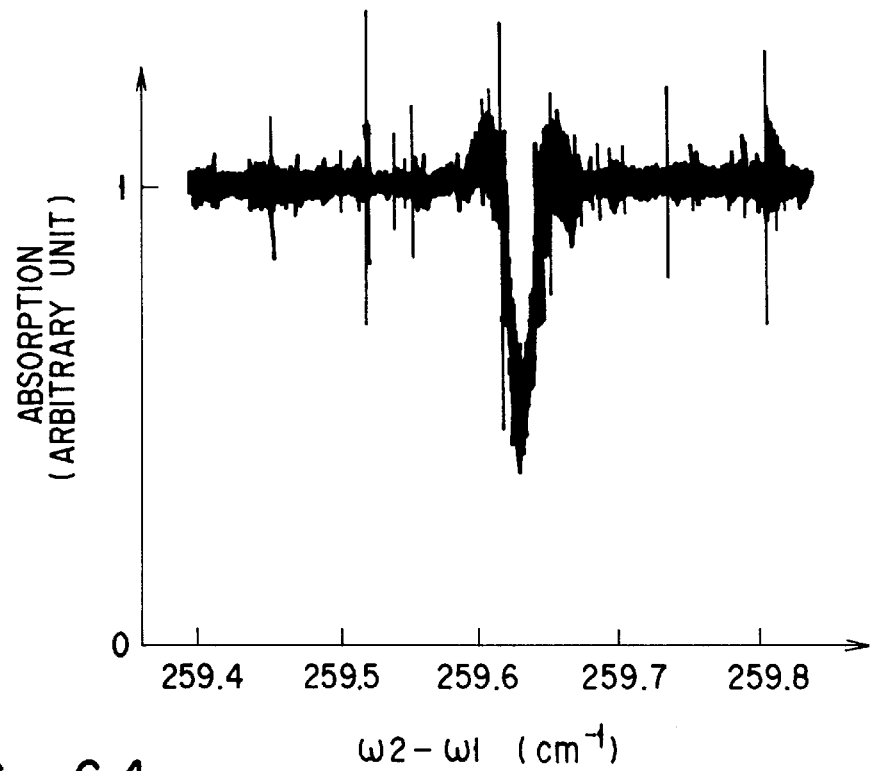
F I G. 64
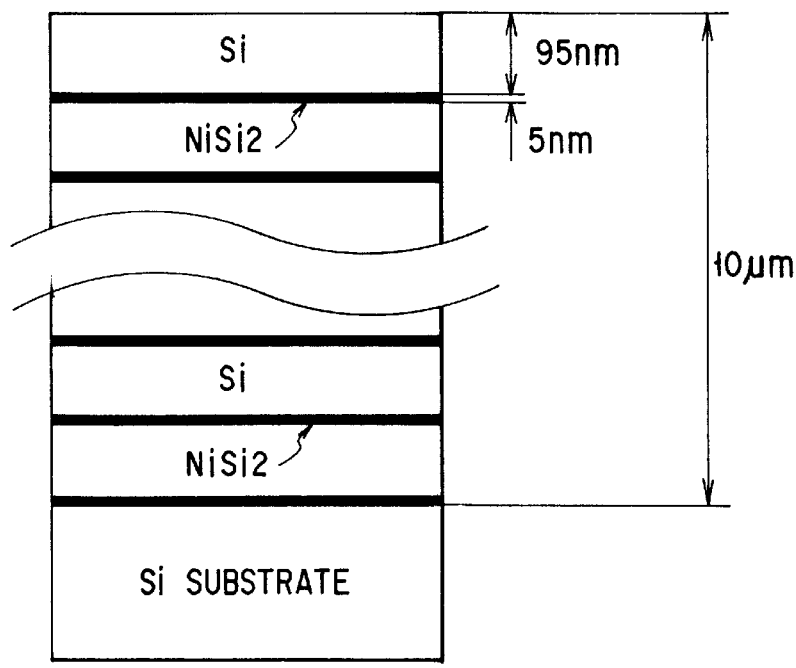
F I G. 65

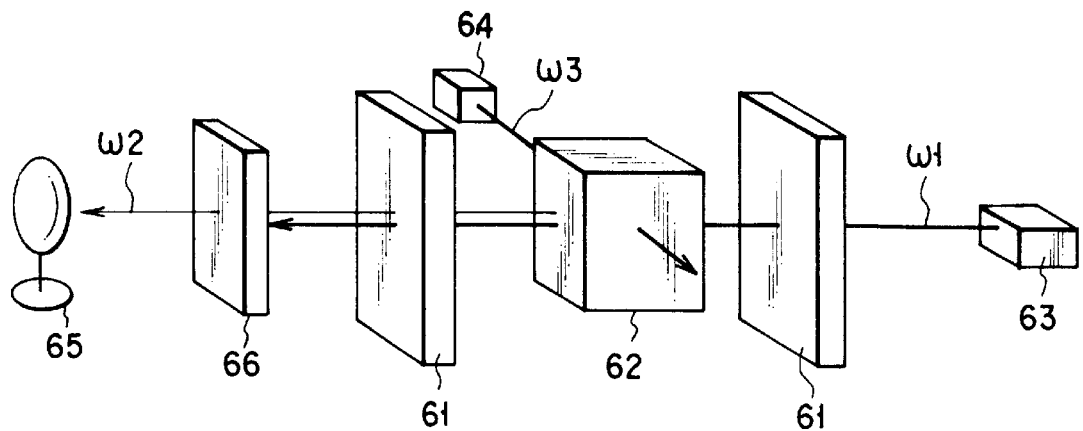
F I G. 70
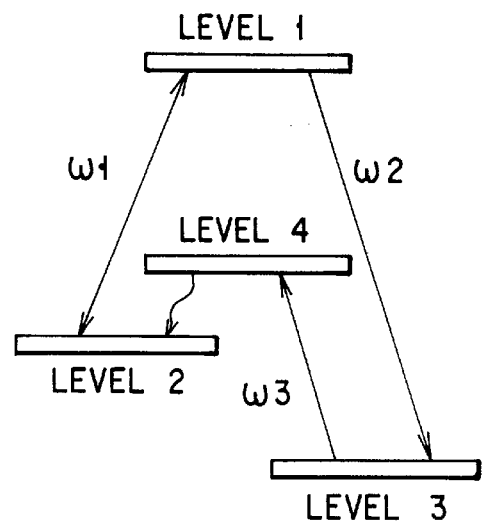
F I G. 71
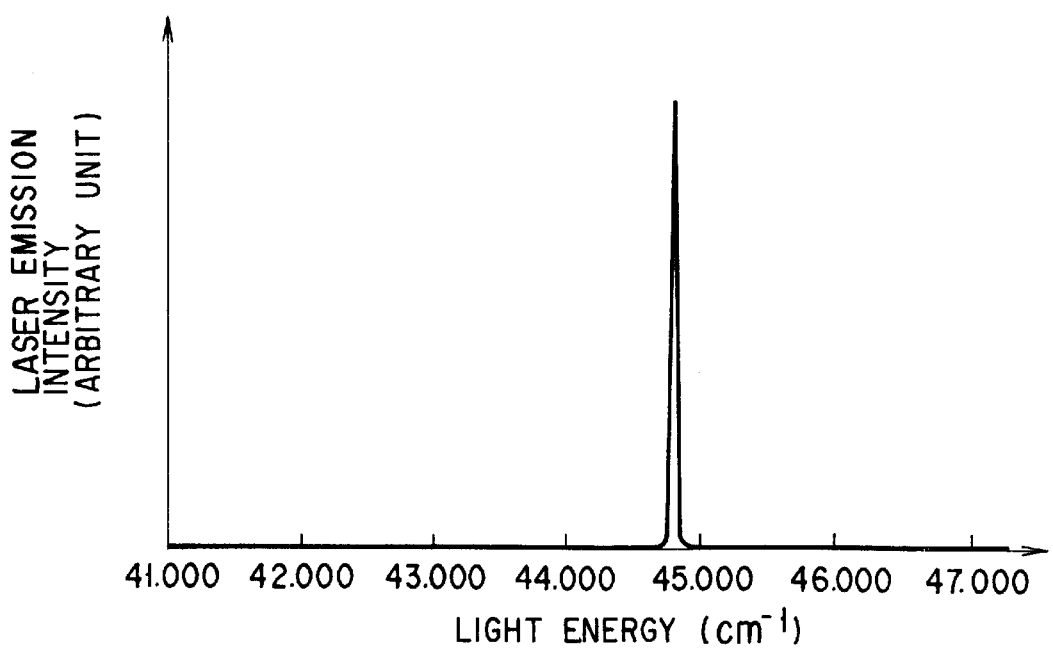
F I G. 73

OPTICAL ELEMENT

BACKGROUND OF THE INVENTION

1. Field of the Invention

The present invention relates to an optical element on the basis of electromagnetically induced transparency (EIT) in solid.

2. Description of the Related Art

Recently, concerning optical properties considered to be nature intrinsic to a substance such as absorption and emission spectrum, researches are active about modulating them by employing only quantum mechanical coherence without resort to nonlinear optical process.

For example, intensive researches are made into "EIT" in which light passes through a substance without being absorbed in a wavelength region supposed to show a strong absorption (K. J. Boller et al., Phys. Rev. Lett. 66, 2593, 1991), "lasing without inversion" (LWI) in which it is expected to realize short wavelength laser in ultraviolet ray to X-ray region particularly difficult to form an inversion distribution because laser oscillation is possible without inversion distribution (S. E. Harris, Phys. Rev. Lett. 62, 1033, 1989), "enhancement of index of refraction" in which the refraction index of a substance can be increased very much (M. O. Scully, Phys. Rev. Lett. 67, 1885, 1991, "population trapping" in which an electron is entrapped at a specific level in spite of irradiation of excitation light (E. Arimondo et al., Lett. Nuovo Cimento 17, 333, 1976), and others. Along with these studies, research and development are energetically promoted about various optical elements by applying this kind of quantum coherence, such as light modulation element and LWI laser.

Among the modulation phenomena of optical properties of substance on the basis of quantum coherence, in particular, the EIT is the foundation of all phenomena mentioned above, and in the LWI laser, for example, it is regarded as the indispensable basic technology for realizing it.

Initially, the EIT was a phenomenon discovered when two laser beams were emitted to atom gas, and ever since the first discovery in 1976, similar phenomena were confirmed in various gases. For example, such phenomena were reported by H. R. Gray et al., in Opt. Lett. 3, 218, 1978; M. Kaivola et al., in Opt. Commun. 49, 418, 1984; A. Aspect et al., in Phys. Rev. Lett. 61, 826, 1988; s. Adachi et al., in Opt. Commun. 81, 364, 1991; A. M. Akulsin et al., in Opt. Commun. 84, 139, 1991; Y. Q. Li et al., in Phys. Rev. A51, R1754, 1995; and A. Kasapi et al., in Phys. Rev. Lett. 74, 1447, 1995.

In early days of discovery, meanwhile, it was not called EIT, but was known as population trapping. That is, the EIT is the name when the attention is paid to the spectrum, and the population trapping is the name when attention is paid to the electron distribution, and they refer to the same phenomenon (G. Alzetta et al., Nuovo Cimento B36, 5, 1976).

FIG. 1A to FIG. 1C schematically show the energy level of atom gas and incident light. Referring now to FIG. 1A to FIG. 1C, the basic principle of EIT is described below.

The objective system is basically composed of three levels and two coherent lights (first light, second light). Relating to combinations of levels and lights, there are three types of excitation as shown in FIG. 1A to FIG. 1C.

That is, there are $\Lambda$ type excitation exciting by the first and second light, with the highest level 1 as the common level as shown in FIG. 1A, V type excitation with the basal level 3 as the common level as shown in FIG. 1B, and $\Xi$ type excitation with the middle level 2 as the common level as shown in FIG. 1C.

First, taking note of the case of $\Lambda$ type excitation, in the condition of the light energy $\omega_1$ of first light (light 1) coinciding with the energy $\omega_{12}$ between level 1 and level 2, $\Delta\omega_1=\omega_1-\omega_{12}=0$, the light absorption spectrum is investigated while varying the light energy $\omega_2$ of second light (light 2).

FIG. 2A shows a light absorption spectrum of second light in this condition. On the axis of abscissas, meanwhile, $\Delta\omega_2$ is expressed by the difference of light energy $\omega_2$ of second light and level 1–3 energy, $\Delta\omega_2=\omega_2-\omega_{13}$.

As shown in FIG. 2A, in the spectrum which is supposed to have a single absorption peak, there is a pit of absorption at $\Delta\omega_2=0$ ($=\Delta\omega_1$), that is, a transparent region is formed. The width $\Omega$ of the pit at this time is $\Omega-(\Omega_{12}^2+\Omega_{13}^2)^{1/2}$, where $\Omega_{12}$ and $\Omega_{13}$ are Rabe frequencies of first light and second light.

The Rabe frequency is the quantity expressing the intensity of light, and the Rabe frequencies $\Omega_{12}$ and $\Omega_{13}$ are respectively defined as $2\pi\mu_{12}E_{12}/h$ and $2\pi\mu_{13}E_{13}/h$, where $\mu_{12}$ is the electric dipole moment between level 1 and level 2, $\mu_{13}$ is the electric dipole moment between level 1 and level 3, $E_{12}$ is the electric field intensity of first light, $E_{13}$ is the electric field intensity of second light, and h is Planck's constant.

FIG. 2B shows the light absorption spectrum of second light when the light energy of flight light is fixed in the state of $\Delta\omega_1\neq0$. As known from FIG. 2B, there is also a transparent region in which second light is not absorbed in the foot area of absorption where $\Delta\omega_1=\Delta\omega_2$. In this case, too, the width $\Omega$ of the pit is $\Omega\sim(\Omega_{12}^2+\Omega_{13}^2)^{1/2}$.

In this way, when first light and second light enter at three levels, in the wavelength satisfying $\Delta\omega_1=\Delta\omega_2$, light is not absorbed, that is, the EIT occurs even in the region originally showing a strong absorption.

The physical reason why absorption disappears is, intuitively, mutual cancellation by interference effect of optical transition from level 3 to level 1 and transition from level 2 to level 1. A more specific explanation may be made by quantum mechanism, in particular, by analysis of density matrix, and the result of analysis indicates that the absorption is actually eliminated.

So far, all results relate to the $\Lambda$ type excitation, and also the light absorption becomes weak and absorption spectrum is divided into two peaks when the first light (light 1) and second light (light 2) satisfy the relation of $\Delta\omega_1=\Delta\omega_2$ in the V type excitation, or when satisfying $\Delta\omega_1=-\Delta\omega_2$ in the $\Xi$ type excitation, as confirmed by both experiment using atom gas and theoretical calculation.

Incidentally, from the result of analysis of density matrix, it is only in the case of $\Lambda$ type excitation that the light absorption strictly becomes zero, but in the V type excitation and $\Xi$ type excitation, by using two lights, it is suggested that the light absorption can decreased nearly to zero.

The principle of LWI on the basis of this EIT is described below.

The LWI also occurs in three schemes, $\Lambda$, V and $\Xi$ types, relating to combinations of level and light, and the $\Lambda$ type excitation is explained below.

FIG. 3A is a schematic expression of energy level of atom gas and incident light.

Herein, the newly added light 3 is incoherent light for pumping electrons from basal state to excitation state incoherently.

Suppose the coherent lights 1, 2 entering the system satisfy the condition of $\Delta\omega_1=\Delta\omega_2$, and that a transparent region is formed in the absorption spectrum from level 3 to level 1.

If irradiated with incoherent light 3 including transition energy between level 1 and level 3, this light 3 is absorbed in the system. This is, intuitively, because the interference effect by EIT does not work on the incoherent light, and it does not become transparent from level 3 to level 1. The electron excited to level 1 from level 3 by the light 3 falls again at level 3 as coherent light by induction irradiation.

That is, in transition between level 1 and level 3, the incoherent light is absorbed, and the illuminating coherent light is not absorbed, and because of this asymmetry of absorption and illumination, the coherent light 2 is amplified by the incoherent light 3.

Such phenomenon occurs also when the sum of populations of level 1 and level 3 is smaller than the population of level 3 in the basal state, and hence it is noticed as a new principle of laser oscillation.

Thus, to amplify the light 2 without inversion distribution, it requires incoherent pumping means of electrons from level 3 in basal state to level 1 or level 2, or both in excited state.

FIG. 3B shows a scheme of using a new level 4 existing between level 1 and level 2, and pumping electrons to level 2 through this level 4, in which the light 2 can be also amplified without inversion distribution.

As the pumping light, either coherent light or incoherent light may be used. As other pumping means than light, an electron beam may be used as shown in FIG. 3C, and in this case, too, the light 2 can be amplified without inversion distribution.

To compose an LWI laser, as shown in FIG. 4A and FIG. 4B, an EIT medium 101 is held by two mirrors 102 to form a resonator, and only light 1 is emitted as coherent light, and further the electrons are pumped from basal state to excited state incoherently by the light 3.

Herein, supposing the light energy of the light 1 exciting between level 1 and level 2 to be $\omega_1$, and the level energy between level 2 and level 3 to be $\omega_{23}$, a gain of laser oscillation occurs around the center of the light energy $(\omega_1+\omega_{23})$, and hence coherent light occurs. The specific description about the physical reason why laser oscillation occurs without inversion distribution can be shown by analysis of density matrix, same as in the case of EIT.

The above results relate to the $\Lambda$ type excitation, but in the case of V type and $\Xi$ type, too, a gain of laser oscillation occurred in the transparent region having an absorption bit due to EIT, possibility of LWI was suggested from the results of calculation of density matrix.

Hence, when such EIT is applied to the solid, by using one of two lights in the gate and controlling the output intensity of the other light, instead of the light modulation element utilizing the existing nonlinear optics requiring strong light by principle, it leads to realization of light modulation element capable of operating sufficiently even with a feeble light or LWI laser capable of oscillating laser without inversion distribution, and moreover by combination of the modulation phenomenon of optical transition with various properties of solid such as magnetism, electric conductivity, and ferrodielectric property, it is expected to create a functional element of new type different from the conventional electron element.

However, application of EIT into the solid involves the following difficulty. That is, since the EIT interferes the optical transition between specific levels, it is difficult to use levels for forming a band when realizing the EIT in the solid.

Hence, recently, it is intensively studied to realize the EIT by making use of semiconductor superlattice, impurity or defect which are relatively discrete in energy level in the solid (for example, A. Imamoglu et al., Opt. Lett. 19, 1744, 1994; P. J. Harshman et al., IEEE J. Quantum Electronics 30, 2297, 1994; D. Huang et al., J. Opt. Soc. Am. B11, 2297, 1994; and Y. Zhu et al., Phys. Rev. A49, 4019, 1994).

At the present, however, in the solid, such manifest EIT characteristic as noted in the atom gas is not obtained. The causes are large fluctuations in the energy level in the case of the semiconductor superlattice because the superlattice structure cannot be fabricated uniformly by the present element fabrication technology, and also large fluctuations in the energy level in the case of impurity or defect because of distribution in the surrounding crystal field.

Owing to such fluctuations of energy level, there are only few superlattices, impurities or defects that simultaneously satisfy the EIT inducing conditions of $\Delta\omega_1=\Delta\omega_2$ (in the case of $\Lambda$ type excitation and V type excitation), or $\Delta\omega_1=-\Delta\omega_2$ (in the case of $\Xi$ type excitation), and hence the EIT characteristic of optical transition is also small as compared with that of atom gas.

That is, in the present element fabricating technology, it is hard to reduce the unevenness of energy level in the solid to a similar level to the level of atom gas, and so far large light modulation characteristic due to EIT indispensable for optical element based on quantum coherence such as light modulating element and LWI laser was not obtained in the solid.

Thus, in the prior art, if the EIT based on the quantum coherence noted in the atom gas is directly applied to the energy level in the solid, a sufficient EIT characteristic cannot be obtained due to random fluctuations of the level in the solid.

SUMMARY OF THE INVENTION

It is a primary object of the invention to provide an optical element applicable on the basis of the EIT in the solid.

A first optical element according to a first aspect of the invention is an optical element comprising a solid containing at least one kind of impurity (N impurities), and excitation means for, with three specific levels selected from the energy levels of the plural types of impurities, being defined as first, second and third level sequentially from the highest energy, containing a first light having a wavelength corresponding to the energy difference between the first level and second level, and a second light having a wavelength corresponding to the energy difference between the first level and third level, coexisting in the solid, wherein $\sigma_{23}\leq\sigma_{12}$ and $\sigma_{23}\leq\sigma_{13}$ are satisfied, supposing the energy between the first level and second level of plural types of impurities, the energy between the first level and third level, and the energy between the second level and third level to be respectively $\omega_{12}(i)$, $\omega_{13}(i)$, and $\omega_{23}(i)(i=1$ to N), supposing mean values of the energy between levels of the plural types of impurities $\omega_{12}(i)$, $\omega_{13}(i)$, and $\omega_{23}(i)$ to be respectively $<\omega_{12}>$, $<\omega_{13}>$, and $<\omega_{23}>$, and supposing standard deviations of the energy between levels of the plural types of impurities $\omega_{12}(i)$, $\omega_{13}(i)$, and $\omega_{23}(i)$ to be respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$. In this case, the impurities are transition metal ions having n (n=2 to 6) electrons on d electron orbit, and both the second level and the third level are arranged so that n electrons are put on t2g orbit when the transition metal ions are disposed in a cubic symmetrical crystal field created by ligands; the impurities are transition metal ions having n (n=7, 8) electrons on d electron orbit, and both the second level and the third level are arranged so that six electrons are put on t2g orbit and n–6 electrons on eg orbit when the transition metal ions are disposed in a cubic symmetrical crystal field created by ligands; or the impurities are rare earth ions having n (n=1 to 13) electrons on f electron orbit, the first level has n–1 electrons accommodated in f electron orbit, and one electron accommodated in d electron orbit, and the second level and third level have both n electrons accommodated in f electron orbit.

A second optical element relating to the first aspect of the invention is an optical element comprising a solid containing at least one kind of impurity (N impurities), and excitation means for, with three specific levels selected from the energy levels of impurities, being defined as first, second and third level sequentially from the highest energy, containing a first light having a wavelength corresponding to the energy difference between the second level and third level, and a second light having a wavelength corresponding to the energy difference between the first level and third level, coexisting in the solid, wherein $\sigma_{12} \leq \sigma_{13}$ and $\sigma_{12} \leq \sigma_{23}$ are satisfied, supposing the energy between the first level and second level of plural types of impurities, the energy between the first level and third level, and the energy between the second level and third level to be respectively $\omega_{12}(i)$, $\omega_{13}(i)$, and $\omega_{23}(i)$ (i=1 to N), supposing mean values of the energy between levels of the plural types of impurities $\omega_{12}(i)$, $\omega_{13}(i)$, and $\omega_{23}(i)$ to be respectively $<\omega_{12}>$, $<\omega_{13}>$, and $<\omega_{23}>$, and supposing standard deviations of the energy between levels of the plural types of impurities $\omega_{12}(i)$, $\omega_{13}(i)$, and $\omega_{23}(i)$ to be respectively $\sigma_{12} = \{(1/N)\Sigma[\omega_{12}(i) - <\omega_{12}>]^2\}^{1/2}$, $\sigma_{13} = \{(1/N)\Sigma[\omega_{13}(i) - <\omega_{13}>]^2\}^{1/2}$, and $\sigma_{23} = \{(1/N)\Sigma[\omega_{23}(i) - <\omega_{23}>]^2\}^{1/2}$. In this case, the impurities are transition metal ions having n (n=2 to 6) electrons on d electron orbit, and both the second level and the third level are arranged so that n–1 electrons are put on t2g orbit, and one electron on eg orbit when the transition metal ions are disposed in a cubic symmetrical crystal field created by ligands; the impurities are transition metal ions having n (n=7, 8) electrons on d electron orbit, and both the first level and the second level are arranged so that five electrons are put on t2g orbit and n–5 electrons on eg orbit when the transition metal ions are disposed in a cubic symmetrical crystal field created by ligands; or the impurities are rare earth ions having n (n=1 to 13) electrons on f electron orbit, the first level and second level have n–1 electrons accommodated in f electron orbit, and one electron accommodated in d electron orbit, and the third level has n electrons accommodated in f electron orbit.

A third optical element relating to the first aspect of the invention is an optical element comprising a solid containing at least one kind of impurity (N impurities), and excitation means for, with three specific levels selected from the energy levels of impurities, being defined as first, second and third level sequentially from the highest energy, containing a first light having a wavelength corresponding to the energy difference between the first level and second level, and a second light having a wavelength corresponding to the energy difference between the second level and third level, coexisting in the solid, wherein $\sigma_{13} \leq \sigma_{12}$ and $\sigma_{13} \leq \sigma_{23}$ are satisfied, supposing the energy between the first level and second level of plural types of impurities, the energy between the first level and third level, and the energy between the second level and third level to be respectively $\omega_{12}(i)$, $\omega_{13}(i)$, and $\omega_{23}(i)$ (i=1 to N), supposing mean values of the energy between levels of the plural types of impurities $\omega_{12}(i)$, $\omega_{13}(i)$, and $\omega_{23}(i)$ to be respectively $<\omega_{12}>$, $<\omega_{13}>$, and $<\omega_{23}>$, and supposing standard deviations of the energy between levels of the plural types of impurities $\omega_{12}(i)$, $\omega_{13}(i)$, and $\omega_{23}(i)$ to be respectively $\sigma_{12} = \{(1/N)\Sigma[\omega_{12}(i) - <\omega_{12}>]^2\}^{1/2}$, $\sigma_{13} = \{(1/N)\Sigma[\omega_{13}(i) - <\omega_{13}>]^2\}^{1/2}$, and $\sigma_{23} = \sigma_{13} = \{(1/N)\Sigma[\omega_{23}(i) - <\omega_{23}>]^2\}^{1/2}$. In this case, the impurities are transition metal ions having n (n=2 to 6) electrons on d electron orbit, and both the first level and the third level are arranged so that n electrons are put on t2g orbit when the transition metal ions are disposed in a cubic symmetrical crystal field created by ligands; or the impurities are transition metal ions having n (n=7, 8) electrons on d electron orbit, and both the first level and the third level are arranged so that six electrons are put on t2g orbit and n–6 electrons on eg orbit when the transition metal ions are disposed in a cubic symmetrical crystal field created by ligands.

In the solid material described below, distribution of energy between levels can be predicted from the symmetricity of each energy level. Generally, energy dispersion is small between symmetrical or similar levels, and it is also known that the optical transition is banned in most cases. By contrast, between levels of different symmetricity, the energy dispersion is larger than that between similar levels, and the optical transition is allowed in many cases.

Therefore, in the first aspect of the invention, in the first optical element, materials of same or similar symmetricity in the second level and third level, and different in the first level are selected, in the second optical element, materials of same or similar symmetricity in the first level and second level, and different in the third level are selected, and in the third optical element, materials of same or similar symmetricity in the third level and third level, and different in the second level are selected, so that the condition may be satisfied.

Solid materials satisfying the condition are insulating inorganic materials containing at least one kind of impurity such as Ti, V, Cr, Mn, Fe, Co, Ni, Cu, other primary transition metal elements, Z, Nb, Mo, Tc, Ru, Rh, Pd, Ag, other secondary transition metal elements, Hf, Ta, W, Re, Os, Ir, Pt, Au, other tertiary transition metal elements, Ce, Pr, Nd, Sm, Eu, Gd, Tb, Dy, Ho, Er, Tm, Yb, other lanthanoid rare earth elements, and Th, Pa, U, other actinoid rare earth elements, including LiF, NaF, KF, RbF, CsF, $MgF_2$, $CaF_2$, $SrF_2$, $BaF_2$, $MnF_2$, $ZnF_2$, $CdF_2$, $AlF_3$, $YF_3$, $LaF_3$, $CeF_3$, $PrF_3$, $NdF_3$, $SmF_3$, $EuF_3$, $GdF_3$, $TbF_3$, $DyF_3$, $HoF_3$, $ErF_3$, $TmF_3$, $YbF_3$, $LuF_3$, $LiBaF_3$, $KMgF_3$, $KMnF_3$, $KZnF_3$, $KNiF_3$, $RbNiF_3$, $ZrF_4$, $LiYF_4$, $NaYF_4$, $KYF_4$, $LiLaF_4$, $LiGdF_4$, $LiLuF_4$, $BaAlF_5$, $SrAlF_5$, $K_3YF_6$, $K_3CoF_6$, $Cs_3NdF_7$, $Cs_3GdF_7$, LiCl, NaCl, KCl, RbCl, CsCl, $YCl_3$, $LaCl_3$, $CeCl_3$, $PrCl_3$, $NdCl_3$, $SmCl_3$, $EuCl_3$, $GdCl_3$, $TbCl_3$, $DyCl_3$, $HoCl_3$, $ErCl_3$, $TmCl_3$, $YbCl_3$, $LuCl_3$, $CsMgCl_3$, $CsCdCl_3$, LiBr, NaBr, KBr, RbBr, CsBr, $YBr_3$, $LaBr_3$, $CeBr_3$, $PrBr_3$, $NdBr_3$, $SmBr_3$, $EuBr_3$, $GdBr_3$, $TbBr_3$, $DyBr_3$, $HoBr_3$, $ErBr_3$, $TmBr_3$, $YbBr_3$, $LuBr_3$, $CsMgBr_3$, LiI, NaI, KI, RbI, CsI, CuCl, CuBr, CuI, AgF, AgCl, AgBr, AgI, YOCl, LaOCl, LaOBr, TlCl, TlBr, TlI, InBr, InI, $Li_2O$, BeO, $N_2O_5$, $Na_2O$, $P_2O_3$, $S_2O_3$, $K_2O$, CaO, $Cr_2O_3$, $MnO_2$, CoO, NiO, SrO, $ZrO_2$, $Nb_2O_5$, $MoO_3$, AgO, $Sb_2O_3$, $TeO_2$, BaO, $WO_3$, $Re_2O_7$, PbO, $PuO_2$, $Y_2O_3$, $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $ThO_2$, $UO_2$, $UO_3$, $Ba_2GdNbO_5$, $SrGdGa_3O_7$, $Sc_2Gd_3Ga_3O_{12}$, $NaLuO_{12}$, $LiIO_3$, $LiNbO_3$, $LiTaO_3$, $Ba_2NaNb_5O_{15}$, $Y_2O_2S$, $La_2O_2S$, $Ce_2O_2S$, $Pr_2O_2S$, $Nd_2O_2S$, $Sm_2O_2S$, $Eu_2O_2S$, $Gd_2O_2S$, $Tb_2O_2S$, $Dy_2O_2S$, $Ho_2O_2S$, $Er_2O_2S$, $Tm_2O_2S$, $Yb_2O_2S$, $Lu_2O_2S$, $Y_2S_3$, $La_2S_3$, $Ce_2S_3$, $Pr_2S_3$, $Nd_2S_3$, $Sm_2S_3$, $Eu_2S_3$, $Gd_2S_3$, $Tb_2S_3$, $Dy_2S_3$, $Ho_2S_3$, $Er_2S_3$, $Tm_2S_3$, $Yb_2S_3$, $Lu_2S_3$, $B_2O_3$, $GaBO_3$, $InBO_3$, $TlBO_3$, $ScBO_3$, $YBO_3$, $LaBO_3$, $CeBO_3$, $PrBO_3$, $NdBO_3$, $SmBO_3$, $EuBO_3$, $GdBO_3$, $TbBO_3$, $DyBO_3$, $HoBO_3$, $ErBO_3$, $TmBO_3$, $YbBO_3$, $LuBO_3$, $CaYBO_4$, $BaB_2O_4$, $Cd_2B_2O_5$, $LiB_3O_5$, $CsB_3O_5$, $SrB_4O_7$, $Al_3TbB_4O_{12}$, $ZnO$, $ZnGa_2O_4$, $MgO$, $MgGa_2O_4$, $Mg_2TiO_4$, $Mg_4Ta_2O_9$, $TiO_2$, $CaTiO_3$, $SrTiO_3$, $BaTiO_3$, $PbTiO_3$, $KTiPO_5$, $Al_2O_3$, $LiAlO_2$, $YAlO_3$, $BeAl_2O_4$, $MaAl_2O4$, $ZnAl_2O_4$, $LiAl_5O_8$, $Y_4Al_2O_9$, $YAl_3B_4O_{12}$, $Y_3Al_5O_{12}$, $La_3Al_5O_{/2}$, $Ce_3Al_5O_{12}$, $Pr_3Al_5O_{12}$, $Nd_3Al_5O_{12}$, $Sm_3Al_5O_{12}$, $Eu_3Al_5O_{12}$, $Gd_3Al_5O_{12}$, $Tb_3Al_5O_{12}$, $Dy_3Al_5O_{12}$, $Ho_3Al_5O_{12}$, $Er_3Al_5O_{12}$, $Tm_3Al_5O_{12}$, $Yb_3Al_5O_{12}$, $Lu_3Al_5O_{12}$, $LaAl_{11}O_{18}$, $CeMgAl_{11}O_{19}$, $TbMgAl_{O19}$, $BaAl_{12}O_{19}$, $BaMg_2Al_{16}O_{27}$, $Fe_2O_3$, $Y_3Fe_5O_{12}$, $La_3Fe_5O_{12}$, $Ce_3Fe_5O_{12}$, $Pr_3Fe_5O_{12}$, $Nd_3Fe_5O_{12}$, $Sm_3Fe_5O_{12}$, $Eu_3Fe_5O_{/2}$, $Gd_3Fe_5O_{12}$, $Tb_3Fe_5O_{12}$, $Dy_3Fe_5O_{12}$, $Ho_3Fe_5O_{12}$, $Er_3Fe_5O_{12}$, $Tm_3Fe_{512}$, $Yb_3Fe_5O_{12}$, $Lu_3Fe_5O_{12}$, $Y_3Ga_5O_{12}$, $La_3Ga_5O_{12}$, $Ce_3Ga_5O_{12}$, $Pr_3Ga_5O_{12}$, $Nd_3Ga_5O_{12}$, $Sm_3Ga_5O_{12}$, $Eu_3Ga_5O_{12}$, $Gd_3Ga_5O_{12}$, $Tb_3Ga_5O_{12}$, $Dy_3Ga_5O_{12}$, $Ho_3Ga_5O_{12}$, $Er_3Ga_5O_{12}$, $Tm_3Ga_5O_{12}$, $Yb_3Ga_5O_{12}$, $Lu_3Ga_5O_{12}$, $Y3Sc_2Ga_5O_{12}$, $CaPO_3$, $ScPO_4$, $YPO_4$, $LaPO_4$, $CePO_4$, $PrPO_4$, $NbPO_4$, $SmPO_4$, $EuPO_4$, $GdPo_4$, $TmPO_4$, $DyPO_4$, $HoPO_4$, $ErPO_4$, $TmPO_4$, $YbPO_4$, $LuPO_4$, $Ca_2PO_4Cl$, $Mg_3(PO_4)_2$, $Ca_3(PO_4)_2$, $Sr_3(PO_4)_2$, $Ba_3(PO_4)_2$, $Zn_3(PO_4)_2$, $Cd_3(PO_4)_2$, $Mg_5(PO_4)_3F$, $Mg_5(PO_4)_3Cl$, $Ca_5(PO_4)_3F$, $Ca_5(PO_4)_3Cl$, $Sr_5(PO_4)_3F$, $Sr_5(PO_4)_3Cl$, $Ba_5(PO_4)_3F$, $Ba_5(PO_4)_3Cl$, $Sr_2P_2O_7$, $NdP_5O_{14}$, $SiO_2$, $BeSiO_3$, $MgSiO_3$, $CaSiO_3$, $SrSiO_3$, $BaSiO_3$, $ZnSiO_3$, $CdSiO_3$, $Zn_2SiO_4$, $NaYSiO_4$, $Y_2SiO_5$, $La_2SiO_5$, $Lu_2SiO_5$, $BeSi_2O_5$, $MgSi_2O_5$, $CaSi_2O_5$, $SrSi_2O_5$, $BaSi_2O_5$, $Sc_2Si_2O_7$, $Be_2SrSi_2O_7$, $Ca_2MgSi_2O_7$, $Si_3N_4$, $GeO_2$, $Zn_2GeO_4$, $Cs_2UO_2F_4$, $Cs_2UO_2Cl_4$, $Cs_2UO_2Br_4$, $Cs_3UO_2F_5$, $Cs_3UO_2Cl_5$, $Cs_3UO_2Br_5$, $MgWO_4$, $CaWO_4$, $SrWO_4$, $BaWO_4$, $AlWO_4$, $CdWO_4$, $PbWO_4$, $Y_2WO_6$, $MgMoO_4$, $CaMoO_4$, $SrMoO_4$, $BaMoO_4$, $LiO_{14}OO_4$, $Y_2Mo_3O_{12}$, $La_2Mo_3O_{12}$, $Ce_2Mo_3O_{12}$, $Pr_2Mo_3O_{12}$, $Nd_2Mo_3O_{12}$, $Sm_2Mo_3O_{12}$, $Eu_2Mo_3O_{12}$, $Gd_2Mo_3O_{12}$, $Tb_2Mo_3O_{12}$, $Dy_2Mo_3O_{12}$, $Ho_2Mo_3O_{12}$, $Er_2Mo_3O_{12}$, $Tm_2Mo_3O_{12}$, $Yb_2Mo_3O_{12}$, $Lu_2Mo_3O_{12}$, $NaCaVO_4$, $ScVO_4$, $YVO_4$, $Mg_3(VO_4)_2$, $Ca_3(VO_4)_2$, $Sr_3(Vo_4)_2$, $Ba_3(VO_4)_2$, $Zn_3(VO_4)_2$, $Cd_3(VO_4)_2$, $Mg_5(VO_4)_3F$, $Mg_5(VO_4)_3Cl$, $Ca_5(VO_4)_3F$, $Ca_5(VO_4)_3Cl$, $Sr_5(VO_4)_3F$, $Sr_5(VO_4)_3Cl$, $Ba_5(VO_4)_3F$, $Ba_5(VO_4)_3Cl$, $CaS$, $SrS$, $BaS$, $CaSe$, $SrSe$, $BaSe$, fluoride, halide, bromide, iodide, copper halide, silver halide, acid halide, thallium compound, indium compound, borate, zinc oxide, magnesium oxide, titanium oxide, aluminate, garnet, silicate, germanate, yttrium compound, lanthanum compound, cerium compound, praseodymium, neodymium, samarium, europium compound, gadolinium compound, terbium compound, dysprosium compound, holmium compound, erbium compound, thulium compound, ytterbium compound, lutetium compound, uranium compound, phosphate, Scheele's compound, sulfide, selenium compound, etc.

In addition, semiconductor or semi-insulating materials containing at least one kind of impurity such as the above transition metal elements and rare earth metals may be used, for example, diamond, Si, SiC, SiGe, Ge, GaAs, GaP, GaN, GaSb, AlAs, AlP, AlN, AlSb, InAs, InP, InSb, HgS, HgSe, HgTe, BAs, BP, BN, ZnS, ZnSe, ZnTe, CdS, CdSe, CdTe, $Cu_2O$, $SnO_2$, $In_2O_3$. In these materials, transition metal elements and rare earth elements usually exist in ion form, but their valence is not particularly defined.

The electron transition optically excited in the invention includes d→d transition in the case of excitation of primary transition metal ion for which 3d level of its ion is responsible, d→d transition in the case of excitation of secondary transition metal for which 4d level is responsible, d→d transition in the case of excitation of tertiary transition metal for which 5d level is esponsible, f→f transition or f→d transition in the case of excitation of lanthanoid rare earth ion for which 4f or 5d level is responsible, and f→f transition in the case of excitation of actinoid rare earth ion for which 5f level is responsible. As the light source, coherent light, that is, laser light is used. If matched in frequency with the electron transition, the type of laser is not particularly limited, but when forming a small-sized element, it is preferred to use semiconductor laser.

In the invention, concerning the solid capable of realizing such EIT, in the case of obtaining a function element by forming the element unit in array, it is enough when the condition about the first to third optical elements of the first aspect of the invention may be satisfied in every element unit.

A fourth optical element according to the first aspect of the invention is an optical element comprising a solid containing at least one kind of impurity (N impurities), light irradiating means for, with three specific levels selected from the energy levels of impurities, being defined as first, second and third level sequentially from the highest energy, irradiating the solid with a light having a wavelength corresponding to the energy difference between the first level and second level, and pumping means for exciting electrons into at least one level of two levels linked by the light out of the three levels, wherein $\sigma_{23} \leq \sigma_{12}$ and $\sigma_{23} \leq \sigma_{13}$ are satisfied, supposing the energy between the first level and second level of plural types of impurities, the energy between the first level and third level, and the energy between the second level and third level to be respectively $\omega_{12}(i)$, $\omega_{13}(i)$, and $\omega_2 3(i)$ (i=1 to N), supposing mean values of the energy between levels of the plural types of impurities $\omega_{12}(i)$, $\omega_{13}(i)$, and $\omega_2 3(i)$ to be respectively $<\omega_{12}>$, $<\omega_{13}>$, and $<\omega_{23}>$, and supposing standard deviations of the energy between levels of the plural types of impurities $\omega_{12}(i)$, $\omega_{13}(i)$, and $\omega_{23}(i)$ to be respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$, and moreover the solid is used as a laser medium, the first light is emitted to the solid, and electrons are excited by the pumping means, thereby oscillating the laser. In this case, the impurities contained in the solid are rare earth ions having n (n=1 to 13) electrons on f electron orbit, the first level has n−1 electrons accommodated in f electron orbit, and one electron accommodated in d electron orbit, and the second level and third level have n electrons accommodated in f electron orbit, and moreover the pumping means possesses means for irradiating the solid with at least one of electron beam and electromagnetic wave.

A fifth optical element according to the first aspect of the invention is an optical element comprising a solid containing at least one kind of impurity (N impurities), light irradiating means for, with three specific levels selected from the energy levels of impurities, being defined as first, second and third level sequentially from the highest energy, irradiating the solid with a light having a wavelength corresponding to the energy difference between the second level and third level, and pumping means for exciting electrons into at least one level of two levels linked by the light out of the three levels, wherein $\sigma_{12} \leq \sigma_{13}$ and $\sigma_{12} \leq \sigma_{23}$ are satisfied, supposing the energy between the first level and second level of plural types of impurities, the energy between the first level and third level, and the energy between the second level and third level to be respectively $\omega_{12}(i)$, $\omega_{13}(i)$, and $\omega_{23}(i)$ (i=1 to N), supposing mean values of the energy between levels of the plural types of impurities $\omega_{12}(i)$, $\omega_{13}(i)$, and $\omega_{23}(i)$ to be respectively $<\omega_{12}>$, $<\omega_{13}>$, and $<\omega_{23}>$, and supposing standard deviations of the energy between levels of the plural types of impurities $\omega_{12}(i)$, $\omega_{13}(i)$, and $\omega_{23}(i)$ to be respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$, and moreover the solid is used as a laser medium, the first light is emitted to the solid, and electrons are excited by the pumping means, thereby oscillating the laser. @15 In this case, the impurities contained in the solid are rare earth ions having n (n=1 to 13) electrons on f electron orbit, the first level and second level have n−1 electrons accommodated in f electron orbit, and one electron accommodated in d electron orbit, and the third level has n electrons accommodated in f electron orbit, and moreover the pumping means possesses means for irradiating the solid with at least one of electron beam and electromagnetic wave.

A sixth optical element according to the first aspect of the invention is an optical element comprising a solid having at least one quantum structure (N quantum structures) composed of quantum well, quantum wire and quantum box, and excitation means for, with one level selected from the energy levels formed in a conductive band in the quantum structures defined as first level, and two levels selected from energy levels formed in valence band in the quantum structure, being defined as second level and third level sequentially from the higher energy, containing a first light having a wavelength corresponding to the energy difference between the first level and second level, and a second light having a wavelength corresponding to the energy difference between the first level and third level, coexisting in the solid, wherein $\sigma_{23} \leq \sigma_{12}$ and $\sigma_{23} \leq \sigma_{13}$ are satisfied, supposing the energy between the first level and second level in each quantum structure of the at least one quantum structure, the energy between the first level and third level, and the energy between the second level and third level to be respectively $\omega_{12}(i)$, $\omega_{13}(i)$, and $\omega_{23}(i)$ (i=1 to N), supposing mean values of the energy between levels of the at least one quantum structure $\omega_{12}(i)$, $\omega_{13}(i)$, and $\omega_{23}(i)$ to be respectively $<\omega_{12}>$, $<\omega_{13}>$, and $<\omega_{23}>$, and supposing standard deviations of the energy between levels of the at least one quantum structure $\omega_{12}(i)$, $\omega_{13}(i)$, and $\omega_{23}(i)$ to be respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$.

A seventh optical element according to the first aspect of the invention is an optical element comprising a solid having at least one quantum structure (N quantum structures) composed of quantum well, quantum wire and quantum box, and excitation means for, with specified three levels selected from the energy levels formed in a conductive band in the quantum structures defined, being defined as first, second and third level sequentially from the highest energy in the case of the material of the quantum structure being semiconductor, or two levels selected from energy levels of higher energy than the Fermi level of the quantum structure, being defined as first and second level from the higher energy level, and one level selected from the energy levels of lower energy than the Fermi level of the quantum structure defined as third level, in the case of the material of the quantum structure being metal, containing a first light having a wavelength corresponding to the energy difference between the first level and second level, and a second light having a wavelength corresponding to the energy difference between the first level and third level, coexisting in the solid, wherein $\sigma_{23} \leq \sigma_{12}$ and $\sigma_{23} \leq \sigma_{13}$ are satisfied, supposing the energy between the first level and second level in each quantum structure of the at least one quantum structure, the energy between the first level and third level, and the energy between the second level and third level to be respectively $\omega_{12}(i)$, $\omega_{13}(i)$, and $\omega_{23}(i)$ (i=1 to N), supposing mean values of the energy between levels of the at least one quantum structure $\omega_{12}(i)$, $\omega_{13}(i)$, and $\omega_{23}(i)$ to be respectively $<\omega_{12}>$, $<\omega_{13}>$, and $<\omega_{23}>$, and supposing standard deviations of the energy between levels of the at least one quantum structure $\omega_{12}(i)$, $\omega_{13}(i)$, and $\omega_{23}(i)$ to be respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$.

An eighth optical element according to the first aspect of the invention is an optical element comprising a solid having at least one quantum structure (N quantum structures) composed of quantum well, quantum wire and quantum box, and excitation means for, with two levels selected from the energy levels formed in a conductive band in the quantum structures defined as first and second level sequentially from the highest energy, and one level selected from energy levels formed in valence band in the quantum structure, being defined as third level, containing a first light having a wavelength corresponding to the energy difference between the first level and second level, and a second light having a wavelength corresponding to the energy difference between the first level and third level, coexisting in the solid, wherein $\sigma_{12} \leq \sigma_{13}$ and $\sigma_{12} \leq \sigma_{23}$ are satisfied, supposing the energy between the first level and second level in each quantum structure of the at least one quantum structure, the energy between the first level and third level, and the energy between the second level and third level to be respectively $\omega_{12}(i)$, $\omega_{13}(i)$, and $\omega_{23}(i)$ (i=1 to N), supposing mean values of the energy between levels of the at least one quantum structure $\omega_{12}(i)$, $\omega_{13}(i)$, and $\omega_{23}(i)$ to be respectively $<\omega_{12}>$, $<\omega_{13}>$, and $<\omega_{23}>$, and supposing standard deviations of the energy between levels of the at least one quantum structure $\omega_{12}(i)$, $\omega_{13}(i)$, and $\omega_{23}(i)$ to be respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$.

A ninth optical element according to the first aspect of the invention is an optical element comprising a solid having at least one quantum structure (N quantum structures) composed of quantum well, quantum wire and quantum box, and excitation means for, with specified three levels selected from the energy levels formed in a conductive band in the quantum structures defined, being defined as first, second and third level sequentially from the highest energy in the case of the material of the quantum structure being semiconductor, or one level selected from energy levels of higher energy than the Fermi level of the quantum structure, being defined as first level, and two levels selected from the energy levels of lower energy than the Fermi level of the quantum structure defined as second and third level sequentially from the highest energy, in the case of the material of the quantum structure being metal, containing a first light having a wavelength corresponding to the energy difference between the first level and second level, and a second light having a wavelength corresponding to the energy difference between the first level and third level, coexisting in the solid, wherein $\sigma_{12} \leq \sigma_{13}$ and $\sigma_{12} \leq \sigma_{23}$ are satisfied, supposing the energy between the first level and second level in each quantum structure of the at least one quantum structure, the energy between the first level and third level, and the energy between the second level and third level to be respectively $\omega_{12}(i)$, $\omega_{13}(i)$, and $\omega_{23}(i)$ (i=1 to N), supposing mean values of the energy between levels of the at least one quantum structure $\omega_{12}(i)$, $\omega_{13}(i)$, and $\omega_{23}(i)$ to be respectively $<\omega_{12}>$, $<\omega_{13}>$, and $<\omega_{23}>$, and supposing standard deviations of the energy between levels of the at least one quantum structure $\omega_{12}(i)$, $\omega_{13}(i)$, and $\omega_{23}(i)$ to be respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$.

In the sixth to ninth optical elements, the quantum well, quantum wire, and quantum box of the quantum structure are made of semiconductor or metal, and the quantum barrier of the quantum structure is made of semiconductor or insulator, and by selectively doping donor impurity or acceptor impurity in the quantum barrier, it is preferred to inject electrons or holes into the quantum structure. Alternatively, by such means as light irradiation or current injection, electrons or holes may be injected into the quantum structure.

More specifically, the quantum well, quantum wire, and quantum box of the invention (including optical elements in a second aspect described below) are made of semiconductor materials composed of at least one element of B, C, N, O, Mg, Al, Si, P, S, Mn, Zn, Ga, Ge, As, Se, Cd, In, Sn, Sb, Te, and Hg, or metal materials such as Al, Ti, V, Cr, Mn, Fe, Co, Ni, Cu, Zn, Zr, Nb, Mo, Ru, Rh, Pd, Cd, Ag, Hf, Ta, W, Re, Os, Ir, Pt, Au, or their alloy.

The quantum barrier is made of semiconductor materials composed of at least one element of B, C, N, O, Mg, Al, Si, P, S, Mn, Zn, Ga, Ge, As, Se, Cd, In, Sn, Sb, Te, and Hg, or insulating inorganic materials including LiF, NaF, KF, RbF, CsF, $MgF_2$, $CaF_2$, $SrF_2$, $BaF_2$, $MnF_2$, $ZnF_2$, $CdF_2$, $AlF_3$, $YF_3$, $LaF_3$, $CeF_3$, $PrF_3$, $NdF_3$, $SmF_3$, $EuF_3$, $GdF_3$, $TbF_3$, $DyF_3$, $HoF_3$, $ErF_3$, $TmF_3$, $YbF_3$, $LuF_3$, $LiBaF_3$, $KMgF_3$, $KMnF_3$, $KZnF_3$, $KNiF_3$, $RbNiF_3$, $ZrF_4$, $LiYF_4$, $NaYF_4$, $KYF_4$, $LiLaF_4$, $LiGdF_4$, $LiLuF_4$, $BaAlF_5$, $SrAlF_5$, $K_3YF_6$, $K_3CoF_6$, $Cs_3NdF_7$, $Cs_3GdF_7$, LiCl, NaCl, KCl, RbCl, CsCl, $YCl_3$, $LaCl_3$, $CeCl_3$, $PrCl_3$, $NdCl_3$, $SmCl_3$, $EuCl_3$, $GdCl_3$, $TbCl_3$, $DyCl_3$, $HoCl_3$, $ErCl_3$, $TmCl_3$, $YbCl_3$, $LuCl_3$, $CsMgCl_3$, $CsCdCl_3$, LiBr, NaBr, KBr, RbBr, CsBr, $YBr_3$, $LaBr_3$, $CeBr_3$, $PrBr_3$, $NdBr_3$, $SmBr_3$, $EuBr_3$, $GdBr_3$, $TbBr_3$, $DyBr_3$, $HoBr_3$, $ErBr_3$, $TmBr_3$, $YbBr_3$, $LuBr_3$, $CsMgBr_3$, LiI, NaI, KI, RbI, CsI, CuCl, CuBr, CuI, AgF, AgCl, AgBr, AgI, YOCl, LaOCl, LaOBr, TlCl, TlBr, TlI, InBr, InI, $Li_2O$, BeO, $N_2O_5$, $Na_2O$, $P_{2O3}$, $S_2O_3$, $K_2O$, CaO, $Cr_2O_3$, $MnO_2$, CoO, NiO, SrO, $ZrO_2$, $Nb_2O_5$, $MoO_3$, AgO, $Sb_2O_3$, $TeO_2$, BaO, $WO_3$, $Re_2O_7$, PbO, $PuO_2$, $Y_2O_3$, $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $ThO_2$, $UO_2$, $UO_3$, $Ba_2GdNbO_5$, $SrGdGa_3O_7$, $Sc_2Gd_3Ga_3O_{12}$, $NaLuO_{12}$, $LiIO_3$, $LiNbO_3$, $LiTaO_3$, $Ba_2NaNb_5O_{15}$, $Y_2O_2S$, $La_2O_2S$, $Ce_2O_2S$, $Pr_2O_2S$, $Nd_2O_2S$, $Sm_2O_2S$, $Eu_2O_2S$, $Gd_2O_2S$, $Tb_2O_2S$, $Dy_2O_2S$, $Ho_2O_2S$, $Er_2O_2S$, $Tm_2O_2S$, $Yb_2O_2S$, $Lu_2O_2S$, $Y_2S_3$, $La_2S_3$, $Ce_2S_3$, $Pr_2S_3$, $Nd_2S_3$, $Sm_2S_3$, $Eu_2S_3$, $Gd_2S_3$, $Tb_2S_3$, $Dy_2S_3$, $Ho_2S_3$, $Er_2S_3$, $Tm_2S_3$, $Yb_2S_3$, $Lu_2S_3$, $B_2O_3$, $GaBO_3$, $InBO_3$, $TlBO_3$, $ScBO_3$, $YBO_3$, $LaBO_3$, $CeBO_3$, $PrBO_3$, $NdBO_3$, $SmBO_3$, $EuBO_3$, $GdBO_3$, $TbBO_3$, $DyBO_3$, $HoBO_3$, $ErBO_3$, $TmBO_3$, $YbBO_3$, $LuBO_3$, $CaYBO_4$, $BaB_2O_4$, $Cd_2B_2O_5$, $LiB_3O_5$, $CsB_3O_5$, $SrB_4O_7$, $Al_3TbB_4O_{12}$, ZnO, $ZnGa_2O_4$, MgO, $MgGa_2O_4$, $Mg_2TiO_4$, $Mg_4Ta_2O_9$, $TiO_2$, $CaTiO_3$, $SrTiO_3$, $BaTiO_3$, $PbTiO_3$, $KTiPO_5$, $Al_2O_3$, $LiAlO_2$, $YAlO_3$, $BeAl_2O_4$, $MaAl_2O_4$, $ZnAl_2O_4$, $LiAl_5O_8$, $Y_4Al_2O_9$, $YAl_3B_4O_{12}$, $Y_3Al_5O_{12}$, $La_3Al_5O_{12}$, $Ce_3Al_5O_{12}$, $Pr_3Al_5O_{12}$, $Nd_3Al_5O_{12}$, $Sm_3Al_5O_{12}$, $Eu_3Al_5O_{12}$, $Gd_3Al_5O_{12}$, $Tb_3Al_5O_{12}$, $Dy_3Al_5O_{12}$, $Ho_3Al_5O_{12}$, $Er_3Al_5O_{12}$, $Tm_3Al_5O_{12}$, $Yb_3Al_5O_{12}$, $Lu_3Al_5O_{12}$, $LaAl_{11}O_{18}$, $CeMgAl_{11}O_9$, $TbMgAl_{11}O_{19}$, $BaAl_{12}O_{19}$, $BaMg_2Al_{16}O_{27}$, $Fe_2O_3$, $Y_3Fe_5O_{12}$, $La_3Fe_5O_{12}$, $Ce_3Fe_5O_{12}$, $Pr_3Fe_5O_{12}$, $Nd_3Fe_5O_{12}$, $Sm_3Fe_5O_{12}$, $Eu_3Fe_5O_{12}$, $Gd_3Fe_5O_{12}$, $Tb_3Fe_5O_{12}$, $Dy_3Fe_5O_{12}$, $Ho_3Fe_5O_{12}$, $Er_3Fe_5O_{12}$, $Tm_3Fe_5O_{12}$, $Yb_3Fe_5O_{12}$, $Lu_3Fe_5O_{12}$, $Y_3Ga_5O_{12}$, $La_3Ga_5O_{12}$, $Ce_3Ga_5O_{12}$, $Pr_3Ga_5O_{12}$, $Nd_3Ga_5O_{12}$, $Sm_3Ga_5O_{12}$, $Eu_3Ga_5O_{12}$, $Gd_3Ga_5O_{12}$, $Tb_3Ga_5O_{12}$, $Dy_3Ga_5O_{12}$, $Ho_3Ga_5O_{12}$, $Er_3Ga_5O_{12}$, $Tm_3Ga_5O_{12}$, $Yb_3Ga_5O_{12}$, $Lu_3Ga_5O_{12}$, $Y3Sc_2Ga_5O_{12}$, $CaPo_3$, $ScPO_4$, $YPO_4$, $LaPO_4$, $CePO_4$, $PrPO_4$, $NbPO_4$, $SmPO_4$, $EuPO_4$, $GdPo_4$, $TmPO_4$, $DyPO_4$, $HoPO_4$, $ErPO_4$, $TmPO_4$, $YbPO_4$, $LuPO_4$, $Ca_2PO_4Cl$, $Mg_3(PO_4)_2$, $Ca_3(PO_4)_2$, $Sr_3(PO_4)_2$, $Ba_3(PO_4)_2$, $Zn_3(PO_4)_2$, $Cd_3(PO_4)_2$, $Mg_5(PO_4)_3F$, $Mg_5(PO_4)_3Cl$, $Ca_5(PO_4)_3F$, $Ca_5(PO_4)_3Cl$, $Sr_5(PO_4)_3F$, $Sr_5(PO_4)_3Cl$, $Ba_5(PO_4)_3F$, $Ba_5(PO_4)_3Cl$, $Sr_2P_2O_7$, $NdP_5O_{14}$, $SiO_2$, $BeSiO_3$, $MgSiO_3$, $CaSiO_3$, $SrSiO_3$, $BaSiO_3$, $ZnSiO_3$, $CdSiO_3$, $Zn_2SiO_4$, $NaYSiO_4$, $Y_2SiO_5$, $La_2SiO_5$, $Lu_2SiO_5$, $BeSi_2O_5$, $MgSi_2O_5$, $CaSi_2O_5$, $SrSi_2O_5$, $BaSi_2O_5$, $Sc_2Si_2O_7$, $Be_2SrSi_2O_7$, $Ca_2MgSi_2O_7$, $Si_3N_4$, $GeO_2$, $Zn_2GeO_4$, $Cs_2UO_2F_4$, $Cs_2UO_2Cl_4$, $Cs_2UO_2Br_4$, $Cs_3UO_2F_5$, $Cs_3UO_2Cl_5$, $Cs_3UO_2Br_5$, $MgWO_4$, $CaWO_4$, $SrWO_4$, $BaWO_4$, $AlWO_4$, $CdWO_4$, $PbWO_4$, $Y_2WO_6$, $MgMoO_4$, $CaMoO_4$, $SrMoO_4$, $BaMoO_4$, $LiO_{14}oO_4$, $Y_2Mo_3O_{12}$, $La_2Mo_3O_{12}$, $Ce_2Mo_3O_{12}$, $Pr_2Mo_3O_{12}$, $Nd_2Mo_3O_{12}$, $Sm_2Mo_3O_{12}$, $Eu_2Mo_3O_{12}$, $Gd_2Mo_3O_{12}$, $Tb_2Mo_3O_{12}$, $Dy_2Mo_3O_{12}$, $Ho_2Mo_3O_{12}$, $Er_2Mo_3O_{12}$, $Tm_2Mo_3O_{12}$, $Yb_2Mo_3O_{12}$, $Lu_2Mo_3O_{12}$, $NaCaVO_4$, $ScVO_4$, $YVO_4$, $Mg_3(VO_4)_2$, $Ca_3(VO_4)_2$, $Sr_3(Vo_4)_2$, $Ba_3(VO_4)_2$, $Zn_3(VO_4)_2$, $Cd_3(VO_4)^2$, $Mg_5(VO_4)_3F$, $Mg_5(VO_4)_3Cl$, $Ca_5(VO_4)_3F$, $Ca_5(VO_4)_3Cl$, $Sr_5(VO_4)_3F$, $Sr_5(VO_4)_3Cl$, $Ba_5(VO_4)_3F$, $Ba_5(VO_4)_3Cl$, CaS, SrS, BaS, CaSe, SrSe, BaSe, fluoride, halide, bromide, iodide, copper halide, silver halide, acid halide, thallium compound, indium compound, borate, zinc oxide, magnesium oxide, titanium oxide, aluminate, garnet, silicate, germanate, yttrium compound, lanthanum compound, cerium compound, praseodymium, neodymium, samarium, europium compound, gadolinium compound, terbium compound, dysprosium compound, holmium compound, erbium compound, thulium compound, ytterbium compound, lutetium compound, uranium compound, phosphate, Scheele's compound, sulfide, selenium compound, etc.

In the invention, the first and second light by the light irradiating means should be preferably coherent light, that is, laser light, and the type of laser is not particularly limited as far as matched in frequency with the desired electron transition, but it is preferred to use semiconductor laser which is useful for forming a small-sized element.

It is the gist of the second aspect of the invention that the solid for composing the optical element is a material degenerated when two levels not coupled by light are not present in the outer field, in the case of light excitation of electron transition of two or three levels in the solid into Λ type or V type, while applying an outer field (electric field, magnetic field, pressure) to the solid.

A first optical element according to the second aspect of the invention is an optical element comprising a solid containing impurities, means for providing this solid with at least one outer field of electric field, magnetic field, and pressure, and excitation means for, with specified three levels selected from energy levels of the impurities, being define as first, second and third level sequentially from the highest energy, with the outer field applied to the solid, containing a first light having a wavelength corresponding to the energy difference between the first level and second level, and a second light having a wavelength corresponding to the energy difference between the first level and third level, coexisting in the solid, wherein if the outer field is zero, the second level and third level in the solid are degenerated.

A second optical element according to the second aspect of the invention is an optical element comprising a solid having at least one quantum structure of quantum well, quantum wire and quantum box, means for providing this solid with at least one outer field of electric field, magnetic field, and pressure, and excitation means for, with specified three levels selected from energy levels of the impurities, being define as first, second and third level sequentially from the highest energy, with the outer field applied to the solid, containing a first light having a wavelength corresponding to the energy difference between the first level and second level, and a second light having a wavelength corresponding to the energy difference between the first level and third level, coexisting in the solid, wherein if the outer field is zero, the second level and third level in the solid are degenerated.

In the first and second optical elements, supposing the energy of the first light to be $\omega_1$, the energy of the second light to be $\omega_2$, and energy difference of the second level and third level to be $\omega_{23}$, the magnitude of the outer field is set so as to satisfy the condition of $\omega_{23}=\omega_2-\omega_1$.

A third optical element according to the second aspect of the invention is an optical element comprising a solid containing impurities, means for providing this solid with at least one outer field of electric field, magnetic field, and pressure, and excitation means for, with specified three levels selected from energy levels of the impurities, being define as first, second and third level sequentially from the highest energy, with the outer field applied to the solid, containing a first light having a wavelength corresponding to the energy difference between the first level and second level, and a second light having a wavelength corresponding to the energy difference between the first level and third level, coexisting in the solid, wherein if the outer field is zero, the first level and second level in the solid are degenerated.

A fourth optical element according to the second aspect of the invention is an optical element comprising a solid having at least one quantum structure of quantum well, quantum wire and quantum box, means for providing this solid with at least one outer field of electric field, magnetic field, and pressure, and excitation means for, with specified three levels selected from energy levels of the impurities, being define as first, second and third level sequentially from the highest energy, with the outer field applied to the solid, containing a first light having a wavelength corresponding to the energy difference between the first level and second level, and a second light having a wavelength corresponding to the energy difference between the first level and third level, coexisting in the solid, wherein if the outer field is zero, the first level and second level in the solid are degenerated.

In the third and fourth optical elements, supposing the energy of the first light to be $\omega_1$, the energy of the second light to be $\omega_2$, and energy difference of the first level and second level to be $\omega_{12}$, the magnitude of the outer field is set so as to satisfy the condition of $\omega_{12}=\omega_2-\omega_1$.

In the second aspect, the means for applying electric field as outer field is, for example, composed of two electrodes holding the solid between them, and a power supply for applying a voltage between the two electrodes.

The materials for the optical elements of the invention are same as the materials for the optical elements of the first aspect.

The second and fourth optical elements of the second aspect are elements in which the quantum structure such as quantum well, quantum wire and quantum box is used when the semiconductor element fabrication technology is advanced and the unevenness of energy level is lowered to a level similar to that of atom gas.

If there is a large fluctuation in the energy level in the solid, that is, if there is a large dispersion (standard deviation) in the energy between levels for light excitation, as far as the condition (relating to the standard deviation) of the optical element in the first aspect is satisfied, it has been clarified that a large light modulation characteristic on the basis of the EIT in the background of quantum coherence can be obtained. Therefore, according to the first aspect of the invention, it is possible to present a practical optical element on the basis of the EIT in the solid.

It is also evident from the invention that a large light modulation characteristic on the basis of the EIT in the background of quantum coherence can be obtained, even if there is a large fluctuation in the energy level in the solid, by using a specific material for the solid for composing the optical elements, that is, by using the solid of the invention. Therefore, according to the second aspect of the invention, it is possible to present a practical optical element on the basis of the EIT in the solid.

The action of the invention is described in detail below.

As mentioned above, to realize an EIT in the solid, it is hard to use such a level as to form a band. That is, to realize an EIT in the solid, it is necessary to select a system having a discrete energy level same as in the case of atom gas.

As the application conditions to the solid, besides, the level organization should be simple, and a system of three levels must be set, and the system must be closed so that electrons may not escape out of the three levels in the light excitation process.

Hence, candidates of the solid for use in the optical elements of the invention include impurity atoms such as rare earth elements and transition elements dispersed in crystals, and quantum wire and quantum box of semiconductor, in addition to the semiconductor superlattice and quantum well described above.

The solid having such features in the energy level (selection of system having discrete energy levels, setting of three-level system in a simple level composition, and closed system to prevent electrons from escaping outside the three levels) may be regarded as a kind of a set of pseudo-atoms. However, in the quantum structure such as semiconductor superlattice as candidate of such pseudo-atom system, or impurity or defect in crystal, at the present, there is no successful report on modulation of obvious optical transition as noted in the atom gas.

This is because the energy level of quantum structure such as semiconductor superlattice, impurity and defect is large as compared with atom gas, and fluctuates randomly, and hence there is an extremely small number of levels satisfying the condition for inducing EIT, $\Delta\omega_1=\Delta\omega_2$ (in the case of $\Lambda$ type excitation and V type excitation) or $\Delta\omega_1=-\Delta\omega_2$ (in the case of $\Xi$ type excitation).

Hence, to realize the EIT in the solid, aside from the application condition mentioned above, it is understood that the condition about the uniformity of energy level is added.

FIG. 5A and FIG. 5B schematically show the light absorption spectrum about the solid of the pseudo-atom system having discrete energy level.

Generally, if a solid of pseudo-atom system having a discrete level is selected, the line width of light absorption spectrum is considerably broad as compared with the atom gas. This broad spectrum line width is due to uneven spread in most cases.

The uneven spread has the energy level deviated slightly in individual pseudo-atoms as shown in FIG. 5A, but not so much apart as to be separated completely, and therefore spectra of multiple pseudo-atoms are overlapped and appear to be one broad spectrum line.

This spread is mainly due to dispersion of energy between levels as seen from the entire pseudo-atoms because the size of the crystal field the individual pseudo-atoms in the crystal receive varies due to distortion in the solid, especially in the crystal. In the entire pseudo-atom system mentioned above, there are, more or less, fluctuations of energy between levels.

FIG. 5B schematically expresses the light absorption spectrum when irradiating with two laser beams, same as in the atom gas shown in FIG. 2A, by selecting a system of three levels, large in energy between levels and dispersed randomly, out of the system of pseudo-atoms.

It is known from FIG. 5B that the spectrum shape is not largely different from that usually seen through one beam of light, and that the optical transition is hardly modulation. Therefore, the EIT cannot be realized in any system of pseudo-atoms unless the level of light excitation is selected in sufficient consideration of uneven spread, that is, distribution of energy between levels.

Hereinafter is shown how the modulation characteristic of light absorption spectrum conforming to EIT is changed depending on the distribution characteristic of energy between levels in the system of pseudo-atoms, especially standard deviation of energy between levels, relating to the cases of $\Lambda$ type excitation, V type excitation, and $\Xi$ type excitation.

Herein, as the typical quantity expressing the uneven spread, the standard deviation of energy between levels is employed. In the following description, it is supposed that the energy is high in the following sequence: level 1 (first level)>level 2 (second level)>level 3 (third level).

(1) In the case of $\Lambda$ type excitation (relating to the first optical element in the first aspect, and first and second optical elements in the second aspect)

First consider two pseudo-atoms i and j. Between level 1 and level 2, and level 1 and level 3, let us assume to emit two laser beams with light energy of $\omega_1$ and $\omega_2$. Herein, supposing the differences of light energy $\omega_1$, $\omega_2$ and energy between levels $\omega_{12}$, $\omega_{13}$ to be respectively $\Delta\omega_1=\omega_1-\omega_{12}$, $\Delta\omega_2=\omega_2-\omega_{13}$, the conditions of the two pseudo-atoms satisfying $\Delta\omega_1=\Delta\omega_2$ at the same time are $$\omega_1-\omega_{12}(i)=\omega_2-\omega_{13}(i) \tag{1a}$$

$$\omega_1-\omega_{12}(j)=\omega_2-\omega_{13}(j) \tag{1b}$$

Since the energy between level 2 and level 3, $\omega_{23}$, not coupled by light is expressed as $\omega_{23}=\omega_{13}-\omega_{12}$, and hence formulas (1a) and (1b) can be rewritten as follows.

$$\omega_{23}(i)=\omega_{23}(j) \tag{2}$$

That is, to induce the state of completely light absorption zero state by satisfying $\Delta\omega_1=\Delta\omega_2$ at the same time by two pseudo-atoms, it is required not to depend on the energy level of the highest level 1, and that the energy $\omega_{23}$ between level 2 and level 3 be equal between two pseudo-atoms.

Supposing the energy difference of levels between pseudo-atoms to be $\Delta\omega_{12}=|\omega_{12}(i)-\omega_{12}(j)|$
$\Delta\omega_{13}=|\omega_{13}(i)-\omega_{13}(j)|$
$\Delta\omega_{23}=|\omega_{23}(i)-\omega_{23}(j)|$ as the condition of $\Delta\omega_{12}$, $\Delta\omega_{13}$, and $\Delta\omega_{23}$ satisfying formula (2), $$\Delta\omega_{23}=0 \tag{3}$$

is obtained.

Formula (3) is a strict condition for making light absorption completely zero. If the condition is not perfect, in the case of $\Delta\omega_{23}\neq 0$, it is also possible to create the state of zero light absorption.

More specifically, when $\Delta\omega_{23}$ is about the quantity $\Omega\sim(\Omega_{12}^2+\Omega_{13}^2)^{1/2}$ determined by Rabe frequencies $\Omega_{12}$, $\Omega_{13}$, and in the absorption spectrum, a transparent region of width $\Omega$ is also formed.

Hence, when the system containing two pseudo-atoms is excited in the $\Lambda$ type, that $\Delta\omega_{23}$ satisfies the condition $$\Delta\omega_{23}\sim\Omega \tag{4}$$

contributes greatly to the enhancement of light transmission characteristic.

Let us next consider the condition for realizing zero light absorption simultaneously in N pseudo-atoms. The condition of N pseudo-atoms simultaneously satisfying $\Delta\omega_1=\Delta\omega_2$ is strictly as follows:

$$\omega_{23}(1)=\omega_{23}(2)=\omega_{23}(3)=\ldots=\omega_{23}(N) \tag{5}$$

To induce zero light absorption state simultaneously in N pseudo-atoms, it is required not to depend on the energy level of the highest level 1, and that the energy $\omega_{23}$ between two lower levels, level 2 and level 3, be equal in N pseudo-atoms.

However, in the case of N pseudo-atoms, too, if formula (5) is not strictly established, the state of zero light absorption can be created as far as the following conditions are established.

Herein, supposing the mean values of energy between levels concerning N pseudo-atoms to be $<\omega_{12}>$, $<\omega_{13}>$, and $<\omega_{23}>$, the standard deviation of energy between levels is introduced as follows:

$$\sigma_{12}=\{(1/N)\sigma[\omega_{12}(k)-<\omega_{12}>]^2\}^{1/2} \tag{6a}$$

$$\sigma_{13}=\{(1/N)\sigma[\omega_{13}(k)-<\omega_{13}>]^2\}^{1/2} \tag{6b}$$

$$\sigma_{23}=\{(1/N)\sigma[\omega_{23}(k)-<\omega_{23}>]^2\}^{1/2} \tag{6c}$$

Concerning the relation between $\Omega$ and $\sigma_{12}$, $\sigma_{13}$, $\sigma_{23}$, $\Omega$ is established in $\Omega\leq\sigma_{12}$, $\Omega\leq\sigma_{13}$, because the energy widths $\sigma_{12}$, $\sigma_{13}$ where the light absorption is zero on the spectrum correspond to the spectrum line widths of each transition.

From this formula and formulas (4) and (5), the condition of N pseudo-atoms satisfying $\Delta\omega_1=\Delta\omega_2$ simultaneously is given in the following formulas.

$$\sigma_{23}\leq\sigma_{12} \tag{7a}$$

$$\sigma_{23}\leq\sigma_{13} \tag{7b}$$

FIG. 6A and FIG. 6B schematically show the condition for realizing zero light absorption simultaneously in multiple pseudo-atoms. In the diagrams, the axis of ordinates denotes $\omega_1$ and the axis of abscissas is $\omega_2$, and the points in the diagram express the energy differences $\omega_{12}$, $\omega_{13}$ between level 1 and level 2, and between level 1 and level 3 of each pseudo-atom.

As shown in FIG. 6A, when the dispersion of $\omega_{23}$ is small in each pseudo-atom and energy $\omega_{12}$ and $\omega_{13}$ between levels distribute along 45-gradient line on a plane ($\omega_1$, $\omega_2$), it is possible to realize the state of zero light absorption simultaneously in all pseudo-atoms by two laser beams.

That is, when $\omega_2-\omega_1$ and $\omega_{23}$ are equal to each other, the light can be passed completely if there is any big energy dispersion between level 1 and level 2, and between level 1 and level 3.

This condition $\omega_2-\omega_1=\omega_{23}$ does not depend on the absolute values of light energy $\omega_1$, $\omega_2$, and therefore the state of zero light absorption can be induced in all light energy $\omega_1$, $\omega_2$.

Furthermore, as shown in FIG. 6B, if there is distribution in $\omega_{23}$ when a region of distribution of energy between levels $\omega_{12}$, $\omega_{13}$ is present on the plane ($\omega_1$, $\omega_2$) only in part, it is also possible to create the state of zero light absorption for the light of light energy $\omega_1$, $\omega_2$ equal to the energy $\omega_{12}$, $\omega_{13}$ in that region.

Hence, also in the system containing multiple pseudo-atoms, it is understood that satisfaction of $\sigma_{23} \leq \sigma_{12}$, $\sigma_{23} \leq \sigma_{13}$ in formula (7) contributes greatly to enhancement of modulation characteristic of light signal.

(2) In the case of V type excitation (relating to the second optical element in the first aspect, and third and fourth optical elements in the second aspect)

In V type excitation, unlike Λ type excitation, is satisfying $\Delta\omega_1 = \Delta\omega_2$, the light absorption is not strictly zero, and it is a feature that it shows a point infinitely closer to zero.

First, same as in the case of Λ type excitation, let us suppose to emit two laser beams with light energy of $\omega_1$, $\omega_2$ between level 2 and level 3, and between level 1 and level 3, concerning two pseudo-atoms m, n.

Supposing the difference of light energy $\omega_1$, $\omega_2$ and energy between levels $\omega_{23}$, $\omega_{13}$ to be respectively $\Delta\omega_1 = \omega_1 - \omega_{23}$, $\Delta\omega_2 = \omega_2 - \omega_{13}$, the conditions of two pseudo-atoms simultaneously satisfying the condition of $\Delta\omega_1 = \Delta\omega_2$ are as follows:

$$\omega_1 - \omega_{23}(m) = \omega_2 - \omega_{13}(m) \tag{8a}$$

$$\omega_1 - \omega_{23}(n) = \omega_2 - \omega_{13}(n) \tag{8b}$$

Since the energy between levels $\omega_{12}$ between level 1 and level 2 is expressed as $\omega_{12} = \omega_{13} - \omega_{23}$, formulas (8a) and (8b) can be rewritten as follows.

In this way, to realize the EIT by Λ type excitation in the solid, it is indispensable to select a system small in distribution of energy between level 1 and level 2.

$$\omega_{12}(m) = \omega_{12}(n) \tag{9}$$

Hence, to satisfy $\Delta\omega_1 = \Delta\omega_2$ simultaneously by two pseudo-atoms to bring the light absorption closer to zero state, the required condition is that the energy $\omega_{12}$ between the upper two levels be equal between the two pseudo-atoms, not depending on the energy between levels $\omega_{23}$, $\omega_{13}$.

Hereinafter, in the same discussion as in the Λ type excitation, the conditions of N pseudo-atoms being simultaneously zero in absorption are expressed as follows.

$$\sigma_{12} \leq \sigma_{13} \tag{10a}$$

$$\sigma_{12} \leq \sigma_{23} \tag{10b}$$

FIGS. 7A and 7B schematically show the energy distribution of pseudo-atoms for multiple pseudo-atoms to approach zero light absorption simultaneously in the case of V type excitation. In FIGS. 7A and 7B, the axis of ordinates denotes $\omega_1$, the axis of abscissas is $\omega_2$, and the points in the diagram show the energy difference $\omega_{23}$, $\omega_{13}$ between level 2 and level 3, and between level 1 and level 3 of each pseudo-atom.

As shown in FIG. 7A, when the dispersion of $\omega_{12}$ is small in each pseudo-atom and the energy $\omega_{23}$, $\omega_{13}$ between levels distribute along the 45-gradient line on the plane ($\omega_1$, $\omega_2$), the state of nearly zero light absorption can be realized simultaneously in the entire pseudo-atoms by two laser beams.

As shown in FIG. 7B, if there is dispersion in $\omega_{12}$, when a region of energy $\omega_{23}$, $\omega_{13}$ between levels distributing in the 45-gradient line is present partly on the plane ($\omega_1$, $\omega_2$), it is also possible to create the state of the light passing nearly completely for the light of $\omega_1$, $\omega_2$ equal to energy $\omega_{23}$, $\omega_{13}$ in the region. Thus, to realize the EIT by V type excitation in the solid, it is indispensable to select a system of small energy distribution between level 1 and level 2.

(3) In the case of Ξ type excitation (relating to the third optical element in the first aspect)

It is a feature of the type excitation that, unlike the Λ type excitation or V type excitation, the light absorption shows a value infinitely closer to zero when satisfying $\Delta\omega_1 = -\Delta\omega_2$.

First, same as in the two preceding cases of excitation, let us suppose to emit two laser beams with light energy of $\omega_1$, $\omega_2$ between level 1 and level 2, and between level 2 and level 3, concerning two pseudo-atoms p, q.

Supposing the difference of light energy $\omega_1$, $\omega_2$ and energy between levels $\omega_{12}$, $\omega_{23}$ to be respectively $\Delta\omega_1 = \omega_1 - \omega_{12}$, $\Delta\omega_2 = \omega_2 - \omega_{23}$, the conditions of two pseudo-atoms simultaneously satisfying the condition of $\Delta\omega_1 = \Delta\omega_2$ are as follows:

$$\omega_1 - \omega_{12}(p) = -\omega_2 + \omega_{23}(p) \tag{11a}$$

$$\omega_1 - \omega_{12}(q) = -\omega_2 + \omega_{23}(q) \tag{11b}$$

Since the energy between levels $\omega_{13}$ between level 1 and level 3 is expressed as $\omega_{13} = \omega_{12} + \omega_{23}$, formulas (11a) and (11b) can be rewritten as follows.

$$\omega_{13}(p) = \omega_{13}(q) \tag{12}$$

It is the condition that the energy $\omega_{12}$ between lower levels be equal in two pseudo-atoms.

Thereafter, in the same discussion as in Λ type, the conditions of N pseudo-atoms simultaneously becoming zero in light absorption are obtained as follows.

$$\sigma_{13} \leq \sigma_{12} \tag{13a}$$

$$\sigma_{13} \leq \sigma_{23} \tag{13b}$$

FIG. 8A and FIG. 8B schematically show the energy distribution of pseudo-atoms for multiple pseudo-atoms to approach zero light absorption simultaneously in the case of Ξ type excitation. In FIGS. 8A and 8B, the axis of ordinates denotes $\omega_1$, the axis of abscissas is $\omega_2$ and the points in the diagram show the energy difference $\omega_{12}$, $\omega_{23}$ between level 1 and level 2, and between level 2 and level 3 of each pseudo-atom.

As shown in FIG. 8A, when the dispersion of $\omega_{13}$ is small in each pseudo-atom and the energy $\omega_{12}$, $\omega_{23}$ between levels distribute along the 45-gradient line on the plane ($\omega_1$, $\omega_2$), the state of nearly zero light absorption can be realized simultaneously in the entire pseudo-atoms by two laser beams.

As shown in FIG. 8B, if there is dispersion in $\omega_{13}$, when a region of energy $\omega_{12}$, $\omega_{23}$ between levels distributing in the 45-gradient line is present partly on the plane ($\omega_1$, $\omega_2$), it is also possible to create the state of the light passing nearly completely for light of $\omega_1$, $\omega_2$ equal to energy $\omega_{12}$, $\omega_{23}$ in the region. Thus, to realize the EIT by Ξ type excitation in the solid, it is indispensable to select a system of small energy distribution between level 1 and level 3.

So far, relating to the cases of Λ type, V type, and Ξ type excitation, it is discussed how the EIT characteristic of the pseudo-atom system varies depending on the standard deviation of energy between levels, and especially it is disclosed that a perfect EIT is expressed, regardless of presence or absence of uneven spread in the case of having a specific energy distribution.

Now, what is important is the method of selecting a material system having such specific energy distribution on the plane ($\omega_1$, $\omega_2$), or the method of creating a material system having such distribution.

Among the pseudo-atom system mentioned above, below are explained the method of selecting a system having a specific energy distribution by using the impurity atom system (the first to fifth optical elements according to the first aspect), the method of selecting a system having a specific distribution by using the quantum structure (the sixth to ninth optical elements according to the first aspect), and the method of creating a system having a specific distributing using an outer field such as electric field, magnetic field, and pressure (the optical elements according to the second aspect).

(A) EIT in impurity atom system

As mentioned above, to realize an EIT in the solid, it is indispensable to select a system of small energy distribution between level 2 and level 3 in Λ type excitation, a system of small energy distribution between level 1 and level 2 in V type, and a system of small energy distribution between level 1 and level 3 in Ξ type.

Herein, let us notice d→d transition of transition metal ion known in calculation of energy level by Tanabe and Sugano.

In this transition, the levels are roughly classified into those hardly change in energy level when the magnitude of crystal field is varied by symmetricity, and others changed significantly.

Moreover, at the level strongly depending on the crystal field, it is known that the uneven spread in the spectrum is broad, while the uneven spread is small, to the contrary, at the level of small change. It means that the uneven spread is attributable to drift of crystal field in d→d transition.

In f→f, f→d transition of rare earth ions listed as one of pseudo-atom systems, a similar analysis is attempted about changes of level energy on the crystal field.

Hence, by considering the symmetricity of levels, it is possible to set three levels most suited to excitation types of Λ type, V type and Ξ type, by using the solid materials containing transition metal ions or rare earth ions capable of obtaining information about distribution of energy between levels.

In the invention, meanwhile, as the impurity, particularly noticing transition metal ions with 2 to 8 d atoms, it is defined to equalize the electron configurations of second level and third level in the case of Λ type excitation, electron positions of first level and second level in the case of V type excitation, and electron configurations of first level and third level in the case of Ξ type excitation. Depending on the manner of selecting the electron configurations, the distribution of energy between levels increases. The reason is stated below.

FIG. 9 schematically shows transition metal ions having d electrons enclosed cubic symmetrically by six ligands, that is, transition metal ions placed in a cubic symmetrical crystal field.

In the case of action of Coulomb force field only by atomic nucleus without crystal field, considering also electron spin, the energy level of d electrons is degenerated tenfold. With crystal field, on the other hand, as shown in FIG. 10, the tenfold degenerated energy level is split into sixfold degenerated $T_{2g}$ level and fourfold degenerated $E_g$ level. That is, the transition metal ion having one d electron is, when placed in a cubic symmetrical crystal field, degradation is partly thawed, and it is split into $T_{2g}$ level of basal state and $E_g$ level of excitation state.

Meanwhile, the magnitude of level splitting by crystal field is expressed by 10 Dq. Herein, D is $35e/(4a)^5$, and q refers to the intrinsic quantity of the crystal field defined as $q=(2e/105) <r>^4$, and e is crude electric charge, a is the distance between metal transition ion and ligand, and $<r>^4$ is the mean of $r^4$ at the d radius vector function expressed in the following formula, $R_d(r)$. In FIG. 10, symbols $T_{2g}$ and $E_g$ are conventional expressions meaning level symmetry.

$<r>^4 = |R_d(r)|^2 Xr^4 Xr^2 dr$

Herein, taking note of the wave function of each split level, since $T_{2g}$ level is sixfold degeneration, there are six wave functions, and since $E_g$ level is fourfold degeneration, there are four wave functions. Generally, six wave functions in intrinsic state of $T_{2g}$ level are collectively called $t_{2g}$ orbit, and four wave functions in intrinsic state of $E_g$ level are collectively called $e_g$ orbit.

The magnitude of the energy level of transition metal ion having n pieces ($n \geq 2$) of d electrons depends largely on how these n electrons are distributed between the two orbits, in terms of $t_{2g}$ orbit and $e_g$ orbit in the case of one element above.

Supposing n=2, let us assume an electron configuration $(t_{2g})^2$ having both two electrons on $t_{2g}$ orbit, and an electron configuration $(t_{2g})(e_g)$ having one electron each on $t_{2g}$ orbit and $e_g$ orbit.

First, in the case of electron configuration $(t_{2g})^2$, there are states $_6C_2=15$ as many as the number of methods of selecting two orbits occupied by two electrons out of six $t_{2g}$ orbits. Herein, considering the Coulomb mutual action acting between two electrons, the electron configuration $(t_{2g})^2$ is split into four levels as shown in FIG. 11. In FIG. 11, $A_{1g}$, $T_{2g}$, $E_g$, and $T_{1g}$, are conventional expressions representing the level symmetry.

What is important in this level splitting is that the magnitude of level splitting does not depend on the quantity 10 Dq specific to the crystal field splitting, but is determined only by the Coulomb mutual action between electrons. Therefore, the energy among four levels is not basically changed if the size 10 Dq of the crystal field varies.

In the case of electron configuration $(t_{2g})(e_g)$, as shown in FIG. 12, it is split into four levels. In FIG. 12, $T_{1g}$ and $T_{2g}$ are conventional expressions denoting level symmetry. The magnitude of splitting, similarly, does not depend on 10 Dq, but is determined only by Coulomb mutual action between electrons. Therefore, same as in the case of electron configuration $(t_{2g})^2$, the energy among four levels is not basically changed if the magnitude 10 Dq of the crystal field varies.

Supposing transition from electron configuration $(t_{2g})^2$ to electron configuration $(t_{2g})(e_g)$, since this transition is a one-electron transition for lifting one electron from $t_{2g}$ orbit to $e_g$ orbit, between levels having identical spin multiplicity, transition from $(t_{2g})^2$ to $(t_{2g})(e_g)$ may be induced by light (spin allowable transition).

Therefore, light absorption occurs from $^3T_{1g}$ level (spin multiplicity=3) of electron configuration $(t_{2g})^2$ in the basal state to $^3T_{1g}$ level, $^3T_{2g}$ level (both spin multiplicity=3) of electron configuration $(t_{2g})(e_g)$.

This transition is basically a transition between orbits $t_{2g}$ and $e_g$ being split in the crystal field, and the energy between levels depends greatly on the magnitude 10 Dq of the crystal field. Hence, if there is distortion or the like in the crystal, 10 Dq fluctuates in every site, and it is predicted that the energy between levels may differ significantly in every transition metal ion.

In the present material system, regarding the light absorption of transition from $(t_{2g})^2$ to $(t_{2g})(e_g)$, the spectrum of broad line width is often obtained. Therefore, generally, the transition from $(t_{2g})^2$ to $(t_{2g})(e_g)$ is known to be optically allowable and large in distribution of energy between levels.

By contrast, considering the transition from $^3T_{1g}$ level of electron configuration $(t_{2g})^2$ in the basal state to $^1A_{1g}$ level, $^1E_g$ level, and $^1E_{2g}$ level belonging to the same electron configuration $(t_{2g})^2$ (all in spin multiplicity=1), in this transition, it is known that only spin inversion occurs. Such transition is optically banned (spin ban transition). Moreover, as mentioned above, between levels of same electron configuration, not depending on the magnitude 10 Dq of energy between levels, it is determined only by the Coulomb mutual action between electrons. From these facts, generally, it is known that the transition between levels having same electron configuration is optically banned, and is small in the energy distribution between levels.

Hence, in the case of n=2, as specified in the invention, the condition relating to the optical elements of the first aspect of the invention may be directly realized in the material system in the basal state, by selecting the material system in which the electron configuration of second level and electron configuration of third level are equal to each other, being $(t_{2g})^2$ and the electron configuration of first level is different from the second and third electron configuration, being $(t_{2g})(e_g)$, in Λ type excitation; the material system in which the electron configuration of first level and second electron configuration are equal to each other, being $(t_{2g})(e_g)$, and the electron configuration of third level is different from first and second electron configuration, being $(t_2g)^2$, in V type excitation; and the material system in which the electron configuration of first level and third electron configuration are equal to each other, being $(t_{2g})^2$, and the electron configuration of second level is different from first and third electron configuration, being $(t_{2g})(e_g)$, in Ξ type excitation.

In the case of n=3 to 8, same as in the case of n=2, as specified in the invention, the condition relating to the optical elements of the first aspect of the invention may be directly realized in the material system in the basal state, by selecting the material system in which the electron configuration of second level and electron configuration of third level are equal to each other, and the electron configuration of first level is different from the second and third electron configuration, in Λ type excitation; the material system in which the electron configuration of first level and second electron configuration are equal to each other, and the electron configuration of third level is different from first and second electron configuration, in V type excitation; and the material system in which the electron configuration of first level and third electron configuration are equal to each other, and the electron configuration of second level is different from first and third electron configuration, in Ξ type excitation.

In the invention, moreover, as the impurity, in particular, noticing rare earth ions with number of f electrons being n=1 to 13, in the case of Λ type excitation, level 2 and level 3 have identical electron configuration $(f)^n$, and level 1 has a different electron configuration $(f)^{n-1}(d)$, and in the case of V type excitation, level 1 and level 2 have identical electron configuration $(f)^{n-1}(d)$, and level 3 has a different electron configuration $(f)^n$.

When selecting three levels by mixing electron configuration $(f)^n$ and electron configuration $(f)^{n-1}(d)$, the distribution of energy between levels varies significantly depending on the manner of selection thereof, of which reason is as follows.

In the actual material system, $(f)^n \rightarrow (f)^n$ transition, and $(f)^{n-1}(d) \rightarrow (f)^{n-1}(d)$, prior $(d)^n \rightarrow (d)^n$ transition are generally allowable transitions between levels differing in symmetry to the crystal field, and although the energy distribution between levels is large, the transition is banned between levels equal or similar in symmetry, and hence the energy distribution between levels is known to be small.

By contrast, $(f)^n \rightarrow (f)^{n-1}(d)$ transition is a generally allowable transition, and since the d electron orbit is related same as in the transition metal ion, it is known that the energy distribution between levels is known to be large, reflecting the fluctuations of crystal field.

Incidentally, comparing the vibrator strength relating to light excitation of $(f)^n \rightarrow (f)^{n-1}(d)$ transition, and vibrator strength between two levels differing in level symmetry optically allowable particularly among $(f)^n \rightarrow (f)^n$ transitions, generally, the $(f)^n \rightarrow (f)^{n-1}(d)$ transition is greater by plural digits.

Accordingly, when selecting three levels by interweaving electron configuration $(f)^n$ and electron configuration $(f)^{n-1}(d)$, without having to consider the level symmetry of electron configuration $(f)^n$, in particular, the $(f)^n \rightarrow (f)^n$ transition is, as compared with $(f)^n \rightarrow (f)^{n-1}(d)$ transition, it is sufficiently banned optically and small in energy distribution between levels.

Hence, the condition relating to the optical elements of the first aspect of the invention may be realized, by selecting two levels out of electron configuration $(f)^n$ for levels 2 and 3, and one level out of electron configuration $(f)^{n-1}(d)$ for level 1 in Λ type excitation, and two levels out of electron configuration $(f)^{n-1}(d)$ for levels 1 and 2, and one level out of electron configuration $(f)^n$ for level 3 in V type excitation.

(B) EIT in quantum structure system

On the other hand, the energy level formed in the quantum structure such as quantum well, quantum wire and quantum box generally varies significantly depending on its size, shape, potential depth, etc.

Herein, first showing the magnitude of the energy level the electron can take in a single quantum well, then, on the basis thereof, the distribution of each energy level in N quantum wells, and magnitude of uneven spread of energy between levels are shown.

For the sake of simplicity, meanwhile, the quantum well is represented by the linear quantum well enclosed by an infinite potential barrier as shown in FIG. 13, but the nature of the discussion is not changed in other quantum structure, for example, the linear quantum well, quantum wire, quantum box enclosed by finite potentials.

The electron state in the quantum well with width L shown in FIG. 13 can be determined by using the Schrödinger equation. The energy level appearing in the quantum well is expressed as $$E_n = (h^2/8m^*)(n/L)^2 \qquad (14)$$

where $E_n$ is energy eigenvalue, n is the quantum number (n=1, 2, 3, . . . ), and m* is effective mass of electron. Noticing n-th level, it is known that its energy depends extremely on the value of L, that is, the size of the quantum well.

Suppose there are N quantum wells as shown in FIG. 13. In this case, if all quantum wells are completely identical, energy fluctuation of energy does not occur at any level.

In the present element fabricating technology of semiconductor process, however, precise fine processing of atomic order is difficult.

Hence, actually, the energy level has certain fluctuations. Herein, supposing the size L of the quantum well fluctuates from (L+ΔL) to (L−ΔL), let us estimate how much width is produced in the n-th level energy $E_n$.

Meanwhile, the difference $\Delta E_n$ of maximum value $E_n$(max) of $E_n$ at (L−ΔL) and minimum value $E_n$(min) at (L+ΔL) is supposed to express the width of distribution of $E_n$. From formula (14), $\Delta E_n$ is expressed as $$\Delta E_n = E_n [4L^3 \times \Delta L/(L^2 - \Delta L^2)^2] \tag{15}$$

Formula (15) suggests that fluctuations of level are larger when the energy of greater quantum number n is higher.

Let us now discuss uneven spread of energy between levels. Supposing the difference between level of quantum number m and level of quantum number n to be $E_{nm}$ (n>m), the width of distribution is considered. Same as in the case above, assuming the size L of the quantum well varies from (L+ΔL) to (L−ΔL), if the difference $\Delta E_{nm}$ of maximum value $E_{nm}$(max) of $E_{nm}$ and minimum value $E_{nm}$(min) expresses the distribution width, $\Delta E_{nm}$ is $$\Delta E_{nm} = E_{nm} [4L^3 \times \Delta L/(L^2 - \Delta L^2)^2] \tag{16}$$

As known from formula (16), the uneven spread of the energy between levels in N quantum wells increases as the magnitude of energy between levels becomes larger.

From these points, it is possible to set the condition relating to the first and second optical elements of the first aspect of the invention, that is, to set the Λ type or V type three-level system of extremely small uneven spread between two levels not coupled with light, only by selecting two lowest energy levels (two levels small in quantum number) for level 2 and level 3, and high energy level (level large in quantum number) for level 1, as shown in FIG. 15A and FIG. 16A, or selecting two lowest energy levels (two levels small in quantum number) for level 1 and level 2, and high energy level (level large in quantum number) for level 3, as shown in FIG. 14B, FIG. 15B, and FIG. 16B.

FIG. 14A, relating to the quantum well made of semiconductor (semiconductor quantum well), shows a case of exciting three levels, selecting one from conductive band and two from valence band, in Λ type, and FIG. 14B, relating to the semiconductor quantum well, shows a case of exciting three levels, selecting two from conductive band and one from valence band, in V type.

FIG. 15A, relating to the semiconductor quantum well, shows a case of exciting three levels selected from conductive band in Λ type, and FIG. 15B, relating to the semiconductor quantum well, shows a case of exciting three levels selected from valence band in V type.

FIG. 16A, relating to the quantum well made of metal (metal quantum well), shows a case of light exciting three levels, selecting two from the levels formed in the higher energy region than Fermi level and one from the levels formed in the lower energy region than Fermi level, in Λ type, and FIG. 16B, relating to the metal quantum well, shows a case of light exciting three levels, selecting two from the levels formed in the lower energy region than Fermi level and one from the levels formed in the higher energy region than Fermi level, in V type.

In FIG. 15A and FIG. 16A, electrons are injected into the quantum well by doping donor type impurity into the constituent material of the quantum barrier, and in FIG. 15B and FIG. 16B, holes are injected in the quantum well by doping acceptor type impurity into the constituent material of the quantum barrier.

(C) EIT by outer field excitation

Explained next is a method of creating a material system having such specific energy distribution on the plane ($\omega_1$, $\omega_2$).

As one of such techniques, a method is known to create a material system small in the uneven spread between levels not linked by light out of three levels, by adding an outer field, such as electric field, magnetic field, and pressure to the pseudo-atoms in the solid mentioned below.

As stated hereabove, candidates of pseudo-atom system used in the optical elements of the invention include impurity atom systems such as transition metal atoms and rare earth atoms dispersed in the crystal, superlattice of semiconductor, quantum wire, quantum box, and other quantum structure, and these impurity atom systems and quantum structures have discrete energy levels same as atom gases.

The energy levels of atom gas have been already investigated closely by both calculation and experiment, and it is known that there are many degenerated levels having same energy in plural levels.

On the other hand, as for impurity levels of transition metal atoms and rare earth atoms dispersed in the crystal, it is also known that there are multiple degenerated levels, as known in the calculation by Tanabe and Sugano, and from the level diagram of transition metal impurities or level diagram of rare earth impurities compiled by G. H. Dieke.

As shown in FIG. 17A and FIG. 17B, by solving the degenerated impurity level by the outer field such as electric field, magnetic field, and pressure, and utilizing two levels thereof as the two levels not coupled by light, there is a small uneven spread between these two levels, and it is possible to set a Λ type or V type three-level system having a favorable EIT characteristic.

As the phenomena of splitting levels by solving the degeneration by outer field, the Starck effect of inducing splitting by electric field, Zeeman effect by magnetic field, and Yarn-Taylor effect by pressure are known.

Although a magnitude of level split according to Starck effect or Zeeman effect is depend on the magnitude of outer field, generally, it is known to be smaller than 1 cm$^{-1}$.

Therefore, the uneven spread between two split levels seems to have a smaller value. Actually, estimating the magnitude of uneven spread from the reported literature of Starck effect and Zeeman effect, it is known that there are many material systems showing very small uneven spread or 0.01 cm$^{-1}$ or less in Starck effect, and 0.0001 to 0.1 cm$^{-1}$ in Zeeman effect.

As known from these points, by adding an outer field to the degenerated impurity level in the crystal, it is expected to create a Λ type or V type three-element system of very small uneven spread between two levels not coupled by light.

So far, concerning the impurity atoms and quantum structure, a method of selecting a material system having specific energy distribution easy to express the EIT on the plane ($\omega_1$, $\omega_2$) and a method of creating a material system having such distribution are discussed.

By such material searching methods, the EIT in the solid is realized, but not limited to this, various optical elements can be realized on the basic principle of EIT, such as light modulation element and LWI laser.

According to the first aspect of the invention, as stated above, by satisfying the condition formula about the standard deviation of energy between levels discovered for the first time by the present inventors, even if there is a large fluctuation in the energy level in the solid, extinction of light absorption on the basis of EIT is induced simultaneously in almost all impurities or quantum structures, so that the optical elements of practical level with the basic principle of quantum coherence may be realized.

According to the second aspect of the invention, by creating the material satisfying the condition first discovered by the inventors, if there is a large fluctuation in the energy level in the solid, extinction of light absorption on the basis of EIT is induced simultaneously in almost all impurities or quantum structures, so that the optical elements of practical level with the basic principle of quantum coherence may be realized.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 8A to 8B are diagrams for explaining the condition required in energy between levels in which multiple pseudo-atoms in a pseudo-atom group are excited in $\Xi$ type and simultaneously become zero in light absorption;

FIG. 9 is a diagram schematically showing transition metal ion having one d electron placed in a cubic symmetrical crystal field;

FIG. 10 is a diagram showing energy level of transition metal ion having one d electron placed in a crystal field;

FIGS. 16A and 16B are quantitative energy band diagrams showing the relation of three levels and two light beams formed in a different quantum well;

FIG. 22 is a diagram showing light absorption spectrum of $Cr^{3+}$ investigated while varying the light energy of signal light in a fixed state of light energy of gate light, in the case of using $Cr^{3+}$ dispersed $Al_2O_3$ as the material for the EIT layer of the light modulating element in FIG. 18;

FIG. 23 is a diagram showing energy level of $Er^{3+}$ dispersed in $LiYF_4$;

FIG. 24 is a diagram showing light absorption spectrum of $Er^{3+}$ investigated while varying the light energy of signal light in a fixed state of light energy of gate light, in the case of using $Er^{3+}$ dispersed $LiYF_4$ as the material for the EIT layer of the light modulating element in FIG. 18;

FIG. 32 is a diagram showing the electric field intensity dependence of energy between levels $^3H_4(a)$ and $^3H_4(b)$ among energy levels of $Pr^{3+}$ impurity in $Pr^{3+}$; $LaCl_3$ used as the EIT layer in the light modulating element in the seventh embodiment;

FIG. 33 is a diagram showing results of investigation of light absorption spectrum of $Pr^{3+}$ impurity while varying light energy $\omega_2$ in a fixed state of light energy $\omega_1$ in the light modulating element in the seventh embodiment;

FIG. 34 is a diagram showing energy level of $Eu^{3+}$ impurity in $Eu^{3+}$; $Y_2O_3$ used as the EIT layer in a light modulating element in an eighth embodiment;

FIG. 35 is a diagram showing the electric field intensity dependence of energy between levels $^5D_1(a)$ and $^5D_1(b)$ among energy levels of $Eu^{3+}$ impurity in $Eu^{3+}$; $Y_2O_3$ used as the EIT layer in the light modulating element in the eighth embodiment;

FIG. 38 is a diagram showing the electric field intensity dependence of energy between levels $^5D_1(a)$ and $^5D_1(b)$ among energy levels of $Sm^{2+}$ impurity in $Sm^{2+}$; BaClF used as the EIT layer in the light modulating element in the ninth embodiment;

FIG. 39 is a diagram showing results of investigation of light absorption spectrum of $Sm^{2+}$ impurity while varying light energy $\omega_2$ in a fixed state of light energy $\omega_1$ in the light modulating element in the ninth embodiment;

FIG. 40 is a diagram schematically showing a light modulating element in a tenth embodiment of the invention;

FIG. 41 is a diagram showing energy level of $Er^{3+}$ impurity in $Er^{3+}$; $Y_3Al_5O_{12}$ used as the EIT layer in the light modulating element in the tenth embodiment;

FIG. 42 is a diagram showing the electric field intensity dependence of energy between levels $^4I_{15/2}(a)$ and $^4I_{15/2}(b)$ among energy levels of $Er^{3+}$ impurity in $Er^{3+}$; $Y_3Al_5O_{12}$ used as the EIT layer in the light modulating element in the tenth embodiment;

FIG. 43 is a diagram showing results of investigation of light absorption spectrum of $Er^{3+}$ impurity while varying light energy $\omega_2$ in a fixed state of light energy $\omega_1$ in the light modulating element in the tenth embodiment;

FIG. 44 is a sectional view showing InAs/GaSb superlattice used as the EIT layer in a light modulating element in an eleventh embodiment;

FIG. 45 is a diagram showing a quantum well level in the InAs/GaSb superlattice the used as the EIT layer in the light modulating element in the eleventh embodiment;

FIG. 46 is a diagram showing magnetic field intensity dependence of level energy between Landau levels split from the levels, concerning E1 level in the InAs/GaSb superlattice the used as the EIT layer in the light modulating element in the eleventh embodiment;

FIG. 47 is a diagram showing results of investigation of light absorption spectrum of the InAs/GaSb superlattice while varying light energy $\omega_2$ in a fixed state of light energy $\omega_1$ in the light modulating element in the eleventh embodiment;

FIG. 52 is a diagram showing results of investigation of absorption spectrum from level 3 to level 1, while varying the light energy of single light, in a fixed state of light energy of gate light in the light modulating element in the thirteenth embodiment;

FIG. 53 is a sectional view showing InGaN/AlGaN superlattice used as the EIT layer in a light modulating element in a fourteenth embodiment;

FIG. 56 is a sectional view showing ZnSe/MgZnSeS superlattice used as the EIT layer in a light modulating element in a fifteenth embodiment;

FIG. 57 is a diagram showing quantum well level of the ZnSe/MgZnSeS superlattice used as the EIT layer in the light modulating element in the fifteenth embodiment;

FIG. 60 is a diagram showing quantum well level of the GaAs/AlGaAs superlattice used as the EIT layer in the light modulating element in the sixteenth embodiment;

FIG. 61 is a diagram showing results of investigation of absorption spectrum from level 3 to level 1, while varying the light energy of single light, in a fixed state of light energy of gate light in the light modulating element in the sixteenth embodiment;

FIG. 64 is a diagram showing results of investigation of absorption spectrum from level 3 to level 1, while varying the light energy of single light, in a fixed state of light energy of gate light in the light modulating element in the seventeenth embodiment;

FIG. 65 is a sectional view $Si/NiSi_2$ as the EIT layer in a light modulating element in an eighteenth embodiment;

FIG. 70 is a diagram schematically showing LWI laser in a twenty-first embodiment of the invention;

FIG. 71 is a diagram showing relation of energy level, control light, and pump light of the EIT layer of the LWI laser in FIG. 70;

FIG. 73 is a diagram showing results of investigation of LWI oscillation spectrum of the LWI laser in the twenty-first embodiment of the invention.

DETAILED DESCRIPTION OF THE PREFERRED EMBODIMENTS

Figure 1A:
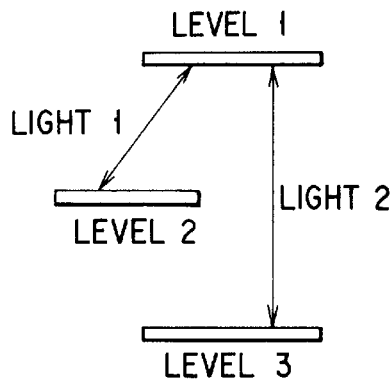
FIGS. 1A to 1C are diagrams for explaining the basic principle of EIT.
Figure 1B:
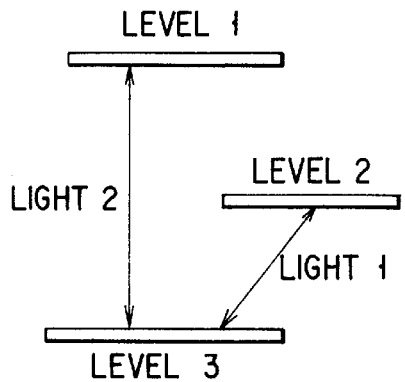
Figure 1C:
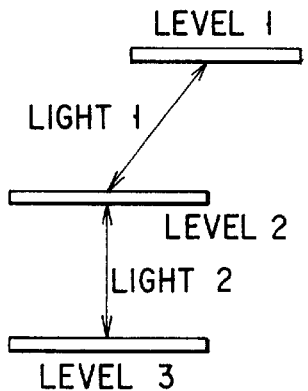
Figure 2A:
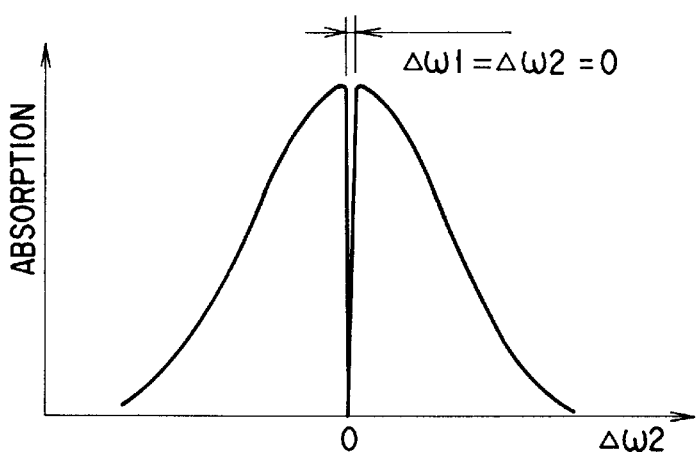
FIGS. 2A and 2B are diagrams showing the light absorption spectrum by EIT of atom gas.
Figure 2B:
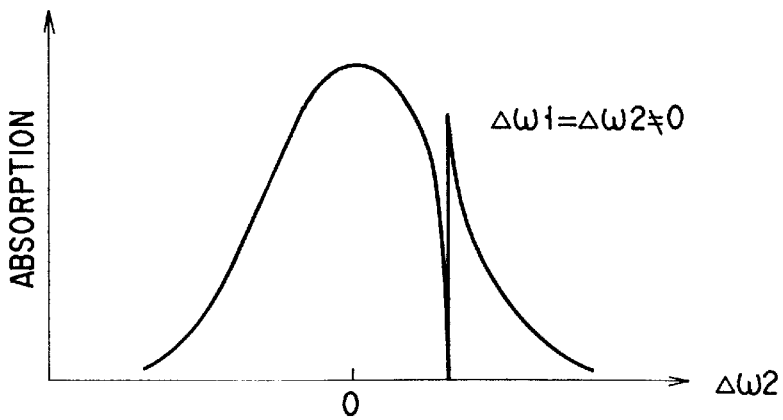
Figure 3A:
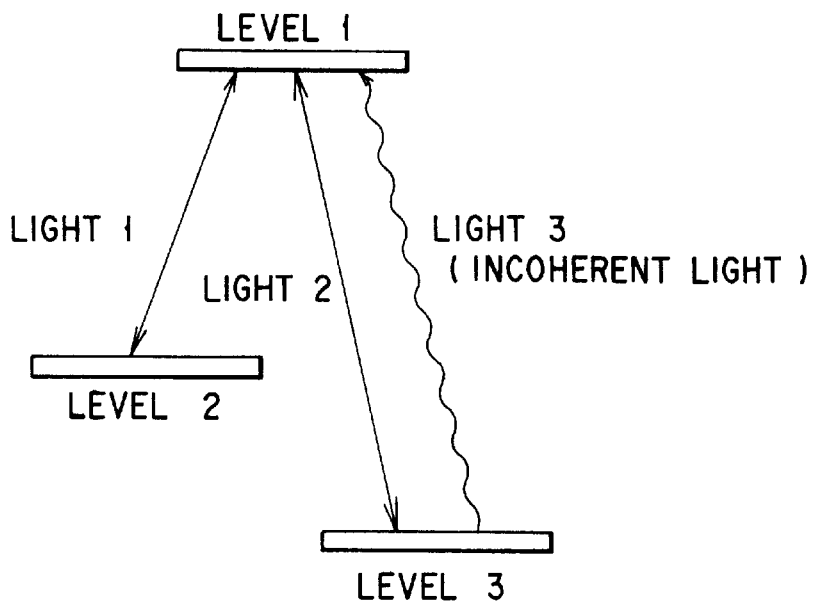
FIGS. 3A to 3C are diagrams for explaining the basic principle of LWI on the basis of quantum coherence.
Figure 3B:
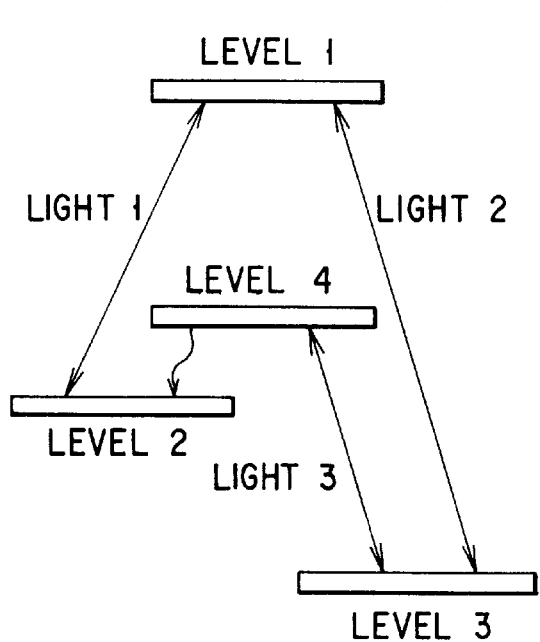
Figure 3C:
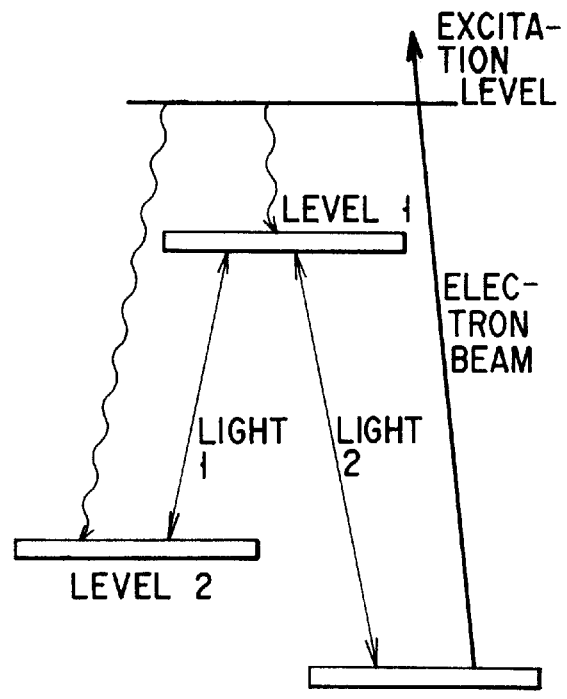
Figure 4A:
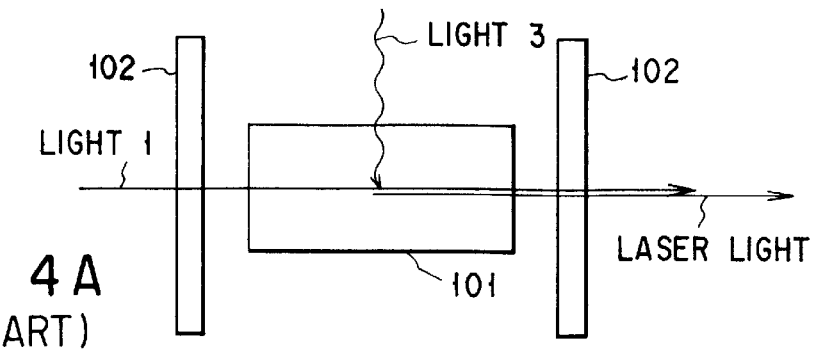
FIGS. 4A and 4B are diagrams for explaining the LWI laser on the basis of quantum coherence.
Figure 4B:
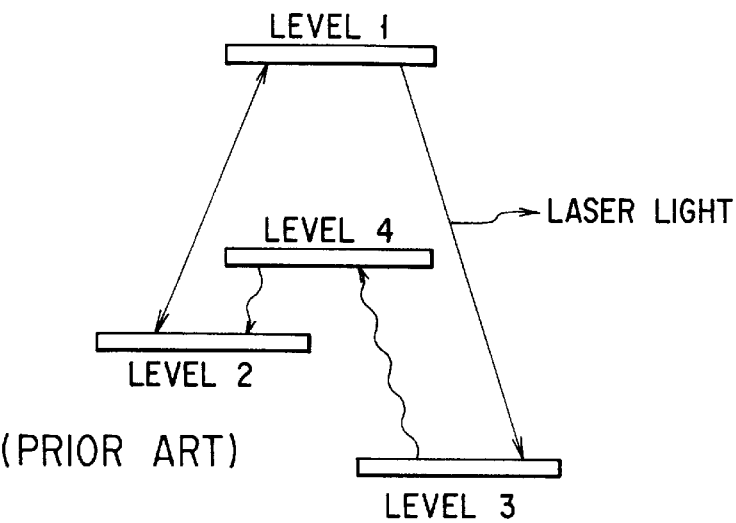
Figure 5A:
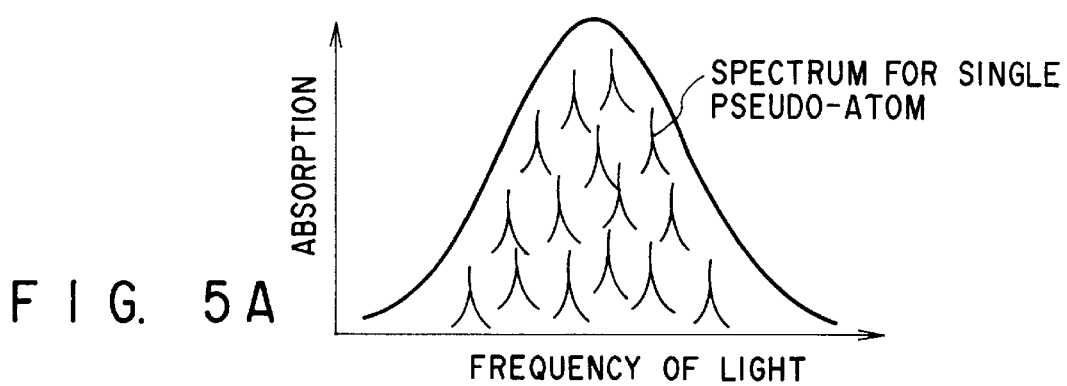
FIGS. 5A and 5B are diagrams for explaining the EIT characteristic predicted about pseudo-atom group large in energy between levels and distributed randomly.
Figure 5B:
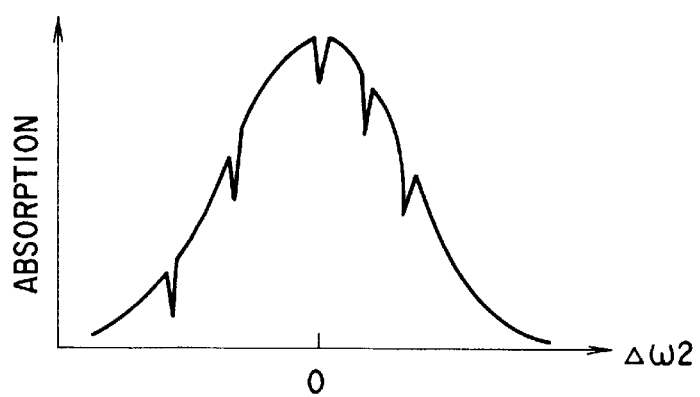
Figure 6A:
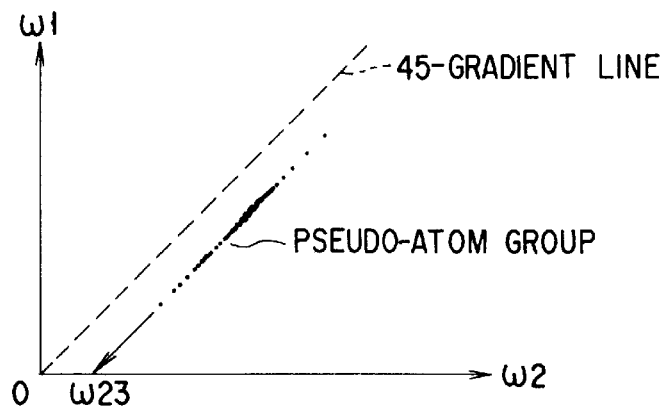
FIGS. 6A to 6B are diagrams for explaining the condition required in energy between levels in which multiple pseudo-atoms in a pseudo-atom group are excited in $\Lambda$ type and simultaneously become zero in light absorption.
Figure 6B:
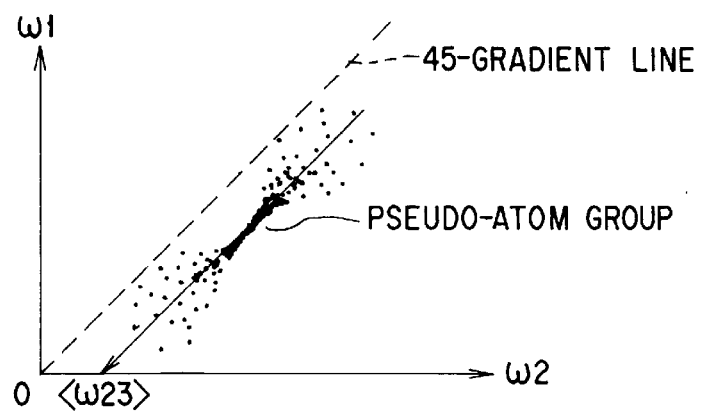
Figure 7A:
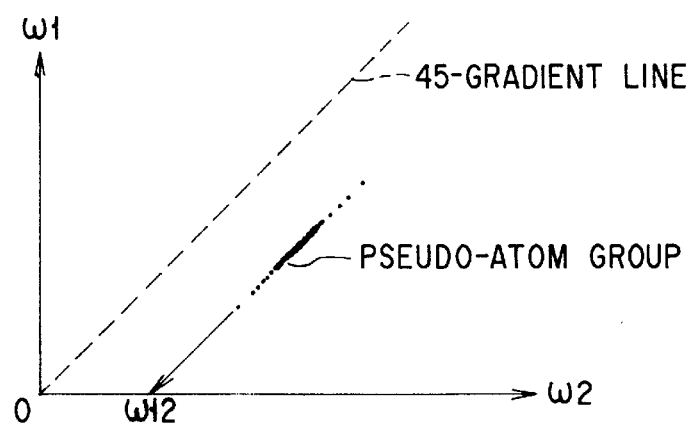
FIGS. 7A to 7B are diagrams for explaining the condition required in energy between levels in which multiple pseudo-atoms in a pseudo-atom group are excited in V type and simultaneously become zero in light absorption.
Figure 7B:
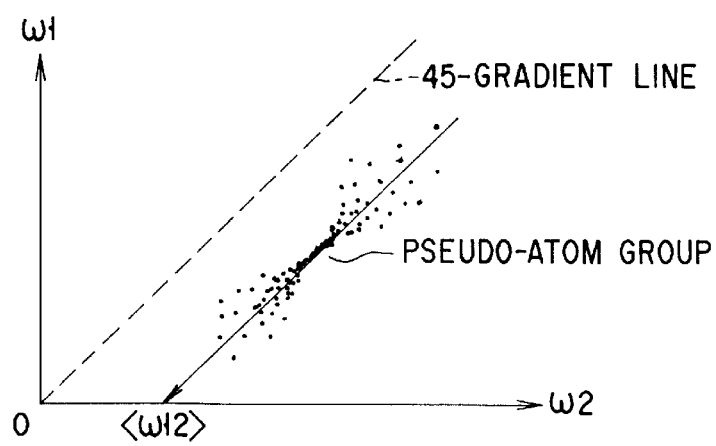
Figure 11:
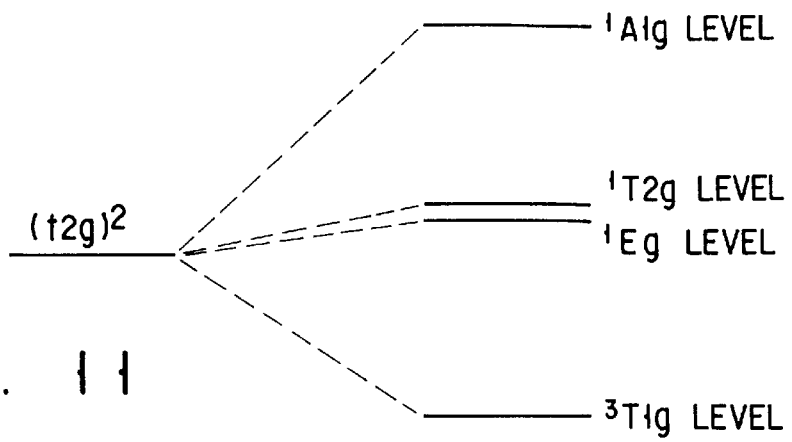
FIG. 11 is a diagram showing energy level of electron configuration $(t_{2g})^2$.
Figure 12:
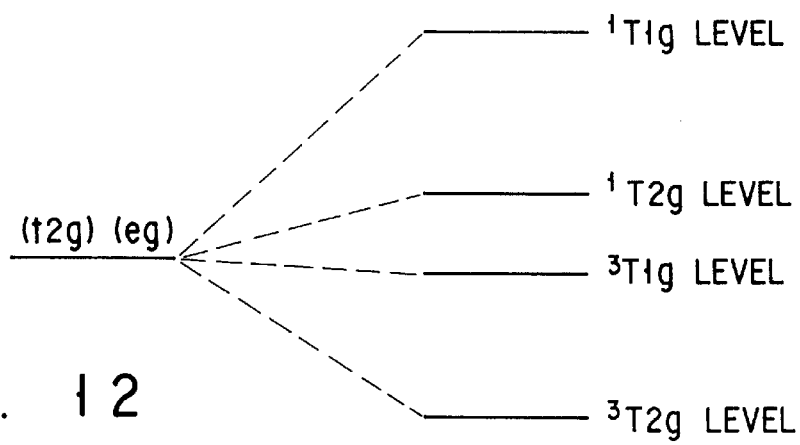
FIG. 12 is a diagram showing energy level of electron configuration $(t_{2g})(e_g)$.
Figure 13:
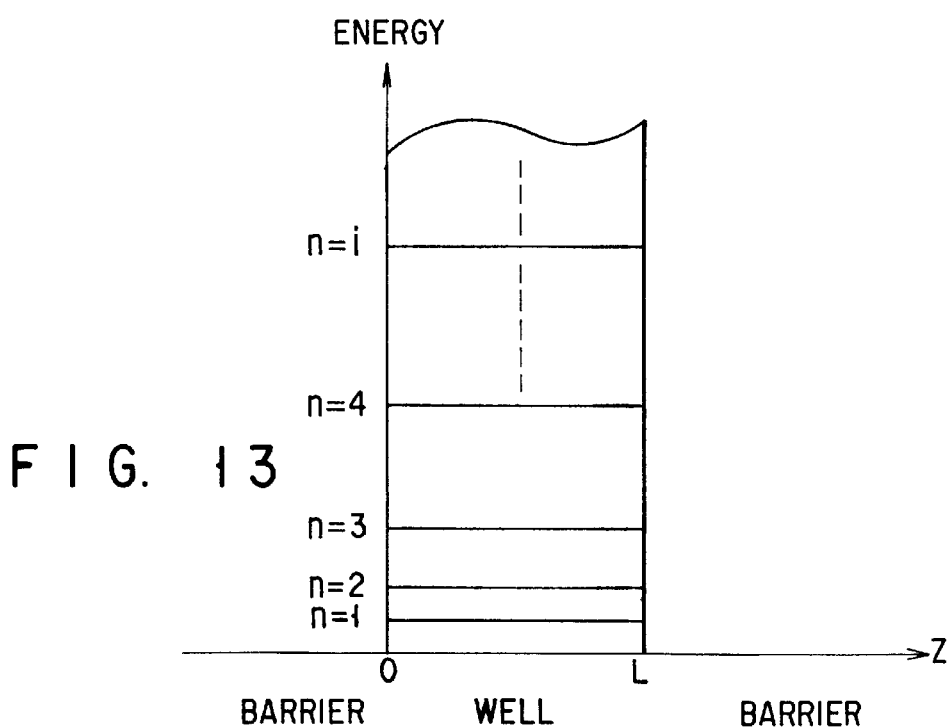
FIG. 13 is a diagram for quantitatively explaining discrete energy level that an electron can take in a linear quantum well of width L and infinite height.
Figure 14A:
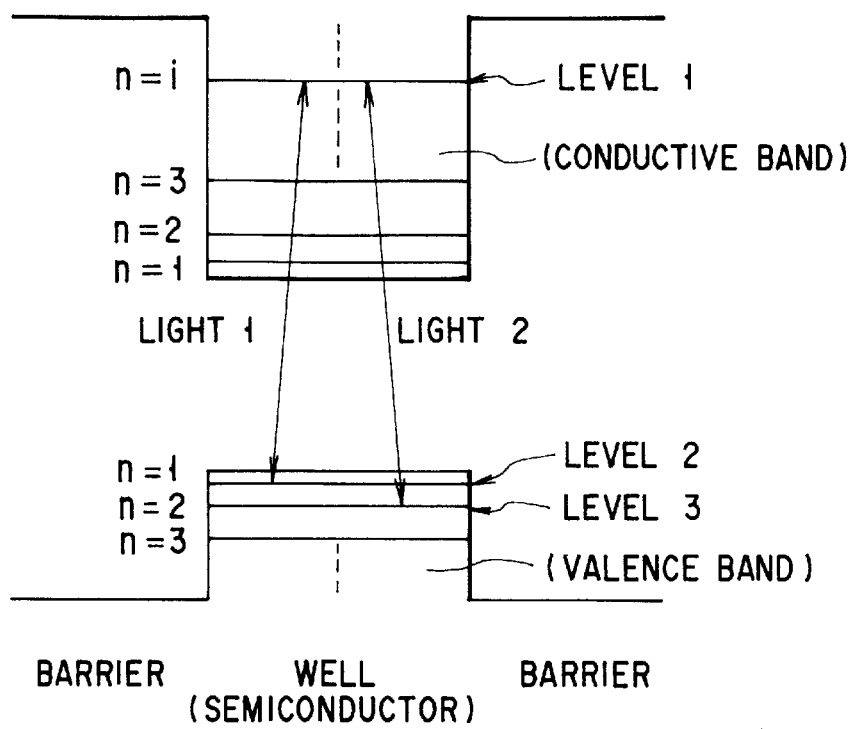
FIGS. 14A and 14B are quantitative energy band diagrams showing the relation of three levels and two light beams formed in a quantum well.
Figure 14B:
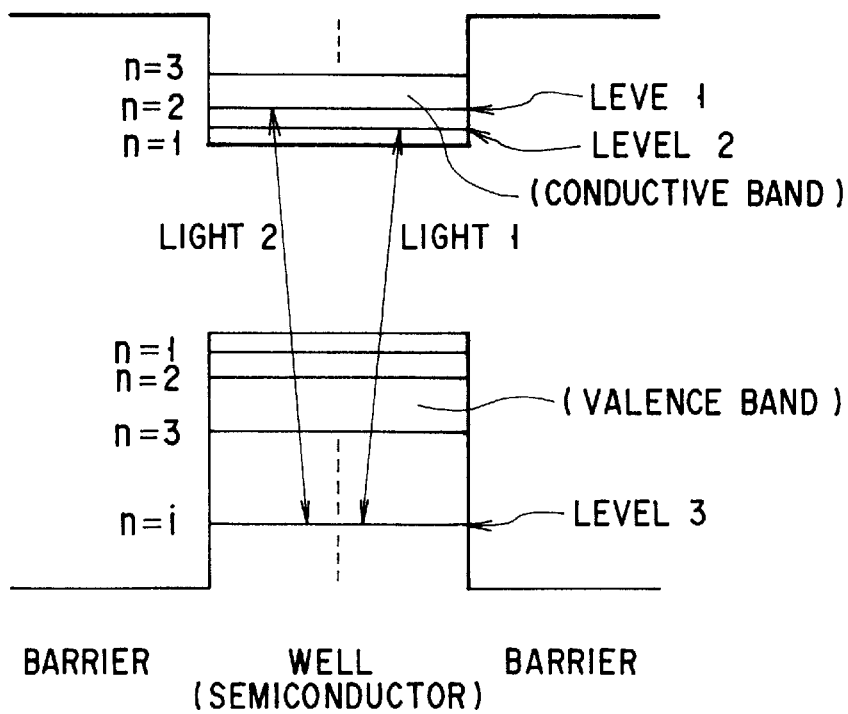
Figure 15A:
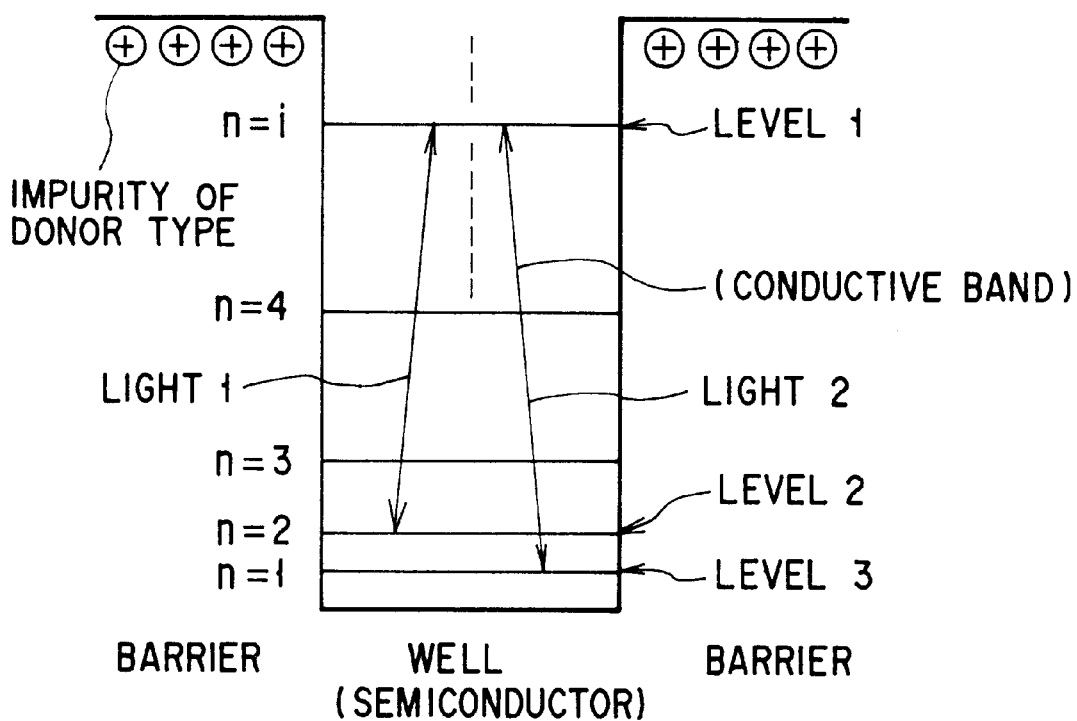
FIGS. 15A and 15B are quantitative energy band diagrams showing the relation of three levels and two light beams formed in other quantum well.
Figure 15B:
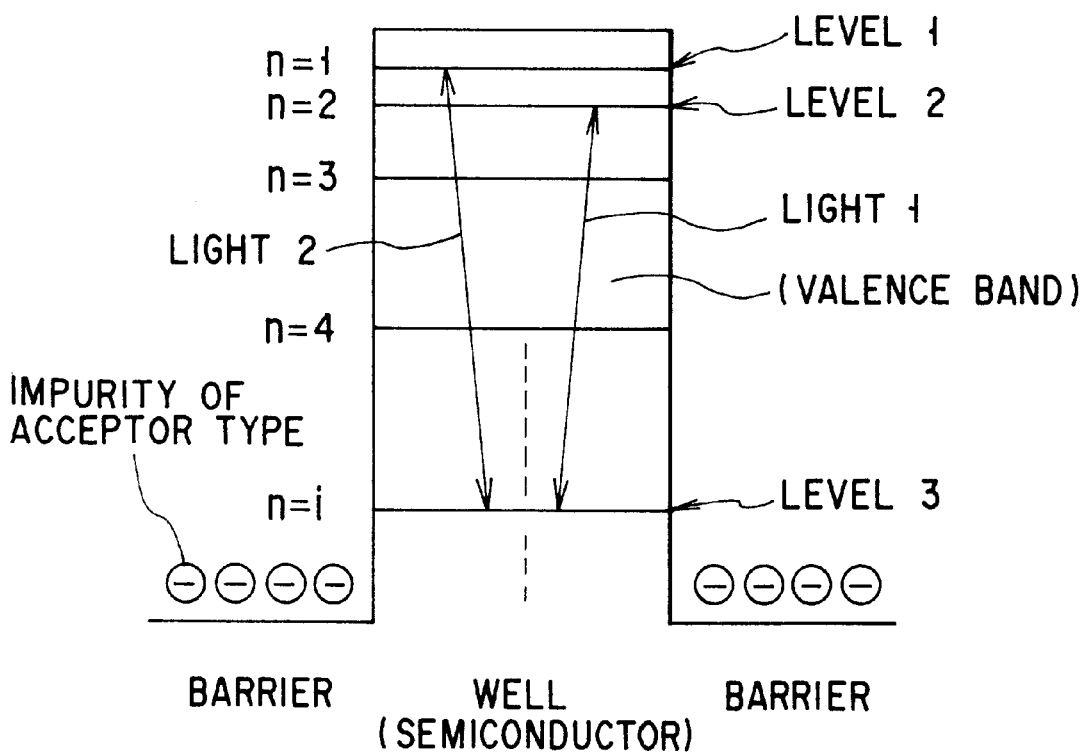
Figure 17A:
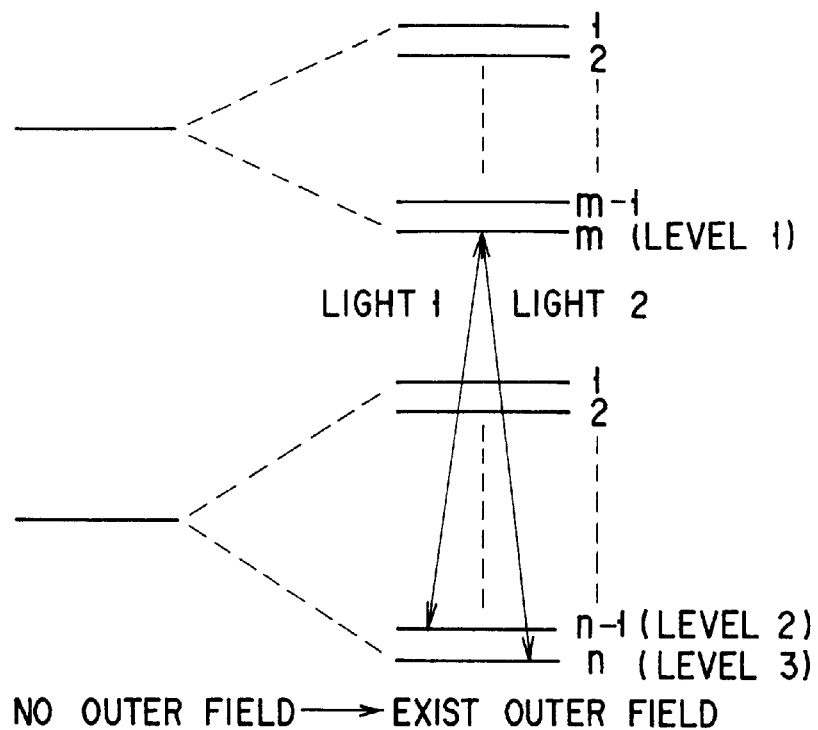
FIGS. 17A and 17B are diagrams schematically showing a mode of solving the degenerated impurity level in the solid by an outer field, and utilizing two levels thereof as two levels not coupled by light in $\Lambda$ type level or V type level.
Figure 17B:
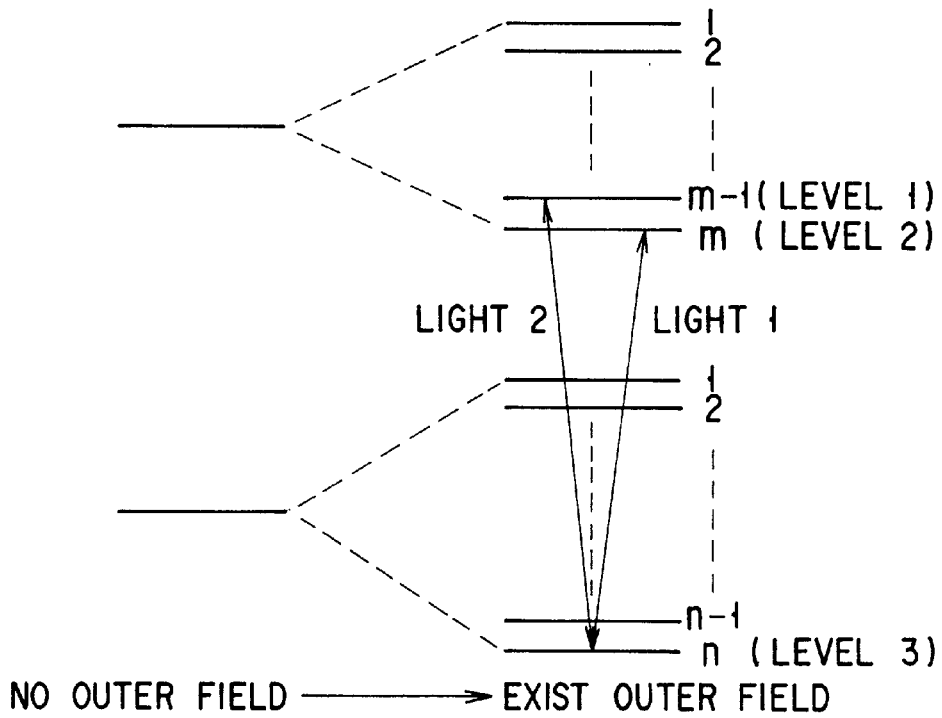

Referring now to the drawings, preferred embodiments of the invention are described in detail below.

First Embodiment

Figure 18:
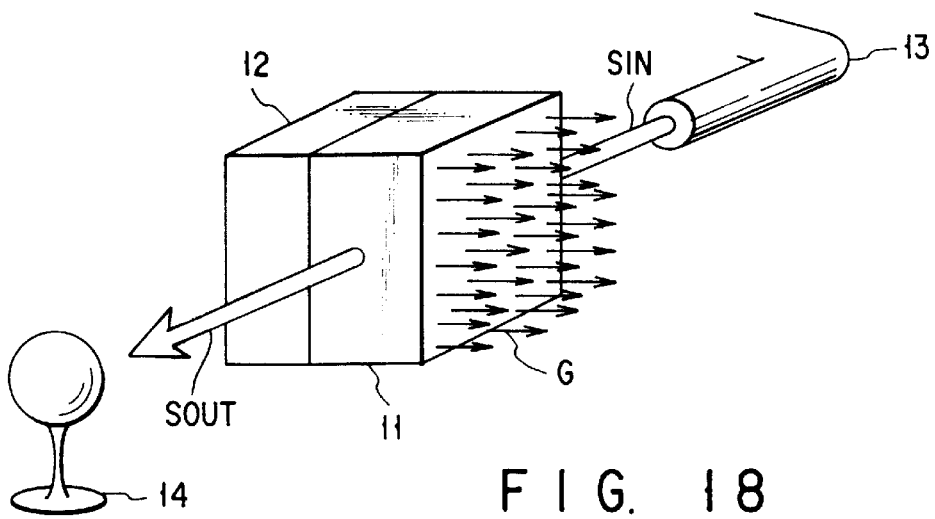
FIG. 18 is a schematic diagram showing the structure of a light modulation element in an embodiment of the invention.

FIG. 18 schematically shows a light modulating element according to a first embodiment of the invention.

This light modulating element is roughly composed of an EIT layer 11 which is a solid containing impurities for modulating the transmission intensity of signal light, a semiconductor laser 12 provided adjacently to this EIT layer 11 for feeding gate light G into the EIT layer 11, an optical fiber 13 for feeding input signal light $S_{in}$ into the EIT layer 11, and a photodiode 14 for measuring the intensity of the output signal light $S_{out}$ produced from the EIT layer 11. By the gate light G, the intensity of the output signal light $S_{out}$ is controlled.

Incidentally, the gate light G produced from the semiconductor laser 12 irradiates the entire EIT layer 11. The semiconductor laser is also used in the input signal light $S_{in}$.

Figure 19A:
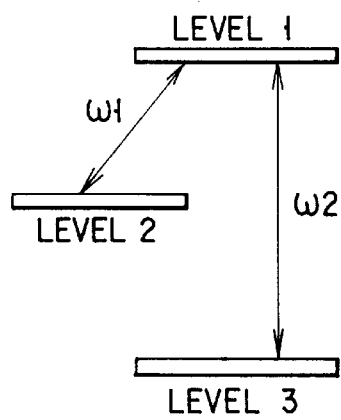
FIGS. 19A to 19C are diagrams showing the relation of energy level, gate light, and signal light in an EIT layer of the light modulating element in FIG. 18.

FIG. 19A to FIG. 9C schematically show the energy level in the EIT layer 11, gate light g (light energy $\omega_1$), and input signal light $S_{in}$ (light energy $\omega_2$).

In the case of Λ type excitation shown in FIG. 19, as the material used for the EIT layer 11, a system satisfying the conditions of $\sigma_{23} \leq \sigma_{12}$ and $\sigma_{23} \leq \sigma_{\_}$ should be selected, concerning the standard deviation $\sigma_{23}$ of energy between level 2 and level 3, with respect to standard deviation $\sigma_{12}$ of energy between level 1 and level 2, and standard deviation $\sigma_{13}$ of energy between level 1 and level 3.

The gate light G excites between level 1 and level 2, and the input signal light $S_{in}$ excites between level 1 and level 3. Moreover, selecting the center value of energy difference between level 2 and level 3 to be $\omega_{23}$, $\omega_1$ and $\omega_2$ should be selected so as to satisfy the relation of $\omega_2-\omega_1=\omega_{23}$.

In thus constituted light modulating element, while the EIT layer 11 is irradiated with both gate light G and input signal light $S_{in}$, the relation of $\Delta\omega_1=\Delta\omega_2$ is satisfied in most pseudo-atoms in the EIT layer 11.

Therefore, in the absence of gate light G, the input signal light $S_{in}$ is absorbed in the EIT layer 11 and hardly permeates, but in the presence of gate light G, absorption of input signal light $S_{in}$ in the EIT layer 11 is suppressed, so that a large output signal light $S_{out}$ is obtained.

Incidentally, the gate light G is not linked with level 3 which is initially in the basal state, and is virtually exciting between level 1 and level 2, and hence it is not absorbed in the EIT layer 11 but passes through. In consequence, in the EIT layer 11, regardless of the location, that is, in almost all impurities in the EIT layer 11, it is possible to modulate the input signal light $S_{in}$ (hereinafter called merely signal light).

Figure 19B:
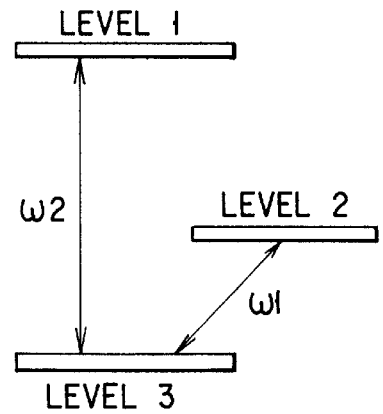

In the case of V type excitation shown in FIG. 19B, as the material used for the EIT layer 11, a system satisfying the conditions of $\sigma_{12} \leq \sigma_{13}$ and $\sigma_{12} \leq \sigma_{23}$ should be selected, concerning the standard deviation $\sigma_{12}$ of energy between level 1 and level 2, with respect to standard deviations $\sigma_{13}$ and $\sigma_{23}$ of energy between level 1 and level 3, and between level 2 and level 3.

In the V type excitation, different from the above Λ type excitation, all transitions are linked with level 3 in the basal state. Hence, in the V type excitation, the gate light G and input signal light $S_{in}$ may excited from either between level 1 and level 2 or between level 2 and level 3.

Suppose the gate light G to excite between level 2 and level 3 and the signal light between level 1 and level 3. Assuming light energy of gate light G and signal light to be respectively $\omega_1$ and $\omega_2$, and the center value of energy difference between level 1 and level 2 to be $\omega_{12}$, $\omega_1$ and $\omega_2$ are selected so as to satisfy the relation of $\omega_2-\omega_1=\omega_{12}$.

In thus constituted light modulating element, while irradiating the EIT layer 11 with both gate light G and signal light, the relation of $\Delta\omega_1=\Delta\omega_2$ is satisfied in most pseudo-atoms in the EIT layer 11.

Therefore, in the absence of gate light G, the signal light is absorbed in the EIT layer 11 and hardly permeates, but in the presence thereof, absorption of signal light in the EIT layer 11 is suppressed, so that a large output signal light is obtained.

In the V type excitation, the gate light G is also linked with level 3 in the basal state. Accordingly, in the absence of signal light, it is absorbed in the EIT layer 11, and the intensity of the gate light G varies depending on the location in the EIT layer 11. In the presence of signal light, the gate light G is not absorbed but passes through, so that the signal light can be modulated regardless of the location in the EIT layer 11 also in the V type excitation.

Figure 19C:
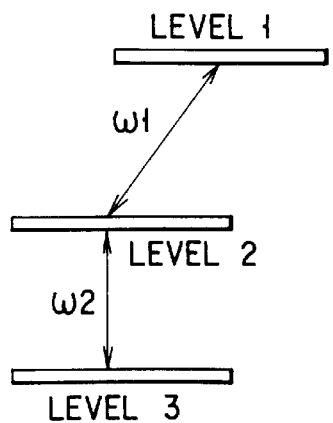

Furthermore, in the case of the Ξ type excitation shown in FIG. 19C, as the material used for the EIT layer 11, a system satisfying the conditions of $\sigma_{13} \leq \sigma_{12}$ and $\sigma_{13} \leq \sigma_{23}$ should be selected, concerning the standard deviation $\sigma_{13}$ of energy between level 1 and level 3, with respect to standard deviations $\sigma_{12}$ and $\sigma_{23}$ of energy between level 1 and level 2, and between level 2 and level 3.

The gate light G excites between level 1 and level 2 and the signal light between level 2 and level 3. Assuming light energy of gate light G and signal light to be respectively $\omega_1$ and $\omega_2$, and the center value of energy difference between level 1 and level 3 to be $\omega_{13}$, $\omega_1$ and $\omega_2$ are selected so as to satisfy the relation of $\omega_1+\omega_2=\omega_{13}$.

In thus constituted light modulating element, while irradiating the EIT layer 11 with both gate light G and signal light, the relation of $\Delta\omega_1=-\Delta\omega_2$ is satisfied in most pseudo-atoms in the EIT layer 11.

Therefore, in the absence of gate light G, the signal light is absorbed in the EIT layer 11 and hardly permeates, but in the presence thereof, absorption of signal light in the EIT layer 11 is suppressed, so that a large output signal light is obtained.

The gate light G is not linked with level 3 which is initially in the basal state, and is virtually exciting between level 1 and level 2, and hence it is not absorbed in the EIT layer 11 but passes through. In consequence, in the EIT layer 11, regardless of the location, it is possible to modulate the signal light.

In actual estimation of standard deviation of energy between levels, first concerning two electron transitions responsible for light excitation out of three levels, since the two transitions are both allowable transitions, it is estimated by assuming that the half amplitude level of the spectrum peak observed by light absorption or fluorescence measurement is equal to the standard deviation of energy between levels.

In the transition without light excitation, since the transition is banned in principle, and it is hard to observe by ordinary light absorption or fluorescence measurement, but by using two photon absorptions or the like, also in this transition, it is possible to determine experimentally the standard deviation of energy between levels.

Second Embodiment

This embodiment is a more specific example of the light modulating element shown in FIG. 18. That is, in this embodiment, the material for the EIT layer 11 is $Al_2O_3$ dispersing 1 mol % of $Cr^{3+}$ as impurity. The light source of the optical fiber 13 is a pigment laser, and the photodiode 14 is a silicon photodiode.

Figure 20:
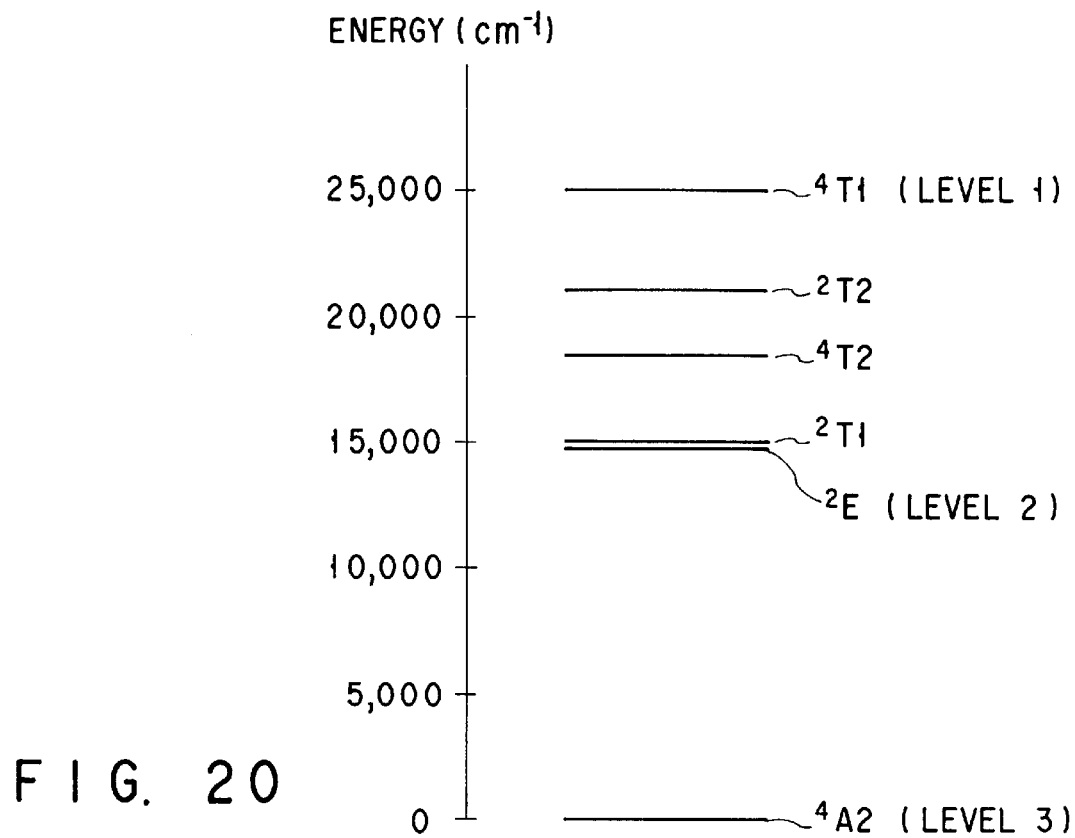
FIG. 20 is a diagram showing energy level of $Cr^{3+}$ dispersed in $Al_2O_3$.

As three energy levels, energy levels of $Cr^{3+}$ impurity in $Al_2O_3$ are used, and specifically, as shown in FIG. 20, the highest level 1 is $^4A_1$ level containing two electrons on $t_{2g}$ orbit and one on $e_g$ orbit, and the middle level 2 and lowest level 3 are receptively $^2E$ level and basal level of $^4A_2$ level containing three electrons on $t_{2g}$ orbit.

Incidentally, $^4A_1$, $^2E$ and $^4A_2$ are conventional expressions representing the symmetry of each level. From the crystal field theory, both $^4A_2 \rightarrow ^4A_1$ transition and $^2E \rightarrow ^4A_1$ transition are both allowable transitions, and further since the fluctuation of the crystal field is sensibly reflected, the spectral line width of light absorption, etc. spreads uniformly, and it is known that the variation of energy between levels is significant.

By contrast, the $^4A_2 \rightarrow ^2E$ transition is a forbidden transition, and it is sensible to the fluctuation of crystal field, and hence the spectral line width is weak and sharp, and the variation of energy between levels is known to be small.

Figure 21:
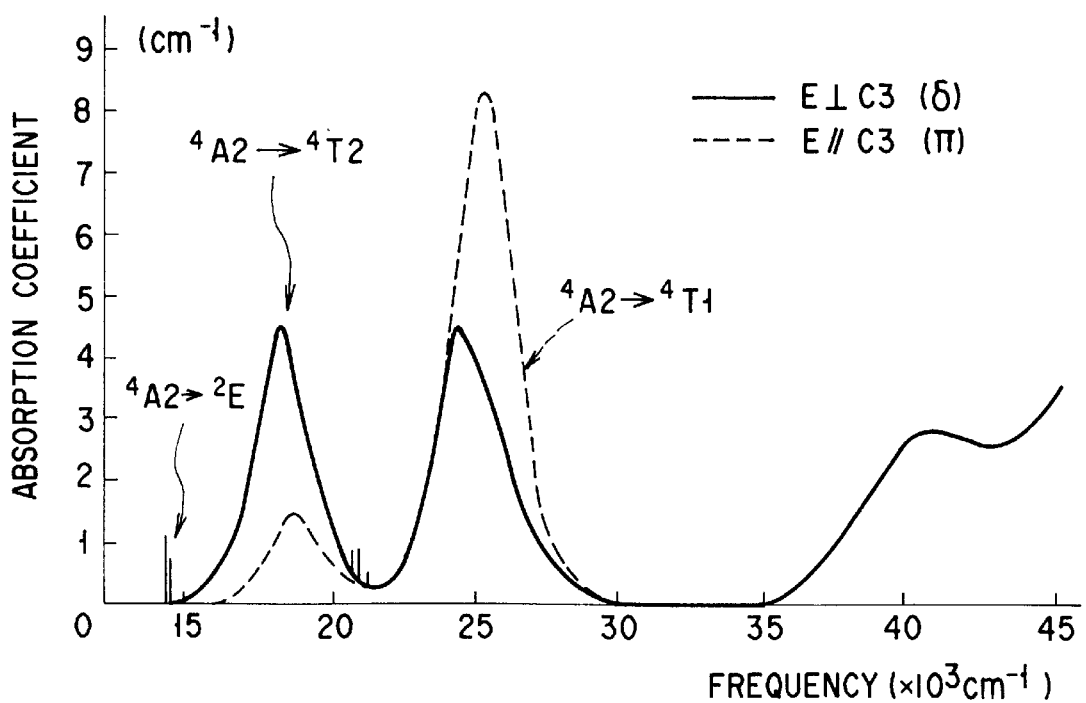
FIG. 21 is a diagram showing light absorption spectrum of $Cr^{3+}$ dispersed in $Al_2O_3$.

FIG. 21 is a diagram showing the light absorption spectrum of $Cr^{3+}$ in $Al_2O_3$. In FIG. 21, the broad absorption having the peak near 25000 $cm^{-1}$ corresponds to $^4A_2 \rightarrow ^4A_1$ transition from level 3 to level 1. The standard deviation $\sigma_{23}$ of energy between level 2 and level 3 estimated from the half amplitude level of light absorption peak is 2000 to 3000 $cm^{-1}$.

Incidentally, the very sharp and weak absorption having the peak near 15000 $cm^{-1}$ corresponds to $^4A_2 \rightarrow ^2E$ transition from level 3 to level 2. The standard deviation $\sigma_{23}$ between level 2 and level 3 is 0.1 to 1 $cm^{-1}$, which is about four digits smaller than $\sigma_{13}$ between level 1 and level 3.

Concerning $^2E \rightarrow ^4A_1$ transition, since the electron distribution is zero, the standard deviation $\sigma_{12}$ between level 1 and level 2 cannot be determined from the light absorption spectrum, and from TANABE-SUGANO DIAGRAM, it is known to have a nearly same value as $\sigma_{13}$ between level 1 and level 3.

Considering these points, in the light modulating element of the embodiment, concerning the above three levels, the light was excited in $\Lambda$ type between levels $^4A_2$ and $^4A_1$, and between levels $^2E$ and $^4A_1$. The light energy $\omega_1$ of the gate light G was selected to correspond to $^2E \rightarrow ^4A_1$ transition between level 1 and level 2, and the light energy $\omega_2$ of signal light was selected to correspond to $^4A_2 \rightarrow ^4A_1$ transition between level 1 and level 3.

The light energy $\omega_1$ and $\omega_2$ at this time were adjusted so that $\omega_2-\omega_1$ might coincide with the center value (14419 $cm^{-1}$) of the energy between level 2 and level 3. The intensity of the gate light G was 0.1 W, and the intensity of signal light entering the EIT layer was 1 mW.

In this element structure, the transmission light intensity of signal light was investigated in the presence and absence of gate light G.

In the absence of gate light G, in the first place, the signal light was absorbed in the EIT layer 11, and the output intensity of signal light decreased to about 9% of the input.

Next, when irradiated with gate light G, an output intensity of about 75% was obtained as compared with the input, and it was confirmed that the signal light was more likely to pass as compared with the case of absence of gate light G.

FIG. 22 shows results of investigating absorption spectrum from level 3 to level 1, while varying the light energy $\omega_2$ of signal light, in a fixed state of light energy $\omega_1$ of gate light G. In this case, the light energy $\omega_1$ of gate light G is 9030 $cm^{-1}$.

It is known from FIG. 22 that the light absorption of $\omega_2$ decreases significantly near the light energy 23449 $cm^{-1}$ where $\omega_2-\omega_1$ (about 14419 $cm^{-1}$) coincides with the center value of the energy between level 2 and level 3. It is hence understood that this phenomenon is derived from the EIT.

Incidentally, it has been proposed to realize the LWI in the solid by using the $Cr^{3+}$ impurity in this $Al_2O_3$ (Y. Zhu et al., Phys. Rev. A49, 4016, 1994).

According to Y. Zhu et al., of the three levels, $^2E$ level is used in level 1, $^4A_2$ ($|\pm 1/2>$) level out of $^4A_2$ level in level 2, and $^4A_2$ ($|\pm 3/2>$) level out of $^4A_2$ level in level 3. By exciting theses three levels in $\Xi$ type and further exciting the electrons coherently from level 3 to level 1, laser oscillation is induced between level 1 and level 2, and they reported that the LWI was realized also in the solid.

As mentioned above, supposing the standard deviations of energy between level 1 and level 2, between level 1 and level 3, and between level 2 and level 3 to be respectively $\sigma_{12}$, $\sigma_{13}$, and $\sigma_{23}$, to induce the EIT by $\Xi$ type excitation, the standard deviation $\sigma_{13}$ between level 1 and level 3 must satisfy the condition of $\sigma_{13} \leq \sigma_{12}$ and $\sigma_{13} \leq \sigma_{23}$.

Of the three levels selected by Y. Zhu et al., $\sigma_{13}$ of $^4A_2$ ($|\pm 3/2>$)$\rightarrow ^2E$ transition between level 1 and level 3 is 0.1 to 1 $cm^{-1}$. On the other hand, concerning $^4A_2$ ($|\pm 3/2>$)$\rightarrow ^4A_2$ ($|\pm 1/2>$) transition between level 2 and level 3, it is known that $\sigma_{23}$ is smaller than 0.1 $cm^{-1}$ from the experiment of electron spin resonance, etc. Therefore, in the three levels selected by Y. Zhu, in the case of $\Xi$ type excitation, the relation is $\sigma_{13}>\sigma_{23}$, and it is extremely difficult to induce EIT. Hence, to realize the EIT in the solid, it is known that the three levels must be selected by first understanding the magnitude (standard deviation) of fluctuation of energy between levels among the transitions.

COMPARATIVE EXAMPLE 1

Using a light modulating element in the same constitution as in the second embodiment except that $^4T_2$ level was used instead of $^2E$ level as level 2, and that accordingly the light energy $\omega_1$ of the gate light G was changed to that corresponding to $^4T_2 \rightarrow ^4A_1$ transition between level 1 and level 2, the transmission light intensity of signal light was investigated in the presence or absence of gate light G. Incidentally, $\omega_2-\omega_1$ was adjusted to 18000 $cm^{-1}$.

First, in the absence of gate light G, same as in the second embodiment, the output intensity of the signal light was decreased to about 9% of the input.

In the case of irradiation with gate light G, different from the second embodiment, the output intensity as compared with the input was also about only 9%. In this comparative example, therefore, it was found that the signal light hardly passes regardless of presence or absence of gate light G.

The broad absorption observed near the light absorption spectrum 18000 cm$^{-1}$ shown in FIG. 21 corresponds to $^4A_2 \rightarrow ^4T_2$ transition between level 2 and level 3. This spectrum spread is also derived from the uneven spread, and $\sigma_{23}$ between level 2 and level 3 estimated from the half amplitude level of light absorption is 2000 to 3000 cm$^{-1}$.

Since $^4T_2 \rightarrow ^4A_1$ transition between level 1 and level 2 is zero in electron distribution, it does not appear in the absorption spectrum in FIG. 21, but it is predicted to be a weak and sharp spectral line according to TANABE-SUGANO DIAGRAM.

It means that $\sigma_{12}$ between level 1 and level 2 is by far smaller than $\sigma_{13}$ and $\sigma_{23}$ between level 1 and level 3 and between level 2 and level 3. In the $\Xi$ type excitation, it is required to select a system satisfying $\sigma_{23} \leq \sigma_{12}$ and $\sigma_{23} \leq \sigma_{13}$. Accordingly, in this comparative example, since $\sigma_{23}$ between level 2 and level 3 is extremely larger than $\sigma_{12}$ between level 1 and level 2, if irradiated with gate light G, it is understood that the signal light was hardly modulated.

Hence, to express the EIT in the solid, it is known necessary to select the levels for light excitation by sufficiently considering the magnitude relation about energy fluctuation between levels among transitions.

Third Embodiment

What the light modulating element of this embodiment differs from that of the second embodiment is that, in the light modulating element shown in FIG. 18, LiYF$_4$ dispersing 1 mol % of Er$^{3+}$ as impurity is used as the material for the EIT layer 11.

As three energy levels, impurity levels of Er$^{3+}$ in LiYF$_4$ were used, and as shown in FIG. 23, the highest level 1 was E1 level being split in the crystal field among $^4S_{3/2}$ level, the middle level 2 was Y1 level being split also in the crystal field among $^4I_{13/2}$ level, and the lowest level 3 was Z2 level being split also in the crystal field among $^4I_{15/2}$ level which is the basal level.

From the crystal field theory, the symmetry of $^4S_{3/2}$(E1) is $\Gamma_5$, and the symmetry of $^4I_{13/2}$(Y1) level and $^4I_{15/2}$(Z2) level is both $\Gamma_8$. Hence, $^4I_{15/2}$(Z2)$\rightarrow ^4S_{3/2}$(E1) transition between level 1 and level 3 is $\Gamma_8 \rightarrow \Gamma_5$, and $^4I_{13/2}$(Y1)$\rightarrow ^4S_{3/2}$(E1) transition between level 1 and level 2 is also $\Gamma_8 \rightarrow \Gamma_5$, and only $^4I_{15/2}$(Z2)$\rightarrow ^4I_{13/2}$(Y1) transition between level 2 and level 3 is $\Gamma_8 \rightarrow \Gamma_8$.

Table 1 shows selection rules of optical transition relating to level symmetry. The allowable and forbidden optical transitions shown in Table 1 all relate to electric dipole transition.

TABLE 1

| $\Gamma_i$ | $\Gamma_5$ | $\Gamma_6$ | $\Gamma_7$ | $\Gamma_8$ |
|---|---|---|---|---|
| $\Gamma_5$ | x | ○ | ○ | ○ |
| $\Gamma_6$ | ○ | x | ○ | ○ |
| $\Gamma_7$ | ○ | ○ | x | ○ |
| $\Gamma_8$ | ○ | ○ | ○ | x | x Forbidden
○ Allowable

It is known from Table 1 that $^4I_{15/2}$(Z2)$\rightarrow ^4S_{3/2}$(E1) transition between level 1 and level 3 and $^4I_{13/2}$(Y1)$\rightarrow ^4S_{3/2}$(E1) transition between level 1 and level 2 are allowable transitions. By contrast, $^4I_{15/2}$(Z2)$\rightarrow ^4I_{13/2}$(Y1) transition between level 2 and level 3 is a forbidden transition.

As known from the results, in $^4I_{13/2}$(Y1)$\rightarrow ^4S_{3/2}$(E1) transition and $^4I_{15/2}$(Z2)$\rightarrow ^4S_{3/2}$(E1) transition, the absorption intensity is strong, and the spectral line width spreads unevenly reflecting the fluctuation of crystal field, and the standard deviations $\sigma_{12}$ and $\sigma_{13}$ of energy between levels are both predicted to be large, whereas in $^4I_{15/2}$(Z2)$\rightarrow ^4I_{13/2}$(Y1) transition, the absorption intensity is weak, and variation of energy between level by the crystal field is small, so that $\sigma_{23}$ has a small value.

Accordingly, in the light modulating element of the embodiment, in these three levels, the light was excited in $\Lambda$ type between levels $^4I_{15/2}$(Z2) and $^4S_{3/2}$(E1), and between levels $^4I_{13/2}$(Y1) and $^4S_{3/2}$(E1).

The light energy $\omega_1$ of gate light G was selected to correspond to $^4I_{13/2}$(Y1)$\rightarrow ^4S_{3/2}$(E1) transition between level 1 and level 2, and the light energy $\omega_2$ of signal light was selected to correspond to $^4I_{15/2}$(Z2)$\rightarrow ^4S_{3/2}$(E1) transition between level 1 and level 3. At this time, the light energy $\omega_1$ and $\omega_2$ were adjusted so that $\omega_2 - \omega_1$ might coincide with the center value (6517 cm$^{-1}$) of level between level 2 and level 3. The intensity of gate light G was 1 W, and the intensity of signal light entering the EIT layer was 1 mW.

In thus constituted light modulating element, the transmission light intensity of signal light was investigated in the presence and absence of gate light G.

In the absence of gate light G, the signal light was absorbed by the EIT layer 11, and the output intensity of signal light decreased to about 11% of the input.

When irradiated with gate light G, the output intensity was about 81% of the input, and as compared with the case of absence of gate light G, it was confirmed that the signal light was more likely to pass through.

FIG. 24 shows results of investigation of absorption spectrum from level 3 to level 1, while varying the light energy $\omega_2$ of signal light in a fixed state of light energy $\omega_1$ of gate light G. The light energy $\omega_1$ of gate light G was 11898 cm$^{-1}$.

It is known from FIG. 24 that the light absorption of $\omega_2$ is decreased significantly near 18415 cm$^{-1}$ where $\omega_2 - \omega_1$ (about 6517 cm$^{-1}$) coincides with the center value of energy between level 2 and level 3. Hence, it is understood that this phenomenon is derived from the EIT.

COMPARATIVE EXAMPLE 2

Using a light modulating element in the same constitution as in the third embodiment except that $^4I_{13/2}$(Y2) level was used instead of $^4I_{13/2}$(Y1) level as level 2, and that accordingly the light energy $\omega_1$ of the gate light G was changed to that corresponding to $^4I_{13/2}$(Y2)$\rightarrow ^4S_{3/2}$(E1) transition between level 1 and level 2, the transmission light intensity of signal light was investigated in the presence or absence of gate light G. Incidentally, $\omega_2 - \omega_1$ was adjusted to 6521 cm$^{-1}$.

First, in the absence of gate light G, same as in the third embodiment, the output intensity of the signal light was decreased to about 11% of the input.

In the case of irradiation with gate light G, different from the third embodiment, the output intensity as compared with the input was also about only 15%. In this comparative example, therefore, it was found that the signal light hardly passes regardless of presence or absence of gate light G.

The symmetry of $^4I_{13/2}$(Y2) level is $\Gamma_5$. Hence, $^4I_{13/2}$(Y2)$\rightarrow ^4S_{3/2}$(E1) transition between level 1 and level 2 is $\Gamma_5 \rightarrow \Gamma_5$, and $^4I_{15/2}$(Z2)$\rightarrow ^4I_{13/2}$(Y2) transition between level 2 and level 3 is $\Gamma_8 \rightarrow \Gamma_5$. Using these results and the findings in Table 1 above, it is predicted that $^4I_{13/2}(Y2) \rightarrow {}^4S_{3/2}(E1)$ transition is a forbidden transition, being a sharp transition with a small absorption intensity.

By contrast, $^4I_{15/2}(Z2) \rightarrow {}^4I_{13/2}(Y2)$ transition is an allowable transition, being a broad transition with a large absorption intensity. It means that $\sigma_{12}$ between level 1 and level 2 is smaller than $\sigma_{23}$ between level 2 and level 3.

From these results, in this comparative example, since $\sigma_{23}$ is sufficiently larger than $\sigma_{12}$, it is understood that signal light was hardly modulated in spite of irradiation with gate light G.

Fourth Embodiment

What the light modulating element in this embodiment differs from that in the second embodiment is that, in the light modulating element in FIG. 18, $LiYF_4$ dispersing 1 mol % of $Pr^{3+}$ as impurity is used as the material for the EIT layer 11.

Figure 25:
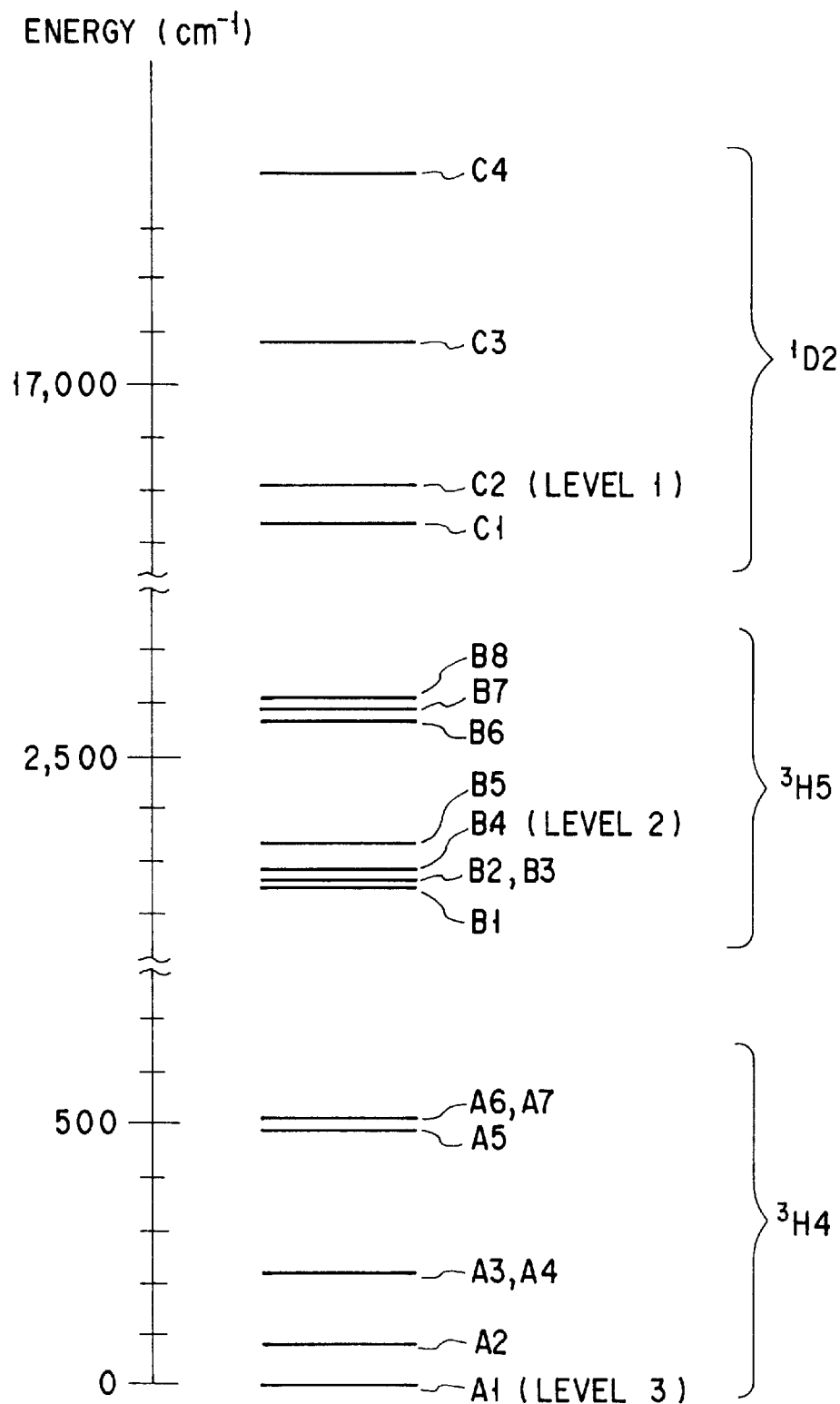
FIG. 25 is a diagram showing energy level of $Pr^{3+}$ dispersed in $LiYF_4$.

As three energy levels, impurity levels of $Pr^{3+}$ in $LiYF_4$ were used, and as shown in FIG. 25, the highest level 1 was C2 level being split in the crystal field among $^1D_2$ level, the middle level 2 was B4 level being split also in the crystal field among $^3H_5$ level, and the lowest level 3 was A1 level being split also in the crystal field among $^3H_4$ level which is the basal level.

The symmetry of levels was $\Gamma_1$ in $^1D_2$(C2) level, $\Gamma_2$ in $^3H_5$ B4) level, and also $\Gamma_2$ in $^3H_4$(A1) level. Hence, $^3H_5$(B4)$\rightarrow {}^1D_2$(C2) transition between level 1 and level 2 was composed of transition of $\Gamma_2 \rightarrow \Gamma_1$, and $^3H_4$(A1)$\rightarrow {}^1D_2$(C2) transition between level 1 and level 3 was also of $\Gamma_2 \rightarrow \Gamma_1$, whereas $^3H_4$(A1)$\rightarrow {}^3H_5$(B4) transition between level 2 and level 3 was composed of transition of $\Gamma_1 \rightarrow \Gamma_1$.

Table 2 shows selection rules of optical transition relating to level symmetry. The allowable and forbidden optical transitions shown in Table 2 all relate to electric dipole transition.

TABLE 2

| $\Gamma_i$ | $\Gamma_1$ | $\Gamma_2$ | $\Gamma_3$ | $\Gamma_4$ |
|---|---|---|---|---|
| $\Gamma_1$ | x | ○ | ○ | ○ |
| $\Gamma_2$ | ○ | x | ○ | ○ |
| $\Gamma_3$ | ○ | ○ | x | ○ |
| $\Gamma_4$ | ○ | ○ | ○ | x | x Forbidden
○ Allowable

As known from Table 2, $^3H_5$(B4)$\rightarrow {}^1D_2$(C2) transition between level 1 and level 2 and $^3H_4$(A1)$\rightarrow {}^1D_2$(C2) transition between level 1 and level 3 are allowable transitions, and $^3H_4$(A1)$\rightarrow {}^3H_5$(B4) transition between level 2 and level 3 is a forbidden transition.

Hence, in this light modulating element, in these three levels, the light was excited in $\Lambda$ type between levels $^3H_4$(A1) and $^1D_2$(C2), and levels $^3H_5$(B4) and $^1D_2$(C2).

The light energy $\omega_1$ of gate light G was selected to correspond to $^3H_5$(B4)$\rightarrow {}^1D_2$(C2) transition between level 1 and level 2, and the light energy $\omega_2$ of signal light was selected to correspond to $^3H_4$(A1)$\rightarrow {}^1D_2$(C2) transition between level 1 and level 3.

At this time, the light energy $\omega_1$ and $\omega_2$ were adjusted so that $\omega_2 - \omega_1$ might coincide with the center value (2280 cm$^{-1}$) of level between level 2 and level 3. The intensity of gate light G was 1 W, and the intensity of signal light entering the EIT layer was 1 mW.

In thus constituted light modulating element, the transmission light intensity of signal light was investigated in the presence and absence of gate light G.

In the absence of gate light G, the signal light was absorbed by the EIT layer 11, and the output intensity of signal light decreased to about 7% of the input.

When irradiated with gate light G, the output intensity was about 69% of the input, and as compared with the case of absence of gate light G, it was confirmed that the signal light was more likely to pass through.

COMPARATIVE EXAMPLE 3

Using a light modulating element in the same constitution as in the fourth embodiment except that $^3H_5$(B1) with symmetry $\Gamma_1$ level was used instead of $^3H_5$(B4) level as level 2, and that accordingly the light energy $\omega_1$ of the gate light G was changed to that corresponding to $^3H_5$(B1)$\rightarrow {}^1D_2$(C2) transition between level 1 and level 2, the transmission light intensity of signal light was investigated in the presence or absence of gate light G. Incidentally, $\omega_2 - \omega_1$ was adjusted to 2253 cm$^{-1}$.

First, in the absence of gate light G, same as in the fourth embodiment, the output intensity of the signal light was decreased to about 7% of the input.

In the case of irradiation with gate light G, different from the fourth embodiment, the output intensity as compared with the input was also about only 8%. In this comparative example, therefore, it was found that the signal light hardly passes regardless of presence or absence of gate light G.

MODIFIED EXAMPLES

The modified examples are identical in constitution except that the material of the EIT layer 11 is different from that in the second to fourth embodiment in the light modulating element shown in FIG. 18.

Table 3 to Table 12 show the type of solid material, type of impurity, conventional expression of level symmetry of three impurity levels, energy position of three impurity levels, type of light excitation, transmissivity of signal light without irradiation with gate light G, and transmissivity of signal light with irradiation with gate light G, in each material of the EIT layer 11 used in the light modulating element in the modified examples.

As shown in the tables, it is understood that the transmissivity of signal light can be modulated extremely depending on presence or absence of gate light G.

TABLE 3

| Solid | Impurity | energy level | wavelength of gate light (nm) | wavelength of signal light (nm) | excitation type | transmittance of signal light without gate light | transmittance of signal light with gate light |
|---|---|---|---|---|---|---|---|
| YLF | $Pr^{3+}$, 1 mol % | level 1; $\Gamma_1$ level in $^1D_2$ level 16810 $cm^{-1}$<br>level 2; $\Gamma_2$ level in $^3H_6$ level 4314 $cm^{-1}$<br>level 3; $\Gamma_2$ level in $^3H_4$ level 0 $cm^{-1}$ | ~800.3 | ~594.9 | Λ | 15% | 66% |
| YLF | $Pr^{3+}$, 1 mol % | level 1; $\Gamma_1$ level in $^3P_0$ level 0860 $cm^{-1}$<br>level 2; $\Gamma_2$ level in $^3H_6$ level 4314 $cm^{-1}$<br>level 3; $\Gamma_2$ level in $^3H_4$ level 0 $cm^{-1}$ | ~604.4 | ~479.4 | Λ | 4% | 81% |
| YLF | $Pr^{3+}$, 1 mol % | level 1; $\Gamma_1$ level in $^3F_2$ level 5159 $cm^{-1}$<br>level 2; I = ±5/2 level or ±3/2 level in $\Gamma_2$ level in $^3H_4$ level ~$10^{-3}$ $cm^{-1}$<br>level 3; I = ±3/2 level or ±1/2 level in $\Gamma_2$ level in $^3H_4$ level 0 $cm^{-1}$ | ~1938.4 | ~1938.4 | Λ | 5% | 92% |
| YLF | $Pr^{3+}$, 1 mol % | level 1; $\Gamma_1$ level in $^3F_2$ level 5159 $cm^{-1}$<br>level 2; I = ±5/2 level or ± 3/2 level in $\Gamma_2$ level in $^4H_3$ level ~$10^{-3}$ $cm^{-1}$<br>level 3; I = ±3/2 level or ±1/2 level in $\Gamma_1$ level in $^4H_3$ level 0 $cm^{-1}$ | ~1938.4 | ~1938.4 | Λ | 5% | 92% |

TABLE 4

| Solid | Impurity | energy level | wavelength of gate light (nm) | wavelength of signal light (nm) | excitation type | transmittance of signal light without gate light | transmittance of signal light with gate light |
|---|---|---|---|---|---|---|---|
| YLF | $Pr^{3+}$, 1 mol % | level 1; $\Gamma_1$ level in $^3F_4$ level 6920 $cm^{-1}$<br>level 2; I = ±5/2 level or ±3/2 level in $\Gamma_2$ level in $^3H_4$ level ~$10^{-3}$ $cm^{-1}$<br>level 3; I = ±3/2 level or ±1/2 level in $\Gamma_2$ level in $^3H_4$ level 0 $cm^{-1}$ | ~1445.1 | ~1445.1 | Λ | 7% | 90% |
| YLF | $Pr^{3+}$, 1 mol % | level 1; $\Gamma_1$ level in $^1G_4$ level 9699 $cm^{-1}$<br>level 2; I = ±5/2 level or ±3/2 level in $\Gamma_2$ level in $^3H_4$ level ~$10^{-3}$ $cm^{-1}$<br>level 3; I = ±3/2 level or ±1/2 level in $\Gamma_2$ level in $^3H_4$ level 0 $cm^{-1}$ | ~1031.0 | ~1031.0 | Λ | 32% | 95% |
| YLF | $Pr^{3+}$, 1 mol % | level 1; $\Gamma_1$ level in $^1D_2$ level 16810 $cm^{-1}$<br>level 2; I = ±5/2 level or ±3/2 level in $\Gamma_2$ level in $^3H_4$ level ~$10^{-3}$ $cm^{-1}$<br>level 3; I = ±3/2 level or ±1/2 level in $\Gamma_2$ level in $^3H_4$ level 0 $cm^{-1}$ | ~594.9 | ~594.9 | Λ | 15% | 96% |
| YLF | $Pr^{3+}$, 1 mol % | level 1; $\Gamma_1$ level in $^3P_0$ level 20860 $cm^{-1}$<br>level 2; I = ±5/2 level or ± 3/2 level in $\Gamma_2$ level in $^3H_4$ level ~$10^{-3}$ $cm^{-1}$ | ~479.4 | ~479.4 | Λ | 4% | 88% |

TABLE 4-continued

| Solid | Impurity | energy level | wavelength of gate light (nm) | wavelength of signal light (nm) | excitation type | transmittance of signal light without gate light | transmittance of signal light with gate light |
|---|---|---|---|---|---|---|---|
| | | level 3; I = ±3/2 level or ±1/2 level in $\Gamma_1$ level in $^3H_4$ level 0 cm$^{-1}$ | | | | | |

TABLE 5

| Solid | Impurity | energy level | wavelength of gate light (nm) | wavelength of signal light (nm) | excitation type | transmittance of signal light without gate light | transmittance of signal light with gate light |
|---|---|---|---|---|---|---|---|
| YLF | $Pr^{3+}$, 1 mol % | level 1; $\Gamma_1$ level in $^1G_4$ level 9699 cm$^{-1}$ level 2; $\Gamma_1$ level in $^3F_4$ level 6920 cm$^{-1}$ level 3; $\Gamma_2$ level in $^3H_4$ level 0 cm$^{-1}$ | ~1445.1 | ~1031.0 | V | 32% | 54% |
| YLF | $Pr^{3+}$, 1 mol % | level 1; $\Gamma_1$ level in $^3P_0$ level 20860 cm$^{-1}$ level 2; $\Gamma_1$ level in $^3F_4$ level 6920 cm$^{-1}$ level 3; $\Gamma_2$ level in $^3H_4$ level 0 cm$^{-1}$ | ~1445.1 | ~479.4 | V | 4% | 77% |
| YLF | $Pr^{3+}$, 1 mol % | level 1; $\Gamma_1$ level in $^3P_0$ level 20860 cm$^{-1}$ level 2; $\Gamma_1$ level in $^1G_4$ level 9699 cm$^{-1}$ level 3; $\Gamma_2$ level in $^3H_4$ level 0 cm$^{-1}$ | ~1031.0 | ~479.4 | V | 4% | 48% |
| YAG | $Pr^{3+}$, 0.5 mol % | level 1; $\Gamma_1$ level in $^1D_2$ level 16400 cm$^{-1}$ level 2; $\Gamma_3$ level in $^3F_3$ level 6467 cm$^{-1}$ level 3; $\Gamma_3$ level in $^3H_4$ level 0 cm$^{-1}$ | ~1006.8 | ~609.8 | Λ | 21% | 39% |
| YAG | $Pr^{3+}$, 0.5 mol % | level 1; $\Gamma_1$ level in $^3P_0$ level 20534 cm$^{-1}$ level 2; $\Gamma_3$ level in $^3F_3$ level 6467 cm$^{-1}$ level 3; $\Gamma_3$ level in $^3H_4$ level 0 cm$^{-1}$ | ~710.9 | ~487.0 | Λ | 6% | 81% |
| YAG | $Pr^{3+}$, 0.5 mol % | level 1; $\Gamma_2$ level in $^3P_1$ level 21045 cm$^{-1}$ level 2; $\Gamma_3$ level in $^3F_3$ level 6467 cm$^{-1}$ level 3; $\Gamma_3$ level in $^3H_4$ level 0 cm$^{-1}$ | ~686.0 | ~475.2 | Λ | 6% | 80% |

TABLE 6

| Solid | Impurity | energy level | wavelength of gate light (nm) | wavelength of signal light (nm) | excitation type | transmittance of signal light without gate light | transmittance of signal light with gate light |
|---|---|---|---|---|---|---|---|
| YAG | $Pr^{3+}$, 0.5 mol % | level 1; $\Gamma_2$ level in $^3P_2$ level 22103 cm$^{-1}$ | ~639.6 | ~452.4 | Λ | 11% | 59% |

TABLE 6-continued

| Solid | Impurity | energy level | wave-length of gate light (nm) | wave-length of signal light (nm) | excita-tion type | transmittance of signal light without gate light | transmittance of signal light with gate light |
|---|---|---|---|---|---|---|---|
| | | level 2; $\Gamma_3$ level in $^3F_3$ level 6467 cm$^{-1}$ level 3; $\Gamma_3$ level in $^3H_4$ level 0 cm$^{-1}$ | | | | | |
| YAG | Pr$^{3+}$, 0.5 mol % | level 1; $\Gamma_2$ level in $^3F_2$ level 5430 cm$^{-1}$ level 2; I = ±5/2 level or ±3/2 level in $\Gamma_3$ level in $^3H_4$ level ~10$^{-3}$ cm$^{-1}$ level 3; I = ±3/2 level or ±1/2 level in $\Gamma_2$ level in $^3H_4$ level 0 cm$^{-1}$ | ~1841.6 | ~1841.6 | Λ | 8% | 85% |
| YAG | Pr$^{3+}$, 0.5 mol % | level 1; $\Gamma_1$ level in $^3F_3$ level 6482 cm$^{-1}$ level 2; I = ±5/2 level or ±3/2 level in $\Gamma_3$ level in $^3H_4$ level ~10$^{-3}$ cm$^{-1}$ level 3; I = ±3/2 level or ±1/2 level in $\Gamma_3$ level in $^3H_4$ level 0 cm$^{-1}$ | ~1542.7 | ~1542.7 | Λ | 7% | 93% |
| YAG | Pr$^{3+}$, 0.5 mol % | level 1; $\Gamma_1$ level in $^3F_4$ level 7085 cm$^{-1}$ level 2; I = ±5/2 level or ± 3/2 level in $\Gamma_3$ level in $^3H_4$ level ~10$^{-3}$ cm$^{-1}$ level 3; I = ±3/2 level or ±1/2 level in $\Gamma_3$ level in $^3H_4$ level 0 cm$^{-1}$ | ~1411.4 | ~1411.4 | Λ | 14% | 78% |

TABLE 7

| Solid | Impurity | energy level | wave-length of gate light (nm) | wave-length of signal light (nm) | excita-tion type | transmittance of signal light without gate light | transmittance of signal light with gate light |
|---|---|---|---|---|---|---|---|
| YAG | Pr$^{3+}$, 0.5 mol % | level 1; $\Gamma_2$ level in $^1G_4$ level 9282 cm$^{-1}$ level 2; I = ±5/2 level or ±3/2 level in $\Gamma_3$ level in $^3H_4$ level ~10$^{-3}$cm$^{-1}$ level 3; I = ±3/2 level or ±1/2 level in $\Gamma_3$ level in $^3H_4$ level 0 cm$^{-1}$ | ~1077.4 | ~1077.4 | Λ | 36% | 43% |
| YAG | Pr$^{3+}$, 0.5 mol % | level 1; $\Gamma_1$ level in $^1D_2$ level 16810 cm$^{-1}$ level 2; I = ±5/2 level or ±3/2 level in $\Gamma_3$ level in $^3H_4$ level ~10$^{-3}$ cm$^{-1}$ level 3; I = ±3/2 level or ±1/2 level in $\Gamma_3$ level in $^3H_4$ level 0 cm$^{-1}$ | ~609.8 | ~609.8 | Λ | 21% | 68% |
| YAG | Pr$^{3+}$, 0.5 mol % | level 1; $\Gamma_1$ level in $^3P_0$ level 20860 cm$^{-1}$ level 2; I = ±5/2 level or ±3/2 level in $\Gamma_3$ level in $^3H_4$ level ~10$^{-3}$ cm$^{-1}$ level 3; I = ±3/2 level or ±1/2 level in $\Gamma_3$ level in $^3H_4$ level 0 cm$^{-1}$ | ~487.0 | ~487.0 | Λ | 6% | 68% |
| YAG | Pr$^{3+}$, 0.5 mol % | level 1; $\Gamma_2$ level in $^3P_1$ level 21045 cm$^{-1}$ level 2; I = ±5/2 level or ± 3/2 level in $\Gamma_3$ level in $^3H_4$ level ~10$^{-3}$ cm$^{-1}$ | ~475.2 | ~475.2 | Λ | 6% | 90% |

TABLE 7-continued

| Solid | Impurity | energy level | wave-length of gate light (nm) | wave-length of signal light (nm) | excita-tion type | transmittance of signal light without gate light | transmittance of signal light with gate light |
|---|---|---|---|---|---|---|---|
| | | level 3; I = ±3/2 level or ±1/2 level in $\Gamma_3$ level in $^3H_4$ level 0 cm$^{-1}$ | | | | | |

TABLE 8

| Solid | Impurity | energy level | wave-length of gate light (nm) | wave-length of signal light (nm) | excita-tion type | transmittance of signal light without gate light | transmittance of signal light with gate light |
|---|---|---|---|---|---|---|---|
| YAG | Pr$^{3+}$, 0.5 mol % | level 1; $\Gamma_2$ level in $^3P_2$ level 22103 cm$^{-1}$ level 2; I = ±5/2 level or ±3/2 level in $\Gamma_3$ level in $^3H_4$ level ~10$^{-3}$ cm$^{-1}$ level 3; I = ±3/2 level or ±1/2 level in $\Gamma_3$ level in $^3H_4$ level 0 cm$^{-1}$ | ~452.4 | ~452.4 | Λ | 11% | 51% |
| YAG | Pr$^{3+}$, 0.5 mol % | level 1; $\Gamma_1$ level in $^1D_2$ level 20534 cm$^{-1}$ level 2; $\Gamma_1$ level in $^3F_3$ level 16400 cm$^{-1}$ level 3; $\Gamma_3$ level in $^3H_4$ level 0 cm$^{-1}$ | ~609.8 | ~487.0 | V | 21% | 30% |
| YAG | Pr$^{3+}$, 0.5 mol % | level 1; $\Gamma_2$ level in $^3P_0$ level 22103 cm$^{-1}$ level 2; $\Gamma_2$ level in $^3F_3$ level 21045 cm$^{-1}$ level 3; $\Gamma_3$ level in $^3H_4$ level 0 cm$^{-1}$ | ~475.2 | ~452.4 | V | 6% | 83% |
| YAG | Pr$^{3+}$, 1 mol % | level 1; $\Gamma_2$ level in $^5D_1$ level 18947 cm$^{-1}$ level 2; $\Gamma_1$ level in $^7F_4$ level 2392 cm$^{-1}$ level 3; $\Gamma_1$ level in $^7F_0$ level 0 cm$^{-1}$ | ~604.1 | ~527.8 | Λ | 40% | 50% |
| YAG | Eu$^{3+}$, 1 mol % | level 1; $\Gamma_4$ level in $^5D_1$ level 18984 cm$^{-1}$ level 2; $\Gamma_1$ level in $^7F_4$ level 2392 cm$^{-1}$ level 3; $\Gamma_1$ level in $^7F_0$ level 0 cm$^{-1}$ | ~602.7 | ~526.8 | Λ | 44% | 48% |

TABLE 9

| Solid | Impurity | energy level | wave-length of gate light (nm) | wave-length of signal light (nm) | excita-tion type | transmittance of signal light without gate light | transmittance of signal light with gate light |
|---|---|---|---|---|---|---|---|
| YAG | Eu3+, 1 mol % | level 1; $\Gamma_3$ level in $^5D_2$ level 21358 cm$^{-1}$ level 2; $\Gamma_1$ level in $^7F_4$ level 2392 cm$^{-1}$ level 3; $\Gamma_1$ level in $^7F_0$ level 0 cm$^{-1}$ | ~527.3 | ~468.2 | V | 31% | 59% |
| YLF | Pr$^{3+}$, 1 mol % | level 1; $\Gamma_4$ level in $^5D_2$ level 21450 cm$^{-1}$ | ~524.7 | ~466.2 | V | 36% | 54% |

TABLE 9-continued

| Solid | Impurity | energy level | wave-length of gate light (nm) | wave-length of signal light (nm) | excita-tion type | transmittance of signal light | |
|---|---|---|---|---|---|---|---|
| | | | | | | without gate light | with gate light |
| YLF | $Pr^{3+}$, 1 mol % | level 2; $\Gamma_1$ level in $^7F_4$ level 2392 $cm^{-1}$<br>level 3; $\Gamma_1$ level in $^7F_0$ level 0 $cm^{-1}$<br>level 1; $\Gamma_2$ level in $^5D_2$ level 21473 $cm^{-1}$<br>level 2; $\Gamma_1$ level in $^7F_4$ level 2392 $cm^{-1}$<br>level 3; $\Gamma_1$ level in $^7F_0$ level 0 $cm^{-1}$ | ~524.1 | ~465.7 | V | 41% | 49% |
| YAG | $Pr^{3+}$, 0.5 mol % | level 1; $\Gamma_2$ level in $^5D_1$ level 18947 $cm^{-1}$<br>level 2; $\Gamma_1$ level in $^7F_6$ level 4961 $cm^{-1}$<br>level 3; $\Gamma_1$ level in $^7F_0$ level 0 $cm^{-1}$ | ~715.0 | ~527.8 | Λ | 40% | 47% |
| YAG | $Pr^{3+}$, 0.5 mol % | level 1; $\Gamma_4$ level in $^5D_1$ level 18984 $cm^{-1}$<br>level 2; $\Gamma_1$ level in $^7F_6$ level 4961 $cm^{-1}$<br>level 3; $\Gamma_1$ level in $^7F_0$ level 0 $cm^{-1}$ | ~713.1 | ~526.8 | Λ | 44% | 47% |
| YAG | $Pr^{3+}$, 0.5 mol % | level 1; $\Gamma_3$ level in $^5D_2$ level 21358 $cm^{-1}$<br>level 2; $\Gamma_1$ level in $^7F_6$ level 4961 $cm^{-1}$<br>level 3; $\Gamma_{16}$ level in $^7F_0$ level 0 $cm^{-1}$ | ~609.9 | ~468.2 | Λ | 31% | 55% |

TABLE 10

| Solid | Impurity | energy level | wave-length of gate light (nm) | wave-length of signal light (nm) | excita-tion type | transmittance of signal light | |
|---|---|---|---|---|---|---|---|
| | | | | | | without gate light | with gate light |
| YAG | $Eu^{3+}$, 1 mol % | level 1; $\Gamma_4$ level in $^5D_2$ level 21450 $cm^{-1}$<br>level 2; $\Gamma_1$ level in $^7F_6$ level 4961 $cm^{-1}$<br>level 3; $I = \pm 3/2$ level or $\pm 1/2$ level in $\Gamma_3$ level in $^3H_4$ level 0 $cm^{-1}$ | ~606.5 | ~466.2 | Λ | 11% | 51% |
| YAG | $Eu^{3+}$, 1 mol % | level 1; $\Gamma_2$ level in $^5D_2$ level 21473 $cm^{-1}$<br>level 2; $\Gamma_1$ level in $^7F_6$ level 4961 $cm^{-1}$<br>level 3; $\Gamma_1$ level in $^7F_0$ level 0 $cm^{-1}$ | ~605.6 | ~465.7 | V | 21% | 30% |
| YAG | $Eu^{3+}$, 1 mol % | level 1; $\Gamma_3$ level in $^5L_6$ level 24629 $cm^{-1}$<br>level 2; $\Gamma_3$ level in $^7D_1$ level 18945 $cm^{-1}$<br>level 3; $\Gamma_1$ level in $^7F_0$ level 0 $cm^{-1}$ | ~527.8 | ~406.0 | V | 6% | 83% |
| YAG | $Ho^{3+}$, 1 mol % | level 1; $\Gamma_1$ level in $^5F_4$ level 18599 $cm^{-1}$<br>level 2; $\Gamma_1$ level in $^5I_4$ level 13184 $cm^{-1}$<br>level 3; $\Gamma_{3,4}$ level in $^5I_8$ level 0 $cm^{-1}$ | ~758.5 | ~537.7 | Λ | 40% | 50% |
| YAG | $Ho^{3+}$, 1 mol % | level 1; $^5G_2$, $^3F_4$ (2), ~29840<br>All of $3K_6$ (2) level 18984 $cm^{-1}$ | 566.7~ 604.0 | 323.3~ 335.1 | Λ | 9~33% | 41~55% |

TABLE 10-continued

| Solid | Impurity | energy level | wavelength of gate light (nm) | wavelength of signal light (nm) | excitation type | transmittance of signal light without gate light | transmittance of signal light with gate light |
|---|---|---|---|---|---|---|---|
| | | level 2; $\Gamma_2$ level in $^5I_4$ level 13184 cm$^{-1}$ level 3; $\Gamma_2$ level in $^5I_8$ level 0 cm$^{-1}$ | | | | | |

TABLE 11

| Solid | Impurity | energy level | wavelength of gate light (nm) | wavelength of signal light (nm) | excitation type | transmittance of signal light without gate light | transmittance of signal light with gate light |
|---|---|---|---|---|---|---|---|
| YAG | Ho$^{3+}$, 1 mol % | level 1; $\Gamma_4$ level in $^5F_3$ level 20593 cm$^{-1}$ level 2; $\Gamma_4$ level in $^5I_5$ level 11301 cm$^{-1}$ level 3; $\Gamma_2$ level in $^5I_8$ level 0 cm$^{-1}$ | ~884.9 | ~485.6 | Λ | 12% | 79% |
| YAG | Ho$^{3+}$, 1 mol % | level 1; $\Gamma_2$ level in $^3D_3$ level 33104 cm$^{-1}$ level 2; $\Gamma_3$ level in $^5I_5$ level 11301 cm$^{-1}$ level 3; $\Gamma_2$ level in $^5I_8$ level 0 cm$^{-1}$ | ~569.7 | ~639.4 | V | 3% | 88% |
| YAG | Ho$^{3+}$, 1 mol % | level 1; $\Gamma_2$ level in $^3D_3$ level 33014 cm$^{-1}$ level 2; $\Gamma_1$ level in $^5S_2$ level 18450 cm$^{-1}$ level 3; $\Gamma_2$ level in $^5I_8$ level 0 cm$^{-1}$ | ~686.6 | ~542.0 | V | 3% | 91% |
| YLF | Tm$^{3+}$, 1 mol % | level 1; $\Gamma_{3,4}$ level in $^1D_2$ level 28019 cm$^{-1}$ level 2; $\Gamma_2$ level in $^3H_4$ level 12621 cm$^{-1}$ level 3; $\Gamma_2$ level in $^3H_6$ level 0 cm$^{-1}$ | ~649.4 | ~356.9 | Λ | 38% | 42% |
| YLF | Tm3+, 1 mol % | level 1; $\Gamma_2$ level in $^1D_2$ level 27932 cm$^{-1}$ level 2; $\Gamma_{3,4}$ level in $^3F_3$ level 14531 cm$^{-1}$ level 3; $\Gamma_2$ level in $^3H_6$ level 0 cm$^{-1}$ | ~764.2 | ~688.2 | Λ | 7% | 94% |

TABLE 12

| Solid | Impurity | energy level | wavelength of gate light (nm) | wavelength of signal light (nm) | excitation type | transmittance of signal light without gate light | transmittance of signal light with gate light |
|---|---|---|---|---|---|---|---|
| YAG | Tm$^{3+}$, 1 mol % | level 1; $\Gamma_1$ level in $^1G_4$ level 20805 cm$^{-1}$ level 2; $\Gamma_1$ level in $^3H_4$ level 12607 cm$^{-1}$ level 3; $\Gamma_2$ level in $^3H_6$ level 0 cm$^{-1}$ | ~793.2 | ~480.7 | Λ | 26% | 45% |
| YAG | Tm$^{3+}$, 1 mol % | level 1; $\Gamma_1$ level in $^1D_2$ level 27868 cm$^{-1}$ level 2; $\Gamma_1$ level in $^1G_4$ level 12607 cm$^{-1}$ | ~793.2 | ~358.8 | V | 37% | 76% |

TABLE 12-continued

| Solid | Impurity | energy level | wavelength of gate light (nm) | wavelength of signal light (nm) | excitation type | transmittance of signal light without gate light | transmittance of signal light with gate light |
|---|---|---|---|---|---|---|---|
| | | level 3; $\Gamma_2$ level in $^3H_6$ level 0 cm$^{-1}$ | | | | | |
| YAG | Tm3+, 1 mol % | level 1; $\Gamma_1$ level in $^1D_2$ level 27868 cm$^{-1}$ | ~645.3 | ~487.4 | $\Lambda$ | 44% | 60% |
| | | level 2; $\Gamma_1$ level in $^1G_4$ level 20805 cm$^{-1}$ | | | | | |
| | | level 3; $\Gamma_2$ level in $^3H_6$ level 0 cm$^{-1}$ | | | | | |
| YLF | Tm$^{3+}$, 1 mol % | level 1; $\Gamma_{3,4}$ level in $^1D_2$ level 28019 cm$^{-1}$ | ~649.4 | ~356.9 | $\Lambda$ | 38% | 42% |
| | | level 2; $\Gamma_2$ level in $^3H_4$ level 12621 cm$^{-1}$ | | | | | |
| | | level 3; $\Gamma_2$ level in $^3H_6$ level 0 cm$^{-1}$ | | | | | |
| YLF | Tm3+, 1 mol % | level 1; $\Gamma_2$ level in $^1D_2$ level 27932 cm$^{-1}$ | ~764.2 | ~688.2 | $\Lambda$ | 7% | 94% |
| | | level 2; $\Gamma_{3,4}$ level in $^3F_3$ level 14531 cm$^{-1}$ | | | | | |
| | | level 3; $\Gamma_2$ level in $^3H_6$ level 0 cm$^{-1}$ | | | | | |

Fifth Embodiment

Figure 26:
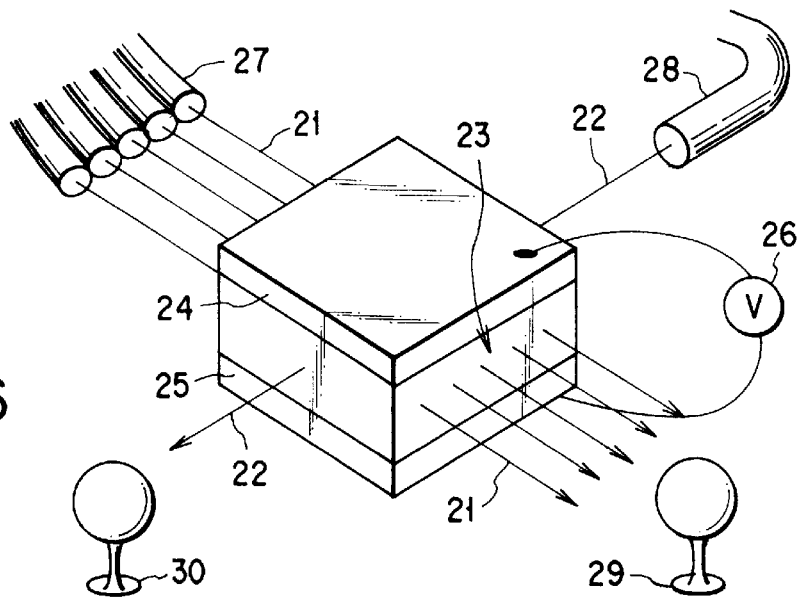
FIG. 26 is a diagram schematically showing a light modulating element in a fifth embodiment of the invention.

FIG. 26 schematically shows the light modulating element according to a fifth embodiment of the invention.

This light modulating element is roughly composed of an EIT layer 23 for modulating transmission intensity of two beams of light 21, 22, two electrodes 24, 25 for holding this EIT layer 23 from both sides, a power supply 26 for applying a voltage between the electrodes 24, 25 for controlling the magnitude of the electric field as the outer field given to the EIT layer 23, optical fibers 27, 28 for feeding the light 21, 22 into the EIT layer 23, and photodiodes 29, 30 for measuring the transmission intensity of two beams of light delivered from the EIT layer 23.

Of the two beams of light 21, 22 delivered from the optical fibers 27, 28, the light exciting between level 1 and level 2 irradiates the entire EIT layer 23 in $\Lambda$ type excitation, and the light 22 exciting between level 2 and level 3, in V type excitation. Both light 21 and 22 irradiating the EIT layer 23 are laser beams.

Figure 27A:
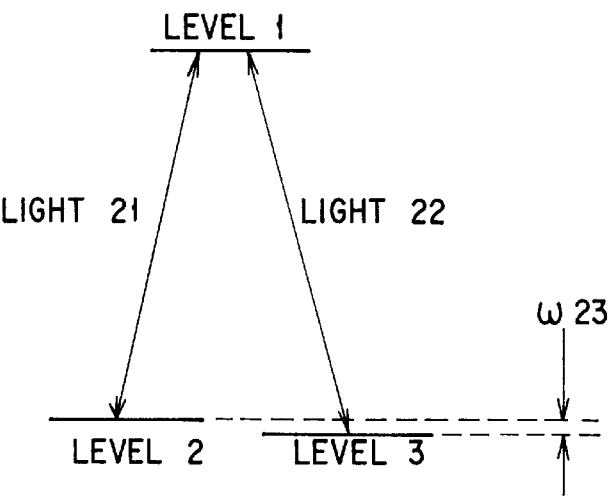
FIGS. 27A and FIG. 27B are diagrams showing the relation of energy level and two light beams in an EIT layer of the light modulating element in the fifth embodiment.
Figure 27B:
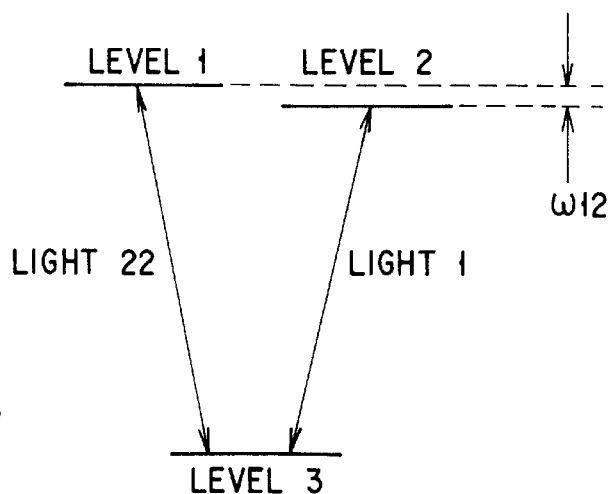

FIG. 27A and FIG. 27B schematically show the energy level in the EIT layer 23 and two light 21 and 22 entering therein.

FIG. 27A refers to the case of $\Lambda$ type excitation, and the material for the EIT layer 23 is select in the level so that level 2 and level 3 may be degenerated when outer field is not applied.

By selecting such level, the standard deviation $\sigma_{23}$ of energy between level 2 and level 3 when outer field (electric field) is applied satisfies the relation of $\sigma_{23} \leq \sigma_{12}$ and $\sigma_{23} \leq \sigma_{13}$, with respect to standard deviations $\sigma_{12}$, $\sigma_{13}$ of energy between level 1 and 2, and between level 1 and level 3.

Concerning the light energy of two beams of light 21, 22, supposing the light energy of the light 21 exciting between level 1 and level 2 to be $\omega_1$, the light energy of the light 22 exciting between level 1 and level 3 to be $\omega_2$, and the center value of energy difference between level 2 and level 3 to be $\omega_{23}$, $\omega_1$ and $\omega_2$ should be selected so as to satisfy the relation of $\omega_2 - \omega_1 = \omega_{23}$.

In such constitution, while irradiating the EIT layer 23 with two beams of light 21, 22, the relation is $\Delta\omega_1 = \Delta\omega_2$ in most pseudo-atoms in the EIT layer 23. When the outer field is zero, the two light 21 and 22 are absorbed in the EIT layer 23 and are hardly transmitted, but when an outer field in a specific magnitude satisfying $\omega_2 - \omega_1 = \omega_{23}$ is applied, the light absorption in the EIT layer 23 is suppressed, so that a large optical output is obtained in both light 21 and 22.

It is hence possible to modulate the light transmission intensity by manipulating the magnitude of the outer field.

In the case of V type excitation shown in FIG. 27B, as the material for the EIT layer 23, a level not causing degeneration of level 1 and level 2 when outer field is not applied is selected.

By selecting such level, the standard deviation $\sigma_{12}$ of energy between level 1 and level 2 when outer field is applied satisfies the relation of $\sigma_{12} \leq \sigma_{13}$ and $\sigma_{12} \leq \sigma_{23}$, with respect to standard deviations $\sigma_{13}$, $\sigma_{23}$ of energy between level 1 and 3, and between level 2 and level 3.

Concerning the light energy of two beams of light 21, 22, supposing the light energy of the light 21 exciting between level 2 and level 3 to be $\omega_1$, the light energy of the light 22 exciting between level 1 and level 3 to be $\omega_2$, and the center value of energy difference between level 1 and level 2 to be $\omega_{12}$, $\omega_1$ and $\omega_2$ should be selected so as to satisfy the relation of $\omega_2 - \omega_1 = \omega_{12}$.

In such constitution, in the case of V type excitation, same as in $\Lambda$ type excitation, while irradiating the EIT layer 23 with two beams of light 21, 22, the relation is $\Delta\omega_1 = \Delta\omega_2$ in most pseudo-atoms in the EIT layer 23.

When the outer field is zero, the two light 21 and 22 are absorbed in the EIT layer 23 and are hardly transmitted, but when an outer field in a specific magnitude satisfying $\omega_2 - \omega_1 = \omega_{12}$ is applied, the light absorption in the EIT layer 23 is suppressed, so that a large optical output is obtained in both light 21 and 22. It is hence possible to modulate the light transmission intensity by manipulating the magnitude of the outer field.

In the actual system, concerning two levels not linked by light out of three levels, first the energy between levels is determined, and on the basis of this value, the light energy $\omega_1$ and $\omega_2$ of the two beams of light 21, 22 must be determined.

The transition between levels not linked by light is forbidden, in principle, and it is hard to observe by ordinary light absorption or fluorescence measurement, but by using two light absorptions, etc., it is possible to determine experimentally accurate energy between levels and magnitude of uneven spread.

Sixth Embodiment

The light modulating element of the embodiment is a more specific example of the light modulating element shown in FIG. 26. That is, in this embodiment, as the material for the EIT layer 23, $LiYF_4$ dispersing 1 mol % of $Gd^{3+}$ as impurity is used. As the light 21, 22, pigment laser beams with light energy $\omega_1$ and $\omega_2$ of about 32100 $cm^{-1}$ are used, and photodiodes 29, 30 are Si photodiodes. The power supply 26 is a direct-current power source unit.

Figures 28, 29:
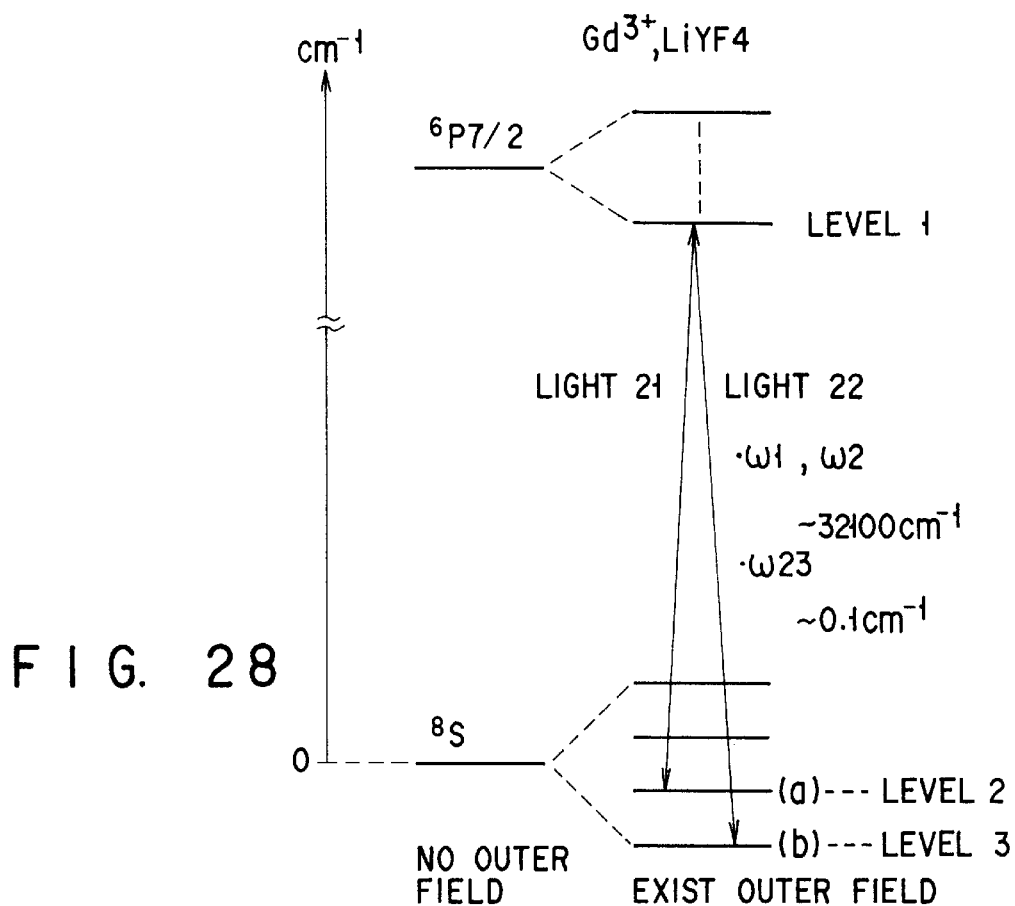
FIG. 28 is a diagram showing energy level of $Gd^{3+}$ impurity in $Gd^{3+}$; $LiYF_4$ used as the EIT layer in a light modulating element in a sixth embodiment.
FIG. 29 is a diagram showing the electric field intensity dependence of energy between levels $^8S_{7/2}(a)$ and $^8S_{7/2}(b)$ among energy levels of $Gd^{3+}$ impurity in $Gd^{3+}$; $LiYF_4$ used as the EIT layer in the light modulating element in the sixth embodiment.

As the energy level, the energy level of $Gd^{3+}$ impurity when an electric field is applied to $LiYF_4$ is used, and more specifically, as shown in FIG. 28, the highest level 1 is $^6P_{7/2}$ level, and the middle level 2 and lowest level 3 are $^8S$ level.

In the case of zero voltage, the $^8S$ level is eightfold degenerated, and when a voltage is applied, by the Starck effect, it is split into four levels differing in the absolute value of internal magnetic quantum number MJ.

As level 2 and level 3, two levels of smaller energy were selected from these four levels, that is, $^8S(a)$ level and $^8S(b)$ level.

Hence, in this light modulating element, concerning these two levels, the light was excited in $\Lambda$ type between levels $^6P_{7/2}$ and $^8S(a)$, and between levels $^6P_{7/2}$ and $^8S(b)$.

The light energy $\omega 1$ of the light 21 is selected to correspond to $^8S(a) \rightarrow {}^6P_{7/2}$ transition between levels 1 and 2, and the light energy $\omega_2$ of the light 22 is selected to correspond to $^8S(b) \rightarrow {}^6P_{7/2}$ transition between levels 1 and 3.

The light energy $\omega_1$ and $\omega_2$ at this time were adjusted so that $\omega_2-\omega_1$ may coincide with the center value $\omega_{23}$ of energy between levels 2 and 3. Incidentally, the light 21 and 22 entering the EIT layer 23 were both 1 W in intensity.

FIG. 29 shows results of investigation of the value of $\omega_{23}$ depending on the voltage, by measuring the microwave absorption between levels $^8S(a)$ and $^8S(b)$ being split while varying the applied voltage, in a state irradiated with microwave having a specific wavelength.

The axis of abscissas is expressed by summarizing by the square of the electric field intensity E. FIG. 29 also shows a typical absorption spectrum concerning the microwave absorption between levels $^8S(a)$ and $^8S(b)$.

In the optical element of this embodiment, $\omega_{23}=0.1$ $cm^{-1}$ is selected. Hence, in the $LiYF_4$, the value of applied voltage is set so that an electric field intensity of about $10^5$ V/cm may be applied.

The spectral line width corresponded to the uneven spread between levels $^8S(a)$ and $^8S(b)$, and the value was about 0.001 $cm^{-1}$. Hence, by making use of the levels split by voltage application, it is known that the $\Lambda$ type three-level system having an uneven spread can be set between levels not linked by light.

In thus constituted optical element, the transmission intensity of light 22 was investigated in the presence or absence of light 21. First, in the absence of light 21, the light 22 is absorbed by the EIT layer 23, and the output intensity of the light 22 was decreased to about 5% of the input.

In the presence of light 21 an output strength of about 72% of the input was obtained, and as compared with the case in the absence of light 21 it was confirmed that the light 22 was more likely to pass through.

Figure 30:
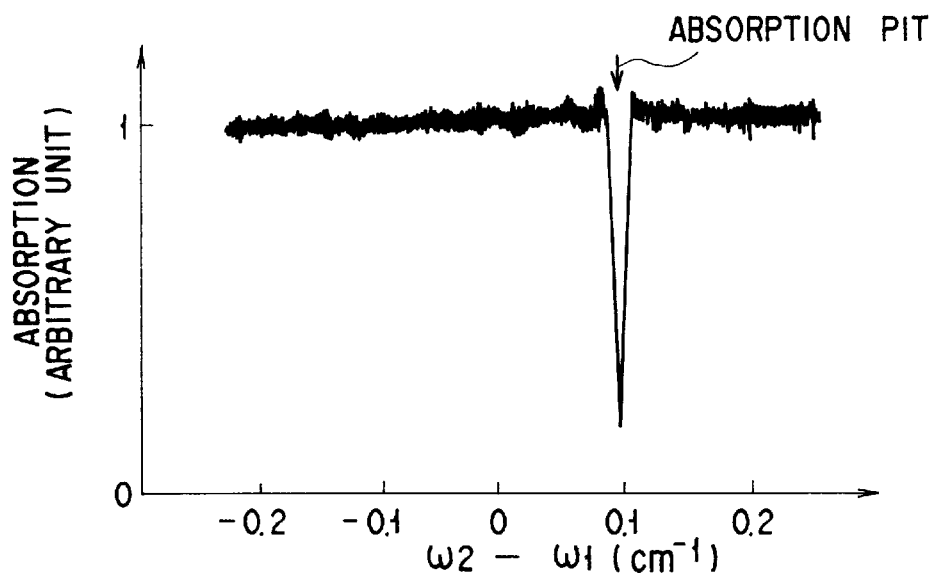
FIG. 30 is a diagram showing results of investigation of light absorption spectrum of $Gd^{3+}$ impurity while varying light energy $\omega_2$ in a fixed state of light energy $\omega_1$ in the light modulating element in the sixth embodiment.

FIG. 30 shows the result of investigation of absorption spectrum of $^8S(b) \rightarrow {}^6S$ transition from level 3 to level 1 while varying the light energy $\omega_2$ of the light 22, in a fixed state of light energy $\omega_1$ of the light 21. The light energy $\omega_1$ of the light 21 was about 32100 $cm^{-1}$.

It is known from FIG. 30 that the absorption of light 22 is decreased significantly by the light energy of about 0.1 $cm^{-1}$ where $\omega_2-\omega_1$ coincides with the center value $\omega_{23}$ of energy between levels 2 and 3. It is hence understood that this phenomenon is derived from the EIT.

COMPARATIVE EXAMPLE 4

Using the light modulating element in the same constitution as in the sixth embodiment except that the voltage applied to $LiYF_4$ was changed to zero, the transmission intensity of light 22 was investigated in the presence and absence of light 21. Meanwhile, $\omega_2-\omega_1$ was adjusted to 0.1 $cm^{-1}$ same as in the sixth embodiment.

First, in the absence of light 21 same as in the sixth embodiment, the output intensity of the light 22 decreased to about 5% of the input. On the other hand, in the presence of light 21 this time, different from the sixth embodiment, the output intensity was also about 5% of the input. Hence, in this comparative example, it is known that the light 22 hardly passes whether the light 21 is absent or present.

As known from the energy level diagram shown in FIG. 28, when the voltage is zero, $\Delta\omega_1=\Delta\omega_2$ is not established in the majority of $Gd^{3+}$ impurities. Hence, if two beams of light are entered, they are absorbed in the EIT layer, and it is known that the output intensity was not increased.

Hence, to express the EIT in the solid, it is known necessary to select the levels for exciting light in sufficient consideration of the uneven spread between levels not coupled by light among three levels.

When the energy distribution between levels is controlled by application of voltage, a very small uneven spread can be set between levels not coupled by light, and hence it may be understood that a favorable EIT characteristic may be obtained.

Seventh Embodiment

The light modulating element of this embodiment is a more specific example of the light modulating element shown in FIG. 26. That is, the EIT layer 23 is $LaCl_3$ dispersing 1 mol % of $Pr^{3+}$ as impurity. As the light 21, 22, pigment laser beams with both light energy $\omega_1$ and $\omega_2$ of about 16630 $cm^{-1}$ are used, and Si photodiodes are used as photodiodes 29, 30. The power source 26 is a direct-current power supply unit.

Figure 31:
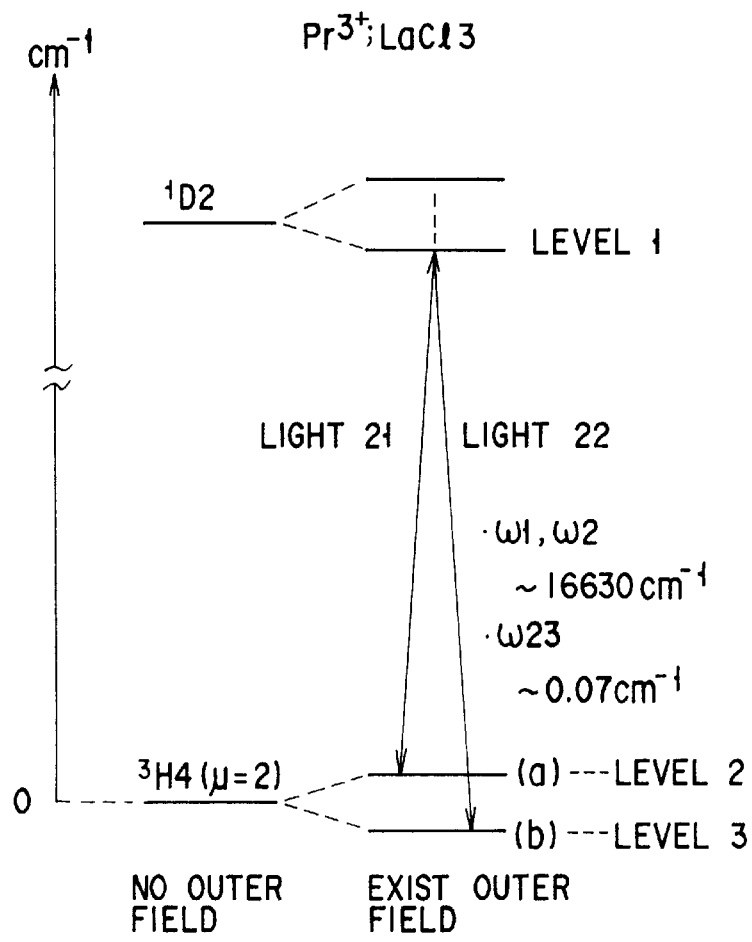
FIG. 31 is a diagram showing energy level of $Pr^{3+}$ impurity in $Pr^{3+}$; $LaCl_3$ used as the EIT layer in a light modulating element in a seventh embodiment.

The energy level is the energy level of $Pr^{3+}$ impurity when an electric field is applied to $LaCl^{3+}$ and more specifically, as shown in FIG. 31, the highest level 1 is $^1D_2$ level, the middle level 2 and lowest level 3 are $3_{H4}(\mu=2)$ levels of the lowest energy among six levels split already in the crystal field among $3_{H4}$ levels.

When the voltage is zero, the $3_{H4}(\mu=2)$ level is twofold degenerated, and since this level is a non-Kramers double term, it is applied when voltage is applied. Level 2 and level 3 were $3_{H4}(a)$ level and $3_{H4}(b)$ level being split from this $3_{H4}(\mu=2)$ level.

Accordingly, in this light modulating element, concerning these three levels, the light was excited in $\Lambda$ type between levels $^1D_2$ and $^3H_4(a)$, and between levels $^1D_2$ and $^3H_4(b)$.

The light energy $\omega_1$ of light 21 was selected to correspond to $^3H_4(a) \rightarrow {}^1D_2$ transition between levels 1 and 2, and the light energy $\omega_2$ of light 22 was selected to correspond to $^3H_4(b) \rightarrow {}^1D_2$ transition between levels 1 and 3.

At this time, the light energy $\omega_1$ and $\omega_2$ were adjusted so that $\omega_2 - \omega_1$ might coincide with the central value $\omega_{23}$ of energy between levels 2 and 3. The intensity of the light 21, 22 entering the EIT layer 23 was both 1 W.

FIG. 32 shows the results of investigation to see how the value of $\omega_{23}$ would vary depending on the voltage, by measuring the microwave absorption between levels $^3H_4(a)$ and $^3H_4(b)$ being split while varying the applied voltage, by irradiating with microwave having specific wavelength.

The axis of abscissas is summarized by the electric field intensity E. FIG. 32 also shows a typical absorption spectrum concerning the microwave absorption between levels $^3H_4(a)$ and $^3H_4(b)$.

In the element of the embodiment, $\omega_{23} = 0.07$ cm$^{-1}$ was selected. Hence, in the LaF$_3$, a value of applied voltage was set so that an electric field intensity of about $5 \times 10^4$ V/cm might be applied.

The spectral line width corresponded to the uneven spread between levels $^3H_4(a)$ and $^3H_4(b)$, and the value was about 0.0008 cm$^{-1}$. Hence, by utilizing the level split by voltage application, it is known that a three-level system of $\Lambda$ type having a small uneven spread between levels not coupled by light can be set.

In thus constituted optical element, the transmission intensity of light 22 by presence or absence of light 21 was investigated. First, in the absence of the light 21 since the light 22 is absorbed by the EIT layer 23, the output intensity of the light 22 decreased to about 12% of the input.

In the presence of the light 21 an output intensity of about 69% of the input was obtained. It is confirmed that the light 22 was more likely to pass as compared with the case of absence of light 21.

FIG. 33 shows the results of investigation of absorption spectrum of $^3H_4(b) \rightarrow {}^1D_2$ transition from level 3 to level 1 while varying the light energy $\omega_2$ of the light 22, in a fixed state of the light energy $\omega_1$ of the light 21. The light energy $\omega_1$ of the light 21 was about 16630 cm$^{-1}$.

It was known from FIG. 33 that the absorption of light 22 decreased significantly in the light energy of about 0.07 cm$^{-1}$ at $\omega_2 - \omega_2$ coinciding with the central value $\omega_{23}$ of the energy between levels 2 and 3. It is hence understood that this phenomenon is derived from the EIT.

COMPARATIVE EXAMPLE 5

Using the light modulating element in the same constitution as in the seventh embodiment except that the voltage applied to LaCl$_3$ was changed to zero, the transmission intensity of light 22 was investigated in the presence and absence of light 21. Meanwhile, $\omega_2 - \omega_1$ was adjusted to 0.07 cm$^{-1}$ same as in the seventh embodiment.

First, in the absence of light 21 same as in the seventh embodiment, the output intensity of the light 22 decreased to about 12% of the input. On the other hand, in the presence of light 21 this time, different from the seventh embodiment, the output intensity was also about 12% of the input. Hence, in this comparative example, it is known that the light 22 hardly passes whether the light 21 is absent or present.

As known from the energy level diagram shown in FIG. 31, when the voltage is zero, $\Delta\omega_1 = \Delta\omega_2$ is not established in the majority of Pr$^{3+}$ impurities. Hence, if two beams of light are entered, they are absorbed in the EIT layer, and it is known that the output intensity was not increased.

Accordingly, when the energy distribution between levels is controlled by application of voltage, a very small uneven spread can be set between levels not coupled by light, and hence it may be understood that a favorable EIT characteristic may be obtained.

Eighth Embodiment

The light modulating element of this embodiment is a more specific example of the light modulating element shown in FIG. 26. That is, the EIT layer 23 is Y$_2$O$_3$ dispersing 1 mol % of Eu$^{3+}$ as impurity. As the light 21, 22, pigment laser beams with both light energy $\omega_1$ and $\omega_2$ of about 19025 cm$^{-1}$ are used, and Si photodiodes are used as photodiodes 29, 30. The power source 26 is a direct-current power supply unit.

The energy level is the energy level of Eu$^{3+}$ impurity when an electric field is applied to Y$_2$O$_3$, and more specifically, as shown in FIG. 34, the highest level 1 and middle level 2 are $^5D_1$ level, and the lowest level 3 is $^7F_0$ level.

When the voltage is zero, the $^5D_1$ level is threefold degenerated, and it is split into two levels when a voltage is applied. The level 1 and level 2 are $^5D_1(a)$ level and $^5D_1(b)$ level being split from this $^5D_1$ level. The $^7F_0$ level is a single term.

Accordingly, in this light modulating element, concerning these three levels, the light was excited in V type between levels $^5D_1(a)$ and $^7F_0$, and between levels $^5D_1(b)$ and $^7F_0$.

The light energy $\omega_1$ of light 21 was selected to correspond to $^7F_0 \rightarrow {}^5D_1(b)$ transition between levels 2 and 3, and the light energy $\omega_2$ of light 22 was selected to correspond to $^7F_0 \rightarrow {}^5D_1(a)$ transition between levels 1 and 3.

At this time, the light energy $\omega_1$ and $\omega_2$ were adjusted so that $\omega_2 - \omega_1$ might coincide with the central value $\omega_{12}$ of energy between levels 1 and 2. The intensity of the light 21, 22 entering the EIT layer 23 was both 1 W.

FIG. 35 shows the results of investigation to see how the value of $\omega_{12}$ would vary depending on the voltage, by measuring the microwave absorption between levels $^5D_1(a)$ and $^5D_1(b)$ being split while varying the applied voltage, by exciting light by laser beam from $^7F_0$ level to $^5D_1$ level and further irradiating with microwave having specific wavelength.

The axis of abscissas is summarized by the electric field intensity E. FIG. 35 also shows a typical absorption spectrum concerning the microwave absorption between levels $^5D_1(a)$ and $^5D_1(b)$.

In the element of the embodiment, $\omega_{12} = 0.12$ cm$^{-1}$ was selected. Hence, in the Y$_2$O$_3$, a value of applied voltage was set so that an electric field intensity of about $7 \times 10^4$ V/cm might be applied.

The spectral line width corresponded to the uneven spread between levels $^5D_1(a)$ and $^5D_1(b)$, and the value was about 0.003 cm$^{-1}$. Hence, by utilizing the level split by voltage application, it is known that a three-level system of V type having a small uneven spread between levels not coupled by light can be set.

In thus constituted optical element, the transmission intensity of light 22 by presence or absence of light 21 was investigated. First, in the absence of the light 21 since the light 22 is absorbed by the EIT layer 23, the output intensity of the light 22 decreased to about 15% of the input.

In the presence of the light 21 an output intensity of about 81% of the input was obtained. It is confirmed that the light 22 was more likely to pass as compared with the case of absence of light 21.

Figure 36:
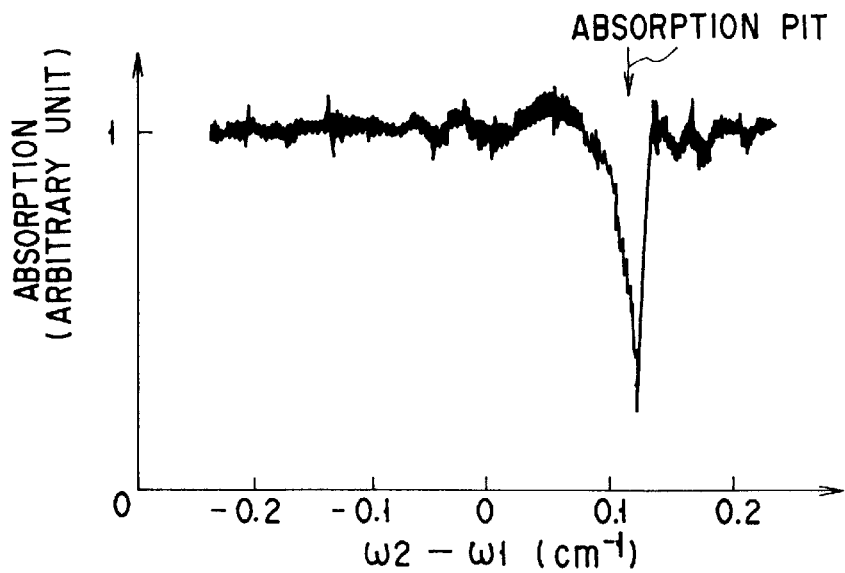
FIG. 36 is a diagram showing results of investigation of light absorption spectrum of $Eu^{3+}$ impurity while varying light energy $\omega_2$ in a fixed state of light energy $\omega_1$ in the light modulating element in the eighth embodiment.

FIG. 36 shows the results of investigation of absorption spectrum of $^7F_0 \rightarrow {}^5D_1(a)$ transition from level 3 to level 1 while varying the light energy $\omega_2$ of the light 22, in a fixed state of the light energy $\omega_1$ of the light 21. The light energy $\omega_1$ of the light 21 was about 19025 cm$^{-1}$.

It was known from FIG. 36 that the absorption of light 22 decreased significantly in the light energy of about 0.12 cm$^{-1}$ at $\omega_2-\omega_1$ coinciding with the central value $\omega_{12}$ of the energy between levels 1 and 2. It is hence understood that this phenomenon is derived from the EIT.

COMPARATIVE EXAMPLE 6

Using the light modulating element in the same constitution as in this embodiment except that the voltage applied to $Y_2O_3$ was changed to zero, the transmission intensity of light 22 was investigated in the presence and absence of light 21. Meanwhile, $\omega_2-\omega_1$ was adjusted to 0.12 cm$^{-1}$ same as in this embodiment.

First, in the absence of light 21 same as in the seventh (sic) embodiment, the output intensity of the light 22 decreased to about 15% of the input. On the other hand, in the presence of light 21 this time, different from the seventh (sic) embodiment, the output intensity was also about 15% of the input. Hence, in this comparative example, it is known that the light 22 hardly passes whether the light 21 is absent or present.

As known from the energy level diagram shown in FIG. 34, when the voltage is zero, $\Delta\omega_1=\Delta\omega_2$ is not established in the majority of $Eu^{3+}$ impurities. Hence, if two beams of light are entered, they are absorbed in the EIT layer, and it is known that the output intensity was not increased.

Accordingly, when the energy distribution between levels is controlled by application of voltage, a very small uneven spread can be set between levels not coupled by light, and hence it may be understood that a favorable EIT characteristic may be obtained.

Ninth Embodiment

The light modulating element of this embodiment is a more specific example of the light modulating element shown in FIG. 26. That is, the EIT layer 23 is BaClF dispersing 1 mol % of $Sm^{2+}$ as impurity. As the light 21, 22, pigment laser beams with both light energy $\omega_1$ and $\omega_2$ of about 15870 cm$^{-1}$ are used, and Si photodiodes are used as photodiodes 29, 30. The power source 26 is a direct-current power supply unit.

Figure 37:
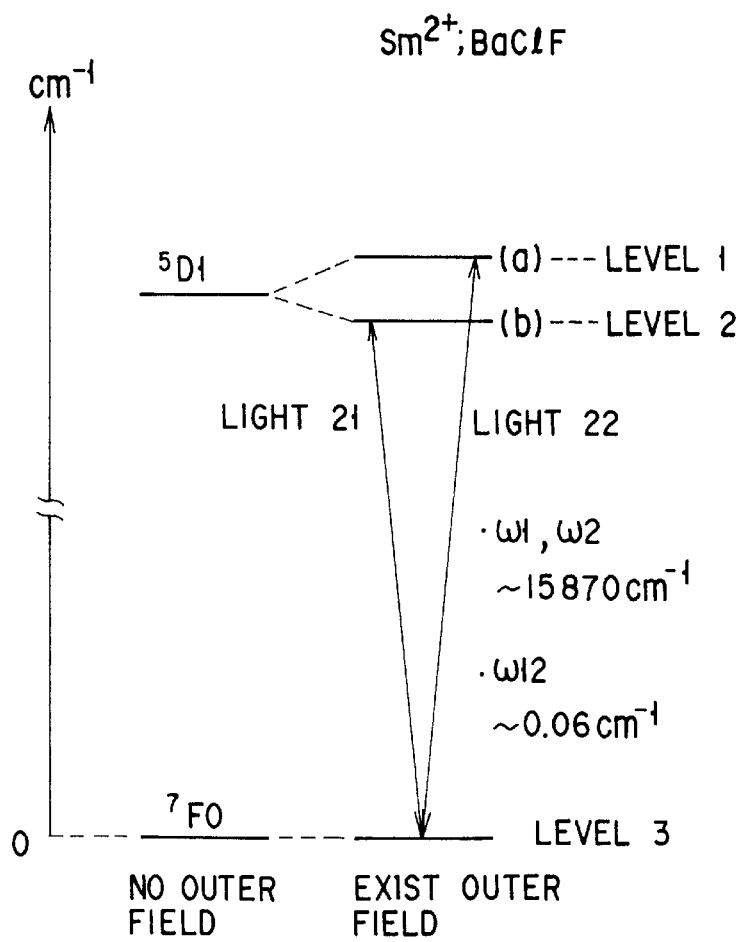
FIG. 37 is a diagram showing energy level of $Sm^{2+}$ impurity in $Sm^{2+}$; BaClF used as the EIT layer in a light modulating element in a ninth embodiment.

The energy level is the energy level of $Sm^{2+}$ impurity when an electric field is applied to BaClF, and more specifically, as shown in FIG. 37, the highest level 1 and middle level 2 are $^5D_1$ level, and the lowest level 3 is $^7F_0$ level.

When the voltage is zero, the $^5D_1$ level is threefold degenerated, and it is split into two levels when a voltage is applied. The level 1 and level 2 are $^5D_1(a)$ level and $^5D_1(b)$ level being split from this $^5D_1$ level. The $^7F_0$ level is a single term.

Accordingly, in this light modulating element, concerning these three levels, the light was excited in V type between levels $^5D_1(a)$ and $^7F_0$, and between levels $^5D_1(b)$ and $^7F_0$.

The light energy $\omega_1$ of light 21 was selected to correspond to $^7F_0 \rightarrow {}^5D_1(b)$ transition between levels 2 and 3, and the light energy $\omega_2$ of light 22 was selected to correspond to $^7F_0 \rightarrow {}^5D_1(a)$ transition between levels 1 and 3.

At this time, the light energy $\omega_1$ and $\omega_2$ were adjusted so that $\omega_2-\omega_1$ might coincide with the central value $\omega_{12}$ of energy between levels 1 and 2. The intensity of the light 21, 22 entering the EIT layer 23 was both 1 W.

FIG. 35 shows the results of investigation to see how the value of $\omega_{12}$ would vary depending on the voltage, by measuring the microwave absorption between levels $^5D_1(a)$ and $^5D_1(b)$ being split while varying the applied voltage, by exciting light by laser beam from $^7F_0$ level to $^5D_1$ level and further irradiating with element comprising a solid which contains a number N of microwave having specific wavelength.

The axis of abscissas is summarized by the square of the electric field intensity E. FIG. 39 shows a typical absorption spectrum concerning the microwave absorption between levels $^5D_1(a)$ and $^5D_1(b)$.

In the element of the embodiment, $\omega_{12}$ was selected to be 0.06 cm$^{-1}$. Hence, in the BaClF, a value of applied voltage was set so that an electric field intensity of about $3\times10^4$ V/cm might be applied.

The spectral line width corresponded to the uneven spread between levels $^5D_1(a)$ and $^5D_1(b)$, and the value was about 0.009 cm$^{-1}$. Hence, by utilizing the level split by voltage application, it is known that a three-level system of V type having a small uneven spread between levels not coupled by light can be set.

In thus constituted optical element, the transmission intensity of light 22 by presence or absence of light 21 was investigated. First, in the absence of the light 21, since the light 22 is absorbed by the EIT layer 23, the output intensity of the light 22 decreased to about 10% of the input.

In the presence of the light 21, an output intensity of about 77% of the input was obtained. It is confirmed that the light 22 was more likely to pass as compared with the case of absence of light 21.

FIG. 39 shows the results of investigation of absorption spectrum of $^7F_0 \rightarrow {}^5D_1(a)$ transition from level 3 to level 1 while varying the light energy $\omega_2$ of the light 22, in a fixed state of the light energy $\omega_1$ of the light 21. The light energy $\omega_1$ of the light 21 was about 15870 cm$^{-1}$.

It was known from FIG. 39 that the absorption of light 22 decreased significantly in the light energy of about 0.06 cm$^{-1}$ at $\omega_2-\omega_1$ coinciding with the central value $\omega_{12}$ of the energy between levels 1 and 2. It is hence understood that this phenomenon is derived from the EIT.

COMPARATIVE EXAMPLE 7

Using the light modulating element in the same constitution as in the ninth embodiment except that the voltage applied to BaClF was changed to zero, the transmission intensity of light 22 was investigated in the presence and absence of light 21. Meanwhile, $\omega_2-\omega_1$ was adjusted to 0.06 cm$^{-1}$ same as in the eighth (sic) embodiment.

First, in the absence of light 21, same as in the ninth embodiment, the output intensity of the light 22 decreased to about 10% of the input. On the other hand, in the presence of light 21, this time, different from the ninth embodiment, the output intensity was also about 10% of the input. Hence, in this comparative example, it is known that the light 22 hardly passes whether the light 21 is absent or present.

As known from the energy level diagram shown in FIG. 37, when the voltage is zero, $\Delta\omega_1=\Delta\omega_2$ is not established in the majority of $Sm^{2+}$ impurities. Hence, if two beams of light are entered, they are absorbed in the EIT layer, and it is known that the output intensity was not increased.

Accordingly, when the energy distribution between levels is controlled by application of voltage, a very small uneven spread can be set between levels not coupled by light, and hence it may be understood that a favorable EIT characteristic may be obtained.

Tenth Embodiment

FIG. 40 is a schematic diagram of a light modulating element according to a tenth embodiment of the invention.

This light modulating element is roughly composed of an EIT layer 23 for modulating the transmission intensity of two lights 21, 22, two electromagnets 31, 32 enclosing the EIT layer 23, a power supply, not shown, for controlling the magnitude of the electric field as the outer field applied to the EIT layer 23 by applying voltage between these electromagnets 31, 32, optical fibers 27, 28 for feeding the light 21, 22 to the EIT layer 23, and photodiodes 29, 30 for measuring the transmission intensity of the two lights emitted from the EIT layer 23.

Of the two lights 21, 22 emitted respectively from the optical fibers 27, 28, the light 21 exciting between levels 1 and 2 in Λ type excitation, or the light 21 (sic) exciting between levels 2 and 3 in V type excitation will irradiate the entire EIT layer 23. Both lights 21, 22 irradiating the EIT layer 23 are laser beams.

In this embodiment, the material of the EIT layer 23 is $Y_3Al_5O_{12}$ dispersing 1 mol % of $Er_{3+}$ as impurity. The lights 21, 22 are pigment laser beams with light energies $\omega_1$, $\omega_2$ both being about 18030 cm$^{-1}$, and Si photodiodes are used as the photodiodes 29, 30.

The energy level is the energy level of $Er_{3+}$ impurity when a magnetic field is applied to $Y_3Al_5O_{12}$, and more specifically, as shown in FIG. 41, the highest level 1 is $^4S_{3/2}$ level, and the middle level 2 and lowest level 3 are selected from the $^4I_{15/2}(Z1)$ level split by the crystal field among the $^4I_{15/2}$ level.

When the magnetic field is zero, the $^4I_{15/2}(Z1)$ level is degenerated twofold, but when magnetic field is applied, this degeneration is eliminated to cause splitting. Level 2 and level 3 are $^4I_{15/2}(a)$ level and $^4I_{15/2}(b)$ level being split from this $^4I_{15/2}(Z1)$ level. At the $^4S_{3/2}$ level, there are four energy levels, and the lowest energy level was used herein.

Accordingly, in this light modulating element, concerning these three levels, the light was excited in Λ type between levels $^4S_{3/2}$ and $^4I_{15/2}(a)$, and between levels $^4S_{3/2}$ and $^4I_{15/2}(b)$.

The light energy $\omega_1$ of light 21 was selected to correspond to $^4I_{15/2}(a) \to {}^4S_{3/2}$ transition between levels 1 and 2, and the light energy $\omega_2$ of light 22 was selected to correspond to $^4I_{15/2}(b) \to {}^4S_{3/2}$ transition between levels 1 and 3.

At this time, the light energy $\omega_1$ and $\omega_2$ were adjusted so that $\omega_2 - \omega_1$ might coincide with the central value $\omega_{23}$ of energy between levels 2 and 3. The intensity of the light 21, 22 entering the EIT layer 23 was both 1 W.

FIG. 42 shows the results of investigation to see how the value of $\omega_{23}$ would vary depending on the magnetic field voltage, by measuring the microwave absorption between levels $^4I_{15/2}(a)$ and $^4I_{15/2}(b)$ being split while varying the outer magnetic field voltage, by irradiating with microwave having specific wavelength.

FIG. 42 also shows a typical absorption spectrum concerning the microwave absorption between levels $^4I_{15/2}(a)$ and $^4I_{15/2}(b)$.

In the element of the embodiment, $\omega_{23} = 0.3$ cm$^{-1}$ was selected. Hence, the electromagnets 11, 12 were manipulated so that a magnetic field of about 300 mT be applied to the $Y_3Al_5O_{12}$.

The spectral line width corresponded to the uneven spread between levels $^4I_{15/2}(a)$ and $^4I_{15/2}(b)$, and the value was about 0.03 cm$^{-1}$. Hence, by utilizing the level split by magnetic field application, it is known that a three-level system of Λ type having a small uneven spread between levels not coupled by light can be set.

In thus constituted optical element, the transmission intensity of light 22 by presence or absence of light 21 was investigated. First, in the absence of the light 21, since the light 22 is absorbed by the EIT layer 23, the output intensity of the light 22 decreased to about 6% of the input.

In the presence of the light 21, an output intensity of about 84% of the input was obtained. It is confirmed that the light 22 was more likely to pass as compared with the case of absence of light 21.

FIG. 43 shows the results of investigation of absorption spectrum of $^4I_{15/2}(b) \to {}^4S_{3/2}$ transition from level 3 to level 1 while varying the light energy $\omega_2$ of the light 22, in a fixed state of the light energy $\omega_1$, of the light 21. The light energy $\omega_1$ of the light 21 was about 18030 cm$^{-1}$.

It was known from FIG. 43 that the absorption of light 22 decreased significantly in the light energy of about 0.3 cm$^{-1}$ at $\omega_2 - \omega_1$ coinciding with the central value $\omega_{23}$ of the energy between levels 2 and 3. It is hence understood that this phenomenon is derived from the EIT.

COMPARATIVE EXAMPLE 8

Using the light modulating element in the same constitution as in the tenth embodiment except that the outer magnetic field applied to $Y_3Al_5O_{12}$ was changed to zero, the transmission intensity of light 22 was investigated in the presence and absence of light 21. Meanwhile, $\omega_2 - \omega_1$ was adjusted to 0.3 cm$^{-1}$ same as in the sixth embodiment.

First, in the absence of light 21, same as in the tenth embodiment, the output intensity of the light 22 decreased to about 6% of the input. On the other hand, in the presence of light 21, this time, different from the tenth embodiment, the output intensity was also about 6% of the input. Hence, in this comparative example, it is known that the light 22 hardly passes whether the light 21 is absent or present.

As known from the energy level diagram shown in FIG. 41, when the magnitude of the magnetic field is zero, $\Delta\omega_1 = \Delta\omega_2$ is not established in the majority of $Er^{3+}$ impurities. Hence, if two beams of light are entered, they are absorbed in the EIT layer, and it is known that the output intensity was not increased.

Accordingly, when the energy distribution between levels is controlled by application of outer magnetic field, a very small uneven spread can be set between levels not coupled by light, and hence it may be understood that a favorable EIT characteristic may be obtained.

Eleventh Embodiment

The light modulating element of this embodiment is a more specific example of the light modulating element shown in FIG. 40. That is, the EIT layer 23 is an InAs/GaSb superlattice with layer thickness of both InAs layer and GaSb layer being 10 nm and the overall thickness of the superlattice being 2 μm. FIG. 44 shows a sectional view of this InAs/GaSb superlattice 30. The lights 21, 22 are steam laser beams with light energies $\omega_1$, $\omega_2$ being both about 100 cm$^{-1}$, and further the two lights emitted from the EIT layer 23 are transformed into photodiodes, and their intensity is measured by two carbon bolometers.

To apply magnetic field to the InAs/GaSb superlattice 20, electromagnets 31, 32 were manipulated. The magnetic field was applied in the vertical direction to the superlattice. The superlattice 30 was formed on the GaSb substrate 33.

As the energy level, using the quantum level when a magnetic field was applied to the InAs/GaSb superlattice 30, more specifically as shown in FIG. 43, the highest level 1 and middle level 2 were $E_1$ level in the InAs layer, and the lowest level 3 was selected from $H_1$ level in the GaSB layer. When the magnetic field was zero, the $E_1$ level and $H_1$ level were degenerated, but when a magnetic field was applied to the superlattice in the vertical direction, each level was completely split into a discrete Landau level. As level 1 and level 2, $E_1$(N=16) level and $E_1$(N=15) level split from this $E_1$ level were used, and level 3 was $H_1$(N=16) level split from the $H_1$ level.

Accordingly, in this light modulating element, concerning these three levels, the light was excited in V type between levels $E_1$(N=16) and $H_1$(N=16), and between levels $E_1$(N=15) and $H_1$(N=15).

The light energy $\omega_1$ of light 21 was selected to correspond to $H_1$(N=16)→$E_1$(N=15) transition between levels 2 and 3, and the light energy $\omega_2$ of light 22 was selected to correspond to $H_1$(N=16)→$E_1$(N=16) transition between levels 1 and 3.

At this time, the light energy $\omega_1$ and $\omega_2$ were adjusted so that $\omega_2-\omega_1$ might coincide with the central value $\omega_{12}$ of energy between levels 1 and 2. The intensity of the light 21, 22 entering the EIT layer 23 was both 1 W. Herein, at the Landau levels (N=0, 1, 3, . . . , 15, 16, . . . ) split from the $E_1$ level ($H_1$ level), the energy between adjacent levels was constant regardless of N, and its magnitude increases in proportion to the intensity of the magnetic field.

FIG. 46 shows the results of investigation to see how the value of $\omega_{12}$ would vary depending on the magnetic field voltage, by determining the magnetic field dependence of the energy between Landau levels concerning E1 from the experiment of cyclotron resonance on electron using far infrared ray. FIG. 46 also shows the spectrum concerning cyclotron resonance between levels $E_1$(N=11) and $E_1$(N=12) by application of magnetic field of about 1 T.

In the light modulating element of the embodiment, $\omega_{12}$=10 cm$^{-1}$ was selected. Hence, the electromagnets 31, 32 were manipulated so that a magnetic field of about 1 T be applied to the InAs/GaSb superlattice 30.

The spectral line width corresponded to the uneven spread between levels $E_1$(N=11) and $E_1$(N=12), and the value was about 0.5 cm$^{-1}$. As mentioned above, since the energy between Landau levels is constant regardless of N, the uneven spread between levels $E_1$(N=15) and $E_1$(N=16) by application of magnetic field of about 1 T was also about 0.5 cm$^{-1}$.

Hence, by utilizing the level split by magnetic field application, it is known that a three-level system of V type having a small uneven spread between levels not coupled by light can be set.

In thus constituted optical element, the transmission intensity of light 22 by presence or absence of light 21 was investigated. First, in the absence of the light 21, since the light 22 is absorbed by the EIT layer 23, the output intensity of the light 22 decreased to about 36% of the input.

In the presence of the light 21, an output intensity of about 91% of the input was obtained. It is confirmed that the light 22 was more likely to pass as compared with the case of absence of light 21.

FIG. 47 shows the results of investigation of absorption spectrum of $H_1$(N=16)→$E_1$(N=16) transition from level 3 to level 1 while varying the light energy $\omega_2$ of the light 22, in a fixed state of the light energy $\omega_2$ of the light 21. The light energy $\omega_1$ of the light 21 was about 100 cm$^{-1}$.

It was known from FIG. 47 that the absorption of light 22 decreased significantly in the light energy of about 10 cm$^{-1}$ at $\omega_2-\omega_1$ coinciding with the central value $\omega_{12}$ of the energy between levels 1 and 2. It is hence understood that this phenomenon is derived from the EIT.

Using the light modulating element in the same constitution as in the ninth (sic) embodiment except that the outer magnetic field applied to the InAs/GaSb superlattice 30 was changed to zero, the transmission intensity of light 22 was investigated in the presence and absence of light 21. Meanwhile, $\omega_2-\omega_1$ was adjusted to 10 cm$^{-1}$ same as in the eleventh embodiment.

First, in the absence of light 21, same as in the eleventh embodiment, the output intensity of the light 22 decreased to about 36% of the input. On the other hand, in the presence of light 21, this time, different from the eleventh embodiment, the output intensity was also about 36% of the input. Hence, in this comparative example, it is known that the light 22 hardly passes whether the light 21 is absent or present.

As known from the energy level diagram shown in FIG. 45, when the magnitude of the magnetic field is zero, the Landau levels are not formed, and $\Delta\omega_1=\Delta\omega_2$ is not established. Hence, if two beams of light are entered, it is known that the output intensity was not increased.

Accordingly, when the energy distribution between levels is controlled by application of outer magnetic field, a very small uneven spread can be set between levels not coupled by light, and hence it may be understood that a favorable EIT characteristic may be obtained.

Twelfth Embodiment

Figure 48:
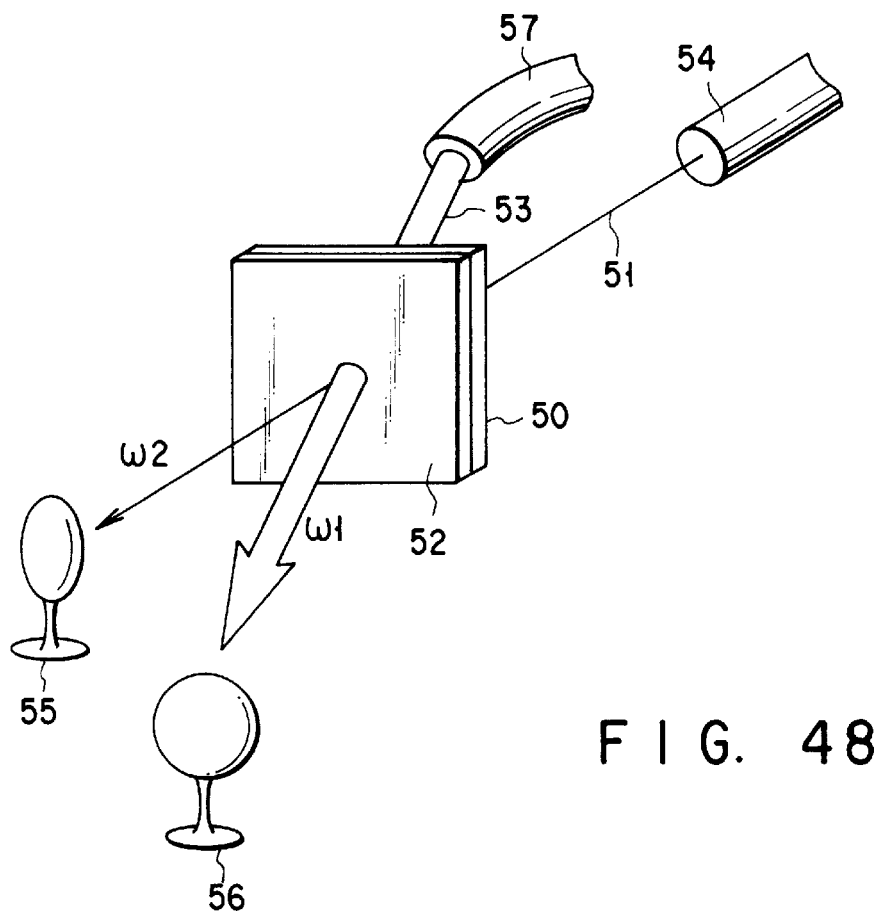
FIG. 48 is a diagram schematically showing a light modulating element in a twelfth embodiment of the invention.

FIG. 48 schematically shows the light modulating element according to a twelfth embodiment of the invention.

This light modulating element has a quantum structure such as quantum well, quantum wire and quantum box, and is composed of an EIT layer 52 for modulating the transmission intensity of signal light 51, a semiconductor laser (not shown) provided adjacently to the EIT layer 52 for feeding gate light 53 to the EIT layer 52, an optical fiber 54 for leading and feeding signal light 51 into the EIT layer 52, a photodiode 55 for measuring the intensity of the signal light 51 emitted from the EIT layer 52, and a photodiode 56 for measuring the intensity of the gate light 53 emitted from the EIT layer 52.

The EIT layer 52 has a support 50. The gate light 53 emitted from the semiconductor laser is guided into the EIT layer 52 so as to irradiate the entire EIT layer 52. The signal light 51 is a laser light.

Figure 49A:
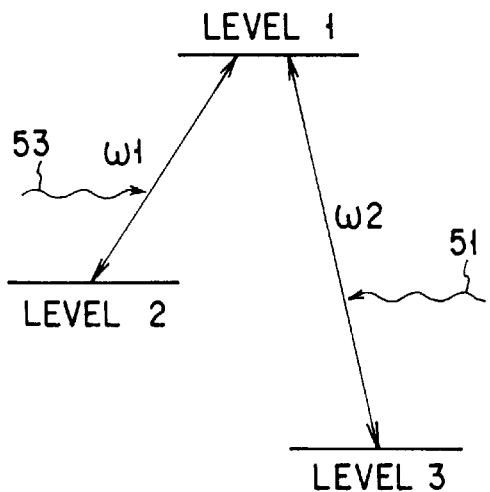
FIGS. 49A and FIG. 49B are diagrams schematically showing the relation of energy level, gate light, and signal light in the EIT layer of the light modulating element in FIG. 48.
Figure 49B:
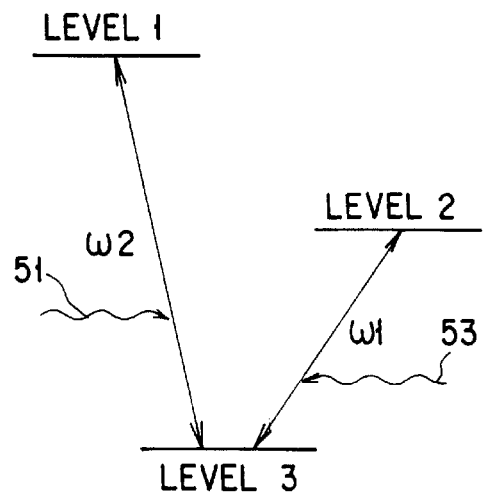

FIG. 49A and FIG. 49B schematically show the relation of the energy level in the EIT layer 52, and the gate light 53, and signal light 51.

In the case of the Λ type excitation shown in FIG. 49A, the material for the EIT layer 52 is selected from a system satisfying the relation of $\sigma_{23} \leq \sigma_{12}$ and $\sigma_{23} \leq \sigma_{13}$, of the standard deviation $\sigma_{23}$ of the energy between level 2 and level 3, with respect to the standard deviation $\sigma_{12}$ of the level between level 1 and level 2, and standard deviation $\sigma_{13}$ of energy between level 1 and level 3.

Herein, $\sigma_{12}$, $\sigma_{13}$, and $\sigma_{23}$ are defined as follows.

$$\sigma_{12}=\{(1/N)\Sigma[\omega_{12}(i)-<\omega_{12}>]^2\}^{1/2}$$

$$\sigma_{13}=\{(1/N)\Sigma[\omega_{13}(i)-<\omega_{13}>]^2\}^{1/2}$$

$$\sigma_{23}=\{(1/N)\Sigma[\omega_{23}(i)-<\omega_{23}>]^2\}^{1/2}$$

where N is the total number of quantum structures in the EIT layer 52, $\omega_{12}(i)$ is the energy between level 1 and level 2 of quantum well of i-th (i=1 to N) quantum structure, $\omega_{13}(i)$ is the energy between level 1 and level 3 of quantum well of i-th (i=1 to N) quantum structure, $\omega_{23}(i)$ is the energy between level 2 and level 3 of quantum well of i-th (i=1 to N) quantum structure, $<\omega_{12}>$ is the mean of $\omega_{12}(i)$ in the quantum well of all N quantum structures, $<\omega_{13}>$ is the mean of $\omega_{13}(i)$ in the quantum well of all N quantum structures, and $<\omega_{23}>$ is the mean of $\omega_{23}(i)$ in the quantum well of all N quantum structures.

Moreover, when the gate light 53 excites between level 1 and level 2, the signal light 51 excites between level 1 and level 3, and supposing the light energy of gate light 53 and gate light 41 to be respectively $\omega_1$ and $\omega_2$, and the central value of the energy difference between level 2 and level 3 to be $\omega_{23}$, it is adjusted so that the gate light 53 and signal light 51 may satisfy $\omega_2-\omega_1=\omega_{23}$.

By satisfying such conditions, when the EIT layer 52 is irradiated with gate light 53 and signal light 51, the majority of pseudo-atoms in the EIT layer 52 will satisfy the relation of $\Delta\omega_1=\Delta\omega_2$.

Therefore, In the absence of the gate light 53, the signal light 51 is absorbed in the EIT layer 52 and is hardly transmitted, but in the presence of the gate light 53, absorption of signal light 51 in the EIT layer 52 is suppressed, so that a large optical output may be obtained.

On the other hand, in the case of the V type excitation shown in FIG. 49B, the material for the EIT layer 52 is selected from a system satisfying the relation of $\sigma_{12}\leq\sigma_{13}$ and $\sigma_{12}\leq\sigma_{23}$, of the standard deviation $\sigma_{12}^2$ of the energy between level 1 and level 2, with respect to the standard deviation $\sigma_{13}$ of the level between level 1 and level 2, and standard deviation $\sigma_{23}$ of energy between level 2 and level 3.

Moreover, when the gate light 53 excites between level 2 and level 3, the signal light 51 excites between level 1 and level 3, and supposing the light energy of gate light 53 and gate light 41 to be respectively $\omega_1$, and $\omega_2$, and the central value of the energy difference between level 1 and level 2 to be $\omega_{12}$, it is adjusted so that the gate light 53 and signal light 51 may satisfy $\omega_2-\omega_1=\omega_{12}$.

By satisfying such conditions, when the EIT layer 52 is irradiated with gate light 53 and signal light 51, the majority of pseudo-atoms in the EIT layer 52 will satisfy the relation of $\Delta\omega_1=\Delta\omega_2$.

Therefore, In the absence of the gate light 53, the signal light 51 is absorbed in the EIT layer 52 and is hardly transmitted, but in the presence of the gate light 53, absorption of signal light 51 in the EIT layer 52 is suppressed, so that a large optical output may be obtained.

In the actual system, meanwhile, concerning two levels not coupled with light among three levels, first the energy between the levels is determined, and on the basis of this value, the light energy $\omega_1$ and $\omega_2$ of the gate light 53 and signal light 51 must be individually determined.

The transition between the levels not coupled with light is forbidden in principle, and it is had to observed by usual light absorption or fluorescence measurement, but by using two light absorptions or the like, it is possible to determine experimentally the accurate energy between levels or the size of uneven spread.

Thirteenth Embodiment

The light modulating element of this embodiment is a more specific example of the light modulating element shown in FIG. 48. That is, the light modulating element of the embodiment is composed of GaAs/AlGaAs superlattice as the EIT layer 52, pigment laser as light source of gate light 53 and light source of signal light 51, and Si photodiodes as photodiodes 55, 56.

Figure 50:
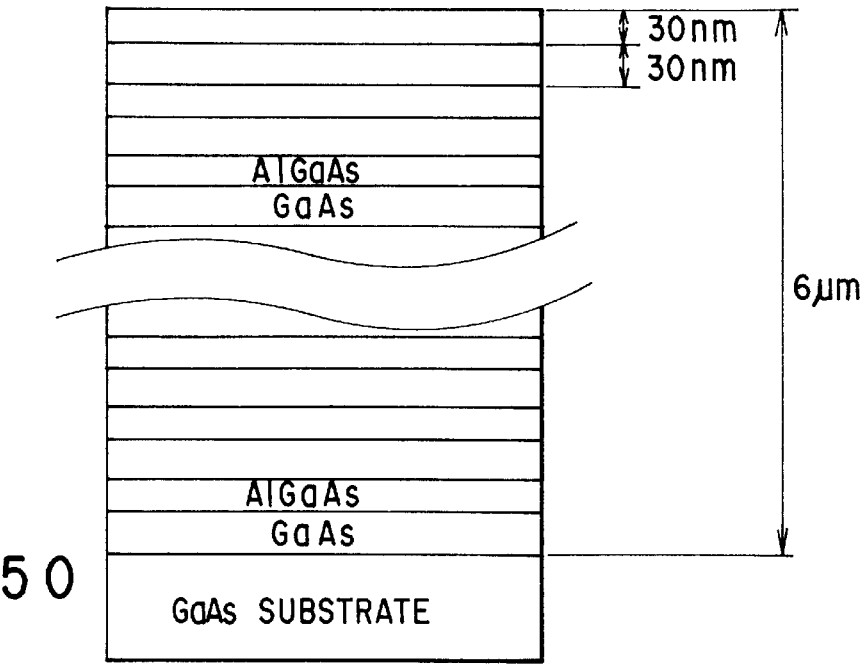
FIG. 50 is a sectional view showing GaAs/AlGaAs superlattice used as the EIT layer in a light modulating element in a thirteenth embodiment.

FIG. 50 shows a sectional view of the GaAs/AlGaAs superlattice used in this embodiment.

The GaAs/AlGaAs superlattice is formed on a GaAs substrate, the thickness of the GaAs layer as the quantum well layer is 30 nm, and the thickness of the AlGaAs layer as quantum barrier layer is 30 nm. The overall thickness of the GaAs/AlGaAs superlattice is 6 $\mu$m.

In this embodiment, by forming a thick quantum barrier layer, electronic coupling between quantum wells is suppressed, and formation of sub-band leading to unclear energy level is suppressed. Moreover, to suppress light absorption by GaAs substrate, the substrate is partly etched, so that the light may be emitted only to the superlattice. Incidentally, doping of impurities is not conducted.

Figure 51:
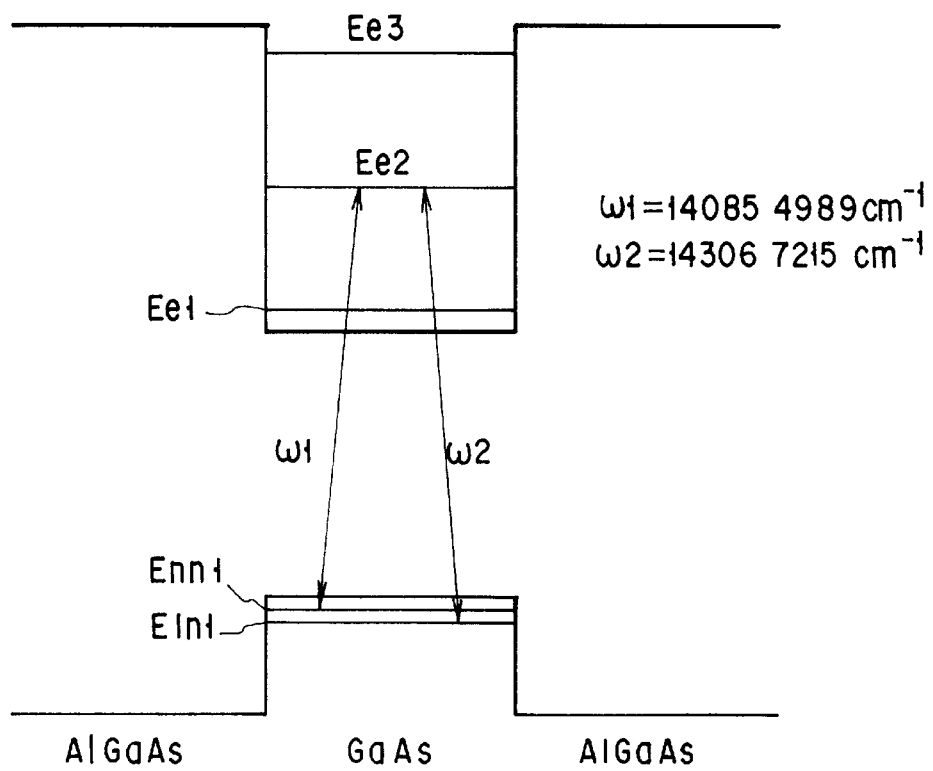
FIG. 51 is a diagram showing quantum well level of the GaAs/AlGaAs superlattice used as the EIT layer in the light modulating element in the thirteenth embodiment.

Three energy levels are levels in the GaAs layer, and as shown in FIG. 51, the highest level 1 is $E_{e2}$ level in the conductive band, the middle level 2 and lowest level 3 are $E_{hh1}$ level and $E_{1h1}$ level in the valance band.

Accordingly, in the embodiment, concerning the three levels, the light was excited in $\Lambda$ type between levels $E_{e2}$ and $E_{hh1}$ and between levels $E_{e2}$ and $E_{1h1}$. The light energy $\omega_1$ of the gate light was selected to correspond to $E_{hh1} \rightarrow E_{e2}$ transition between level 1 and level 2, and the light energy $\omega_2$ of the signal light was selected to correspond to $E_{1h1} \rightarrow E_{e2}$ transition between level 1 and level 3.

The light energy $\omega_1$ and $\omega_2$ were adjusted so that $\omega_2-\omega_1$ may coincide with the central value $\omega_{23}$ of energy between level 2 and level 3. The intensity of the gate light was 1 W and the intensity of the signal light entering the EIT layer was 1 mW.

In thus constituted light modulating element, the transmission light intensity of signal light was investigated in the presence or absence of gate light.

As a result, in the absence of gate light, the signal light was absorbed in the EIT layer, and the output intensity of the signal light was about 3% of the input strength of the signal light, and decreased to a low value.

On the other hand, in the presence of the gate light, the output intensity of the signal light is about 45% of the input intensity of the signal light, and, as compared with the case in the absence of the gate light, it was confirmed that the signal light was more likely to pass.

FIG. 52 shows the results of investigation of absorption spectrum from level 3 to level 1 while varying the light energy $\omega_2$ (frequency) of the signal light, in a fixed state of the light energy $\omega_1$ (frequency) of the gate light. The light energy $\omega_1$ was about 14085.4989 $cm^{-1}$.

It was known from FIG. 52 that the absorption of signal light decreased significantly in vicinity of the light energy at $\omega_2-\omega_1$ coinciding with the central value $\omega_{23}$ of the energy between levels 2 and 3. It is hence understood that this phenomenon is derived from the EIT.

Fourteenth Embodiment

The light modulating element of this embodiment is a more specific example of the light modulating element shown in FIG. 48. That is, the light modulating element of the embodiment is composed of InGaN/AlGaN superlattice as the EIT layer 52, pigment laser as light source of gate light 53 and light source of signal light 51, and Si photodiodes as photodiodes 55, 56.

FIG. 53 shows a sectional view of the InGaN/AlGaN superlattice used in this embodiment.

The InGaN/AlGaN superlattice is formed on a sapphire substrate, the thickness of the InGaN layer as the quantum well layer is 30 nm, and the thickness of the AlGaN layer as quantum barrier layer is 30 nm. The overall thickness of the InGaN/AlGaN superlattice is 6 $\mu$m. Moreover, to suppress light absorption by the substrate, the substrate is partly etched, so that the light may be emitted only to the superlattice.

In this embodiment, by forming a thick quantum barrier layer, electronic coupling between quantum wells is suppressed, and formation of sub-band leading to unclear energy level is suppressed. Incidentally, doping of impurities is not conducted.

Figure 54:
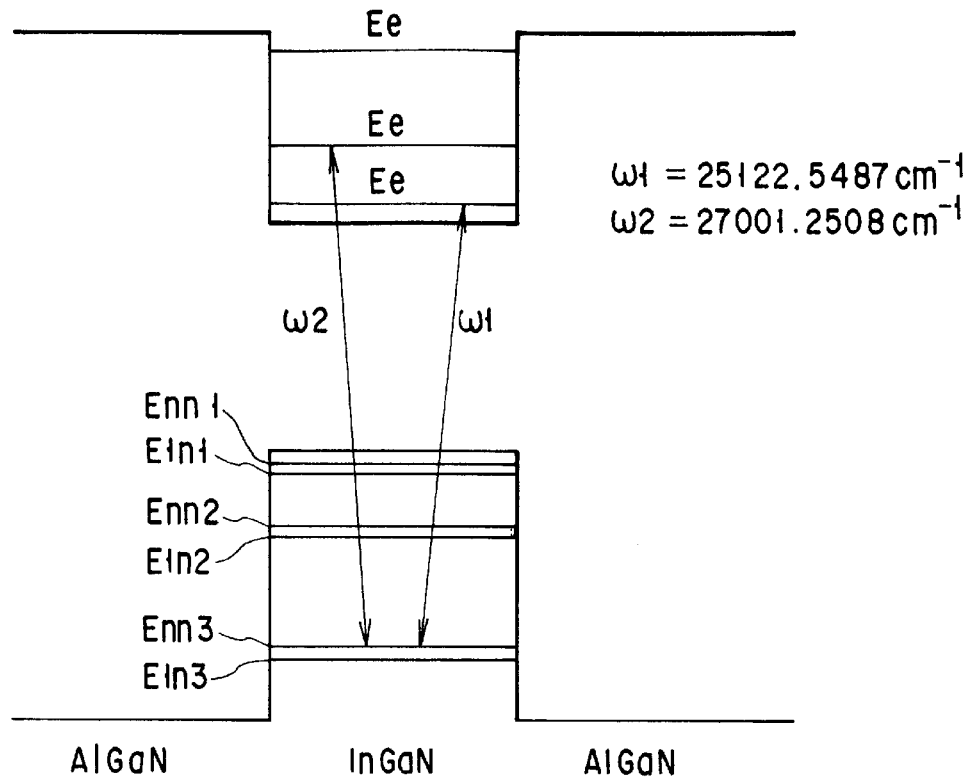
FIG. 54 is a diagram showing quantum well level of the InGaN/AlGaN superlattice used as the EIT layer in the light modulating element in the fourteenth embodiment.

Three energy levels are levels in the InGaN layer, and as shown in FIG. 54, the highest level 1 and middle level 2 are $E_{e2}$ level and $E_{e1}$ level in the conductive band, and the lowest level 3 is $E_{hh3}$ level in the valance band.

Accordingly, in the embodiment, concerning the three levels, the light was excited in V type between levels $E_{e1}$ and $E_{hh3}$ and between levels $E_{e2}$ and $E_{hh3}$. The light energy $\omega_1$ of the gate light was selected to correspond to $E_{hh3} \rightarrow E_{e1}$ transition between level 2 and level 3, and the light energy $\omega_2$ of the signal light was selected to correspond to $E_{hh3} \rightarrow E_{e2}$ transition between level 1 and level 3.

The light energy $\omega_1$ and $\omega_2$ were adjusted so that $\omega_2 - \omega_1$ may coincide with the central value $\omega_{12}$ of energy between level 1 and level 2. The intensity of the gate light was 1 W and the intensity of the signal light entering the EIT layer was 1 mW.

In thus constituted light modulating element, the transmission light intensity of signal light was investigated in the presence or absence of gate light.

As a result, in the absence of gate light, the signal light was absorbed in the EIT layer, and the output intensity of the signal light was about 3% of the input strength of the signal light, and decreased to a low value.

On the other hand, in the presence of the gate light, the output intensity of the signal light is about 45% of the input intensity of the signal light, and, as compared with the case in the absence of the gate light, it was confirmed that the signal light was more likely to pass.

Figure 55:
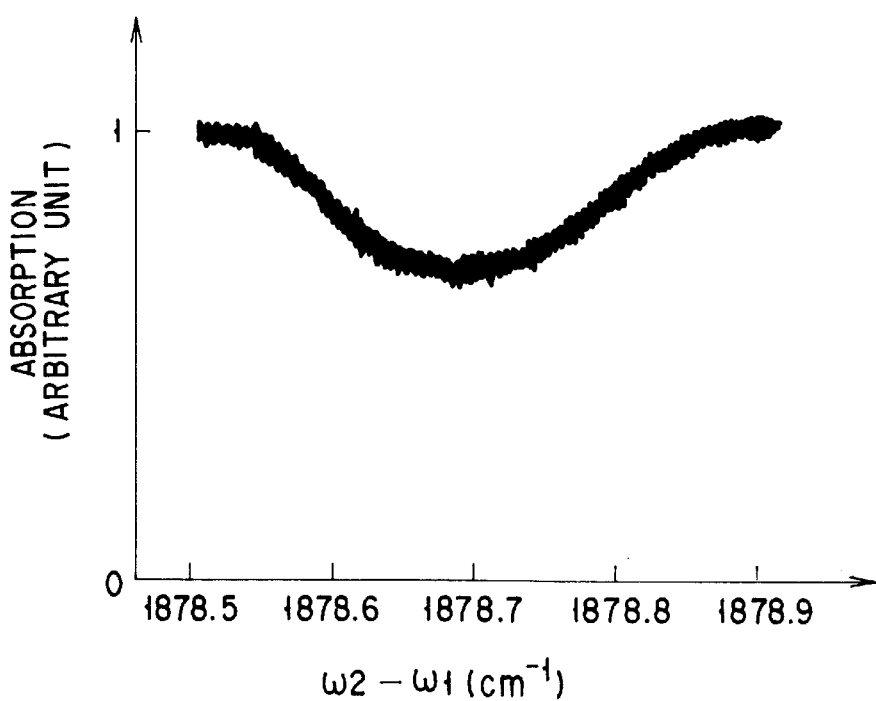
FIG. 55 is a diagram showing results of investigation of absorption spectrum from level 3 to level 1, while varying the light energy of single light, in a fixed state of light energy of gate light in the light modulating element in the fourteenth embodiment.

FIG. 55 shows the results of investigation of absorption spectrum from level 3 to level 1 while varying the light energy $\omega_2$ (frequency) of the signal light, in a fixed state of the light energy $\omega_1$ (frequency) of the gate light. The frequency of gate light $\omega_1$ was about 28122.5487 cm$^{-1}$.

It was known from FIG. 55 that the absorption of signal light decreased significantly in vicinity of the light energy at $\omega_2 - \omega_1$ coinciding with the central value $\omega_1 2$ of the energy between levels 1 and 2. It is hence understood that this phenomenon is derived from the EIT.

Fifteenth Embodiment

The light modulating element of this embodiment is a more specific example of the light modulating element shown in FIG. 48. That is, the light modulating element of the embodiment is composed of ZnSe/MgZnSeS superlattice as the EIT layer 52, pigment laser as light source of gate light 53 and light source of signal light 51, and Si photodiodes as photodiodes 55, 56.

FIG. 56 shows a sectional view of the ZnSe/MgZnSeS superlattice used in this embodiment.

The ZnSe/MgZnSeS superlattice is formed on a ZnSe substrate, the thickness of the ZnSe layer as the quantum well layer is 30 nm, and the thickness of the MgZnSeS layer as quantum barrier layer is 30 nm. The overall thickness of the ZnSe/MgZnSeS superlattice is 6 $\mu$m.

In this embodiment, by forming a thick quantum barrier layer, electronic coupling between quantum wells is suppressed, and formation of sub-band leading to unclear energy level is suppressed. Incidentally, doping of impurities is not conducted.

Three energy levels are levels in the ZnSe layer, and as shown in FIG. 57, the highest level 1 and middle level 2 are $E_{e2}$ level and $E_{e1}$ level in the conductive band, and the lowest level 3 is $E_{hh3}$ level in the valance band.

Accordingly, in the embodiment, concerning the three levels, the light was excited in V type between levels $E_{e1}$ and $E_{hh3}$ and between levels $E_{e2}$ and $E_{hh3}$. The light energy $\omega_1$ of the gate light was selected to correspond to $E_{hh3} \rightarrow E_{e1}$ transition between level 2 and level 3, and the light energy $\omega_2$ of the signal light was selected to correspond to $E_{hh3} \rightarrow E_{e2}$ transition between level 1 and level 3.

The light energy $\omega_1$ and $\omega_2$ were adjusted so that $\omega_2 - \omega_1$ may coincide with the central value $\omega_{12}$ of energy between level 1 and level 2. The intensity of the gate light was 1 W and the intensity of the signal light entering the EIT layer was 1 mW.

In thus constituted light modulating element, the transmission light intensity of signal light was investigated in the presence or absence of gate light.

As a result, in the absence of gate light, the signal light was absorbed in the EIT layer, and the output intensity of the signal light was about 3% of the input strength of the signal light, and decreased to a low value.

On the other hand, in the presence of the gate light, the output intensity of the signal light is about 45% of the input intensity of the signal light, and, as compared with the case in the absence of the gate light, it was confirmed that the signal light was more likely to pass.

Figure 58:
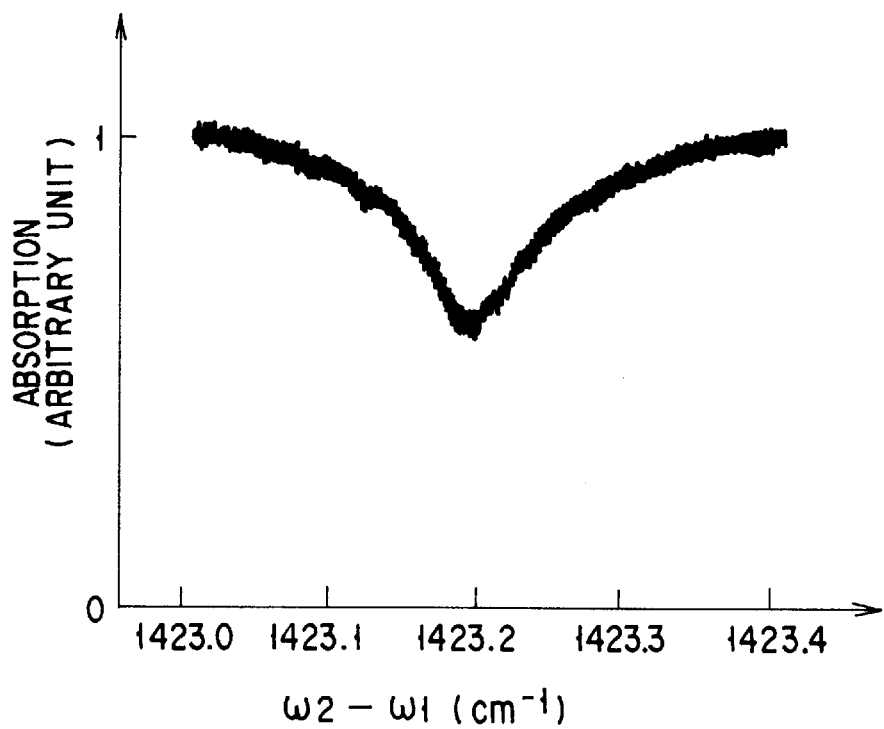
FIG. 58 is a diagram showing results of investigation of absorption spectrum from level 3 to level 1, while varying the light energy of single light, in a fixed state of light energy of gate light in the light modulating element in the fifteenth embodiment.

FIG. 58 shows the results of investigation of absorption spectrum from level 3 to level 1 while varying the light energy $\omega_2$ (frequency) of the signal light, in a fixed state of the light energy $\omega_1$ (frequency) of the gate light. The frequency of gate light $\omega_1$ was about 25069.8247 cm$^{-1}$.

It was known from FIG. 58 that the absorption of light of $\omega_2$ decreased significantly in vicinity of the light energy at $\omega_2 - \omega_1$ coinciding with the central value $\omega_{12}$ of the energy between levels 1 and 2. It is hence understood that this phenomenon is derived from the EIT.

Sixteenth Embodiment

The light modulating element of this embodiment is a more specific example of the light modulating element shown in FIG. 48. That is, the light modulating element of the embodiment is composed of GaAs/AlGaAs superlattice as the EIT layer 52, infrared semiconductor laser as light source of gate light 53 and light source of signal light 51, and MCT detectors instead of photodiodes 55, 56 for measuring the output light of the EIT layer 52.

Figure 59:
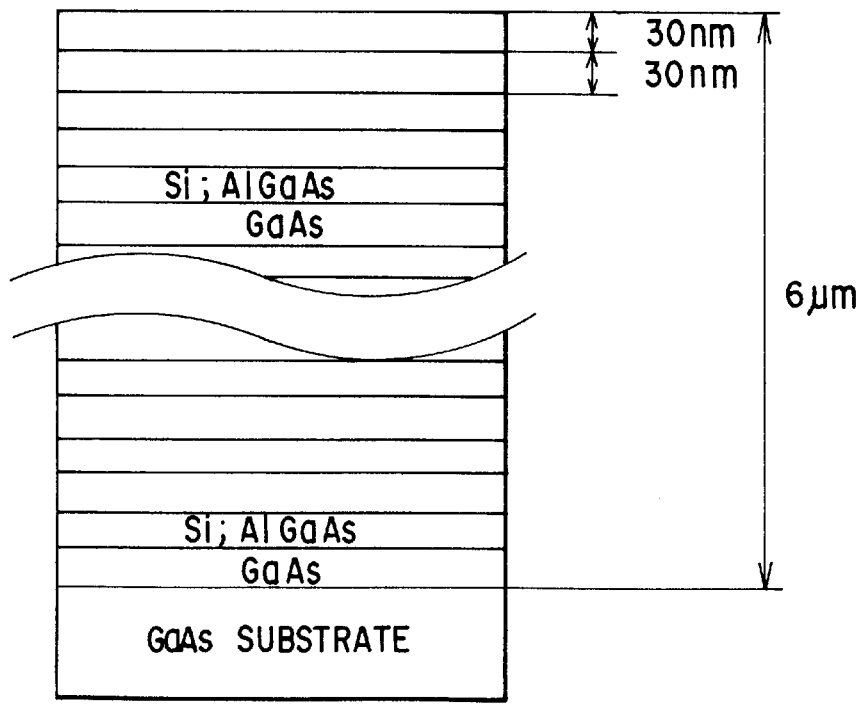
FIG. 59 is a sectional view showing GaAs/AlGaAs superlattice used as the EIT layer in a light modulating element in a sixteenth embodiment.

FIG. 59 shows a sectional view of the GaAs/AlGaAs superlattice used in this embodiment.

The GaAs/AlGaAs superlattice is formed on a GaAs substrate, the thickness of the GaAs layer as the quantum well layer is 30 nm, and the thickness of the AlGaAs layer as quantum barrier layer is 30 nm. The overall thickness of the GaAs/AlGaAs superlattice is 6 µm.

In this embodiment, by forming a thick quantum barrier layer, electronic coupling between quantum wells is suppressed, and formation of sub-band leading to unclear energy level is suppressed. Incidentally, by doping of Si as donor impurities in the AlGaAs layer, electrons were implanted in the conductive band of the GaAs layer.

Three energy levels are levels in the GaAs layer, and as shown in FIG. 60, the highest level 1 is $E_{e3}$ level, middle level 2 is $E_{e2}$, and lowest level 3 is $E_{e1}$ level.

Accordingly, in the embodiment, concerning the three levels, the light was excited in Λ type between levels $E_{e3}$ and $E_{e2}$ and between levels $E_{e3}$ and $E_{e1}$. The light energy $\omega_1$ of the gate light was selected to correspond to $E_{e2} \rightarrow E_{e4}$ transition between level 1 and level 2, and the light energy $\omega_2$ of the signal light was selected to correspond to $E_{e1} \rightarrow E_{e3}$ transition between level 1 and level 3.

The light energy $\omega_1$ and $\omega_2$ were adjusted so that $\omega_2-\omega_1$ may coincide with the central value $\omega_{23}$ of energy between level 2 and level 3. The intensity of the gate light was 1 W and the intensity of the signal light entering the EIT layer was 1 mW.

In thus constituted light modulating element, the transmission light intensity of signal light was investigated in the presence or absence of gate light.

As a result, in the absence of gate light, the signal light was absorbed in the EIT layer, and the output intensity of the signal light decreased to about 15% of the input strength of the signal light.

On the other hand, in the presence of the gate light, the output intensity of the signal light is about 56% of the input intensity of the signal light, and, as compared with the case in the absence of the gate light, it was confirmed that the signal light was more likely to pass.

FIG. 61 shows the results of investigation of absorption spectrum from level 3 to level 1 while varying the light energy $\omega_2$ (frequency) of the signal light, in a fixed state of the light energy $\omega_1$ (frequency) of the gate light. The frequency of gate light $\omega_1$ was about 1024.5583 cm$^{-1}$.

It was known from FIG. 61 that the absorption of light of $\omega_2$ decreased significantly in vicinity of the light energy at $\omega_2-\omega_1$ coinciding with the central value $\omega_{23}$ of the energy between levels 2 and 3. It is hence understood that this phenomenon is derived from the EIT.

Seventeenth Embodiment

The light modulating element of this embodiment is similar to the light modulating element shown in FIG. 48, being composed of ZnSe/MgZnSeS superlattice as the EIT layer 52, infrared semiconductor laser as light source of gate light 53 and light source of signal light 51, and MCT detectors instead of photodiodes 55, 56 for measuring the output light of the EIT layer 52.

Figure 62:
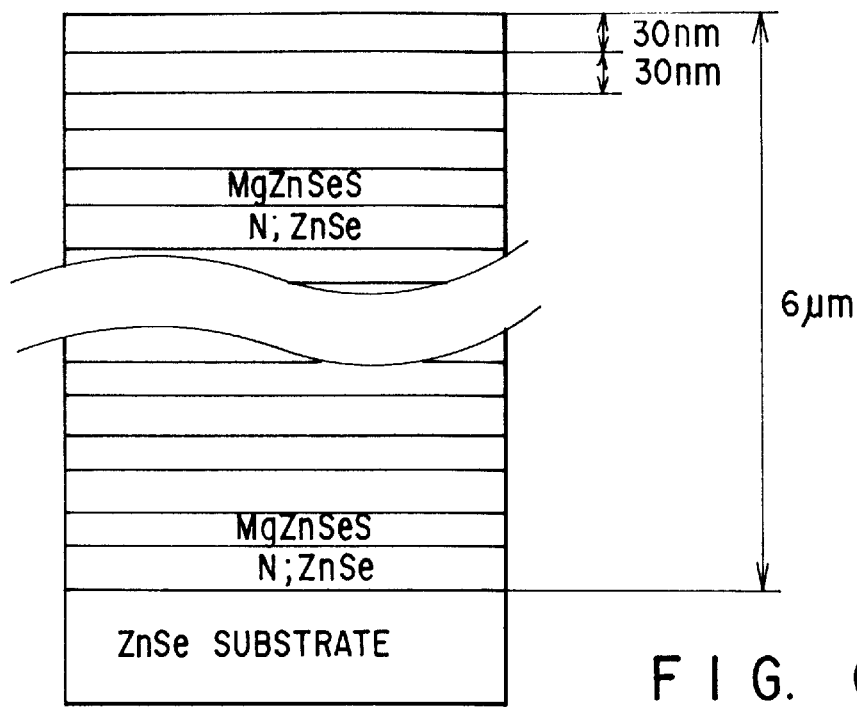
FIG. 62 is a sectional view showing ZnSe/MgZnSeS superlattice used as the EIT layer in a light modulating element in a seventeenth embodiment.

FIG. 62 shows a sectional view of the ZnSe/MgZnSeS superlattice used in this embodiment.

The ZnSe/MgZnSeS superlattice is formed on a ZnSe substrate, the thickness of the ZnSe layer as the quantum well layer is 30 nm, and the thickness of the MgZnSeS layer as quantum barrier layer is 30 nm. The overall thickness of the ZnSe/MgZnSeS superlattice is 6 µm.

In this embodiment, by forming a thick quantum barrier layer, electronic coupling between quantum wells is suppressed, and formation of sub-band leading to unclear energy level is suppressed. Incidentally, by doping of N as acceptor impurities in the ZnSe layer, holes were implanted in the valence band of the ZnSe layer.

Figure 63:
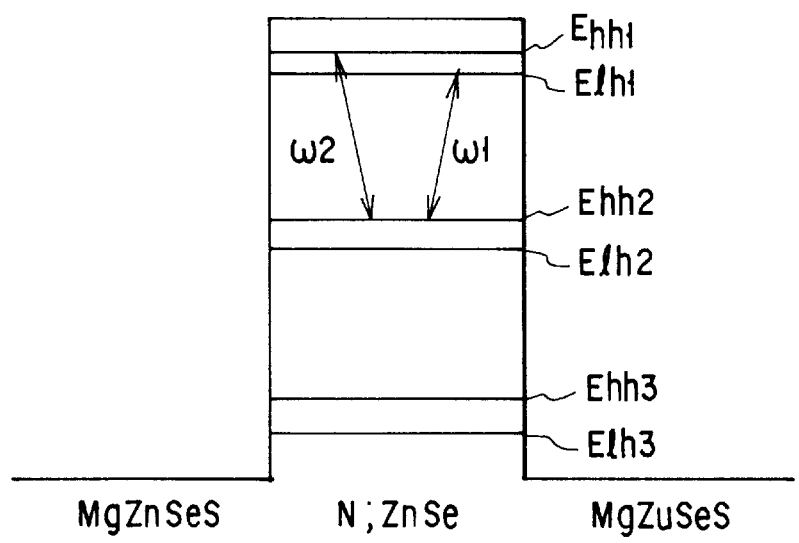
FIG. 63 is a diagram showing quantum well level of the ZnSe/MgZnSeS superlattice used as the EIT layer in the light modulating element in the seventeenth embodiment.

Three energy levels are levels in the ZnSe layer, and as shown in FIG. 63, the highest level 1 is $E_{hh1}$ level, middle level 2 is $E_{1h1}$, and lowest level 3 is $E_{hh2}$ level.

Accordingly, in the embodiment, concerning the three levels, the light was excited in V type between levels $E_{1h1}$ and $E_{hh2}$. The light energy $\omega_1$ of the gate light was selected to correspond to $E_{hh2} \rightarrow E_{1h1}$ transition between level 2 and level 3, and the light energy $\omega_2$ of the signal light was selected to correspond to $E_{hh2} \rightarrow E_{hh1}$ transition between level 1 and level 3.

The light energy $\omega_1$ and $\omega_2$ were adjusted so that $\omega_2-\omega_2$ may coincide with the central value $\omega_{12}$ of energy between level 1 and level 2. The intensity of the gate light was 1 W and the intensity of the signal light entering the EIT layer was 1 mW.

In thus constituted light modulating element, the transmission light intensity of signal light was investigated in the presence or absence of gate light.

As a result, in the absence of gate light, the signal light was absorbed in the EIT layer, and the output intensity of the signal light decreased to about 11% of the input strength of the signal light.

On the other hand, in the presence of the gate light, the output intensity of the signal light is about 51% of the input intensity of the signal light, and, as compared with the case in the absence of the gate light, it was confirmed that the signal light was more likely to pass.

FIG. 64 shows the results of investigation of absorption spectrum from level 3 to level 1 while varying the light energy $\omega_2$ (frequency) of the signal light, in a fixed state of the light energy $\omega_1$ (frequency) of the gate light. The frequency of gate light $\omega_1$ was about 1115.6902 cm$^{-1}$.

It was known from FIG. 64 that the absorption of light of $\omega_2$ decreased significantly in vicinity of the light energy at $\omega_2-\omega_1$ coinciding with the central value $\omega_{12}$ of the energy between levels 1 and 1. It is hence understood that this phenomenon is derived from the EIT.

Eighteenth Embodiment

This is a more specific example of the light modulating element shown in FIG. 48. That is, the EIT layer is composed of Si/NiSi$_2$ quantum well, and semiconductor laser is used as the light source of gate light 53 and light source of signal light 51. The intensity of the signal light 51 emitted from the EIT layer is measured by the MCP.

FIG. 65 shows a sectional view of the Si/NiSi$_2$ quantum well used in this embodiment.

The Si/NiSi$_2$ quantum well is formed on a silicon substrate, the thickness of the Si/NiSi$_2$ layer as the quantum well layer is 5 nm, and the thickness of the Si layer as quantum barrier layer is 95 nm.

In this embodiment, by forming a thick quantum barrier layer, electronic coupling between quantum wells is suppressed, and formation of sub-band leading to unclear energy level is suppressed. Incidentally, by doping of B as impurities in the Si layer, holes were implanted in NiSi$_2$ layer.

Figure 66:
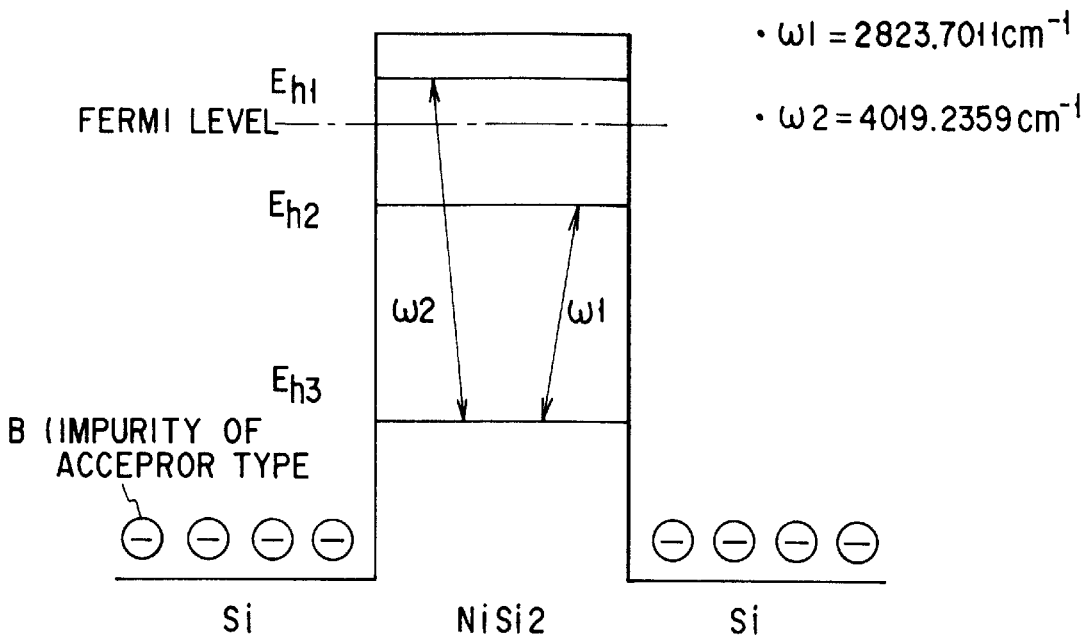
FIG. 66 is a diagram showing energy level of $Si/NiSi_2$ as the EIT layer in the light modulating element in the eighteenth embodiment.

Three energy levels are levels in the NiSi$_2$ layer, and as shown in FIG. 66, the highest level 1 is $E_{h1}$ level, middle level 2 is $E_{h2}$, and lowest level 3 is $E_{h3}$ level.

As shown in FIG. 66, the $E_{h1}$ level is higher in energy than the Fermi level of NiSi$_2$ layer, and the $E_{h2}$ level and $E_{h3}$ level are levels of lower energy than the Fermi level of NiSi$_2$ layer.

Accordingly, in this light modulating element, concerning the three levels, the light was excited in V type between levels $E_{h1}$ and $E_{h3}$, and between levels $E_{h2}$ and $E_{h3}$. The light energy $\omega_1$ of the gate light was selected to correspond to $E_{h3} \to E_{h2}$ transition between level 2 and level 3, and the light energy $\omega_2$ of the signal light was selected to correspond to $E_{h3} \to E_{h1}$ transition between level 1 and level 3.

The light energy $\omega_2$ and $\omega_2$ were adjusted so that $\omega_2 - \omega_1$ may coincide with the central value $\omega_{12}$ of energy between level 1 and level 2. The intensity of the gate light was 1 W and the intensity of the signal light entering the EIT layer was 1 mW.

In thus constituted light modulating element, the transmission light intensity of signal light was investigated in the presence or absence of gate light.

As a result, in the absence of gate light, the signal light was absorbed in the EIT layer, and the output intensity of the signal light was about 12% of the input strength of the signal light, and decreased to a low value.

On the other hand, in the presence of the gate light, the output intensity of the signal light is about 54% of the input intensity of the signal light, and, as compared with the case in the absence of the gate light, it was confirmed that the signal light was more likely to pass.

Figure 67:
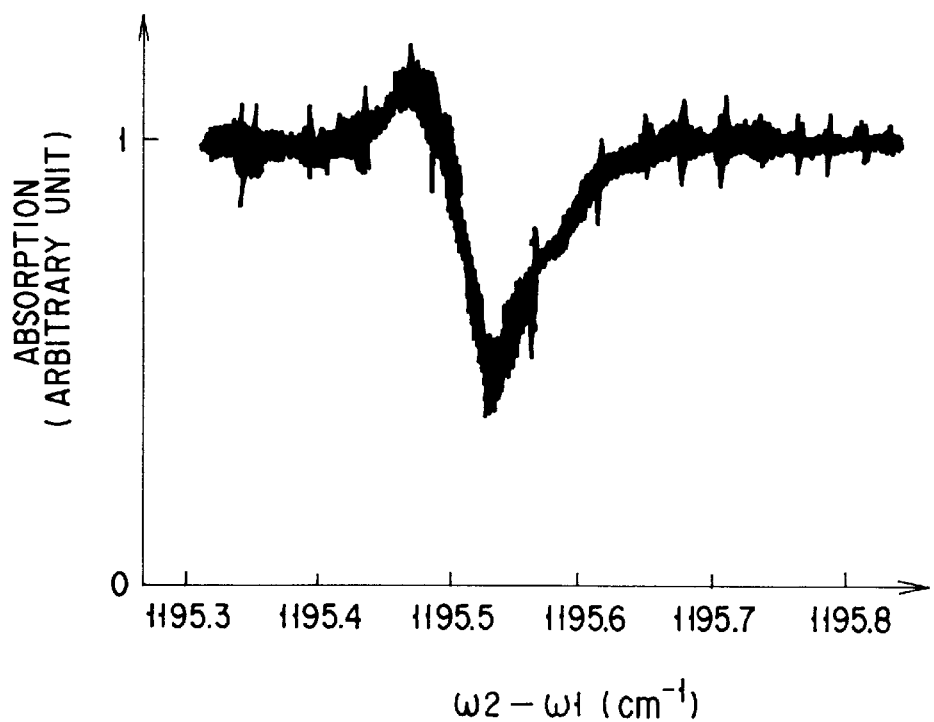
FIG. 67 is a diagram showing results of investigation of absorption spectrum from level 3 to level 1, while varying the light energy of single light, in a fixed state of light energy of gate light in the light modulating element in the eighteenth embodiment.

FIG. 67 shows the results of investigation of absorption spectrum from level 3 to level 1 while varying the light energy $\omega_2$ of the signal light, in a fixed state of the light energy $\omega_1$ (frequency) of the gate light. The frequency of gate light $\omega_1$ was about 2823.7011 cm$^{-1}$.

It was known from FIG. 67 that the absorption of light of $\omega_2$ decreased significantly in vicinity of the light energy at $\omega_2 - \omega_1$ coinciding with the central value $\omega_{12}$ of the energy between levels 1 and 2. It is hence understood that this phenomenon is derived from the EIT.

Nineteenth Embodiment

In this embodiment, in the light modulating element shown in FIG. 18, the EIT layer 11 was composed of YVO$_4$ dispersing 1 mol % of Ce$^{3+}$ as impurity, the gate light source was second harmonic of semiconductor laser, the input signal light $S_{in}$ was second harmonic of pigment laser, and photodiode 14 for measuring the intensity of the signal light emitted from the EIT layer 11 was Si photodiode.

Figure 68:
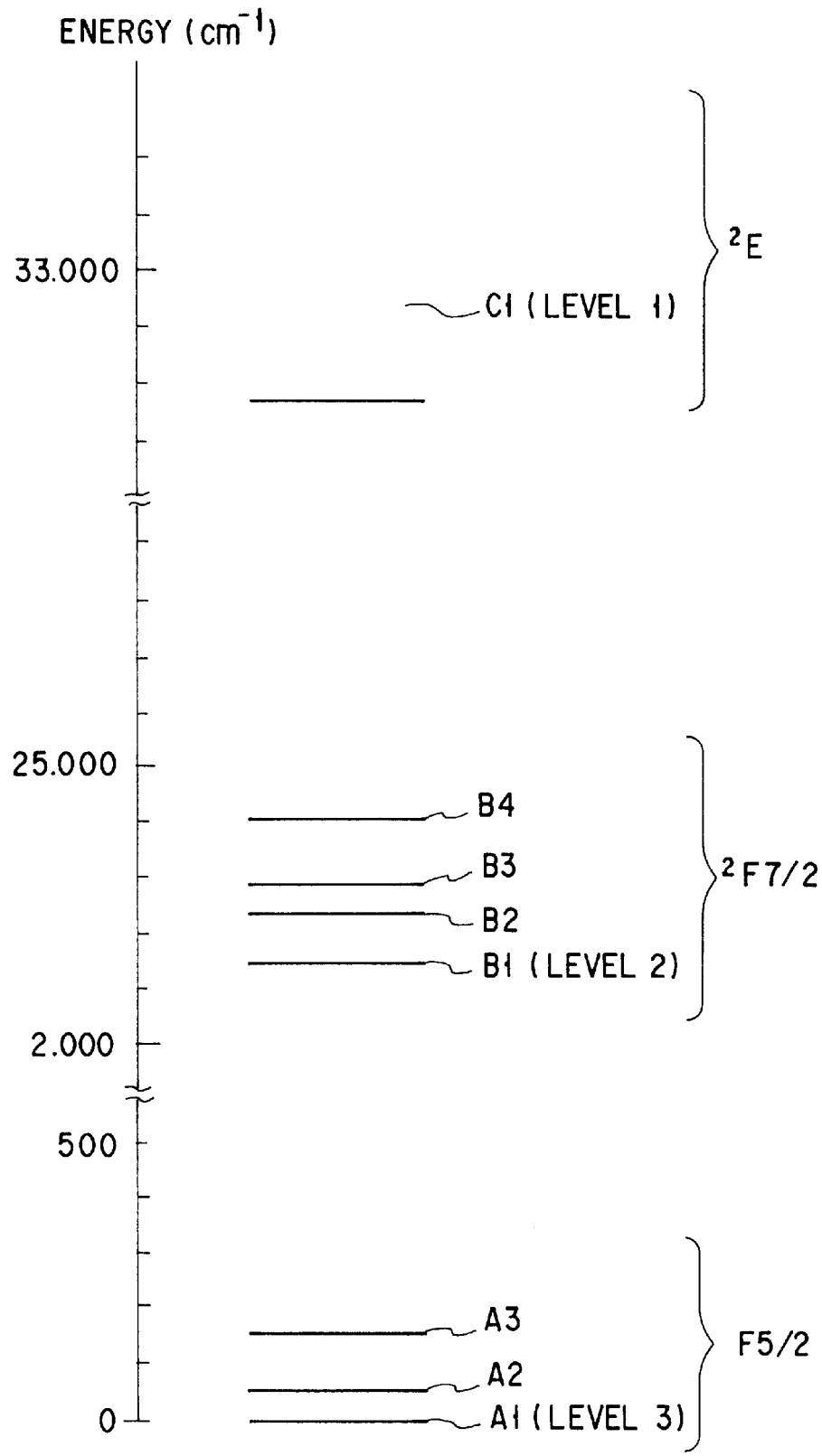
FIG. 68 is a diagram showing energy level of the EIT layer of LWI laser in a nineteenth embodiment of the invention.

Three energy levels were selected from impurity levels of Ce$^{3+}$ in YVO$_4$, that is, as shown in FIG. 68, the highest level 1 was C1 level split by the crystal field in $^2E$ level of electron configuration (d), the middle level 2 was B1 level split by the crystal field in $^2F_{7/2}$ level of electron configuration (f), and the lowest level 3 was A1 level split by the crystal field in $2_{F5/2}$ level of electron configuration (f) in the basal state.

The symmetry of each level was $\Gamma_6$ in $^2E$(c1) level, $\Gamma_7$ in $^2F_{7/2}$(b1) level, and $\Gamma_7$ in $2_{F5/2}$(A1) level. Accordingly, the $^2F_{7/2}$(B1)$\to^2$E(C1) transition between level 1 and level 2 and the $2_{F5/2}$(A1)$\to^2$E(C1) transition between levels 1 and 3 were both composed of $\Gamma_7 \to \Gamma_6$ transition, and the $2_{F5/2}$(A1)$\to^2$F$_{7/2}$(B1) transition between levels 2 and 3 were composed of $\Gamma_7 \to \Gamma_7$ transition. From the selectivity of optical transition concerning electric dipole transition, the transition between level 1 and level 2 and between level 1 and level 3 is allowable, and the transition between level 2 and level 3 is forbidden.

Accordingly, in this light modulating element, concerning the three levels, the light was excited in Λ type between levels $2_{F5/2}$(A1) and $^2$E(C1), and between levels $^2F_{7/2}$(B1) and $^2$E(C1). The light energy $\omega_1$ of the gate light was selected to correspond to $^2F_{7/2}$(B1)$\to^2$E(C1) transition between level 1 and level 2, and the light energy $\omega_2$ of the signal light was selected to correspond to $2_{F5/2}$(A1)$\to^2$E (C1) transition between level 1 and level 3.

The light energy $\omega_1$ and $\omega_2$ were adjusted so that $\omega_2 - \omega_1$ may coincide with the central value (2195 cm$^{-1}$) of energy between level 2 and level 3. The intensity of the gate light was 0.1 W and the intensity of the signal light entering the EIT layer was 1 mW.

In thus constituted light modulating element, the transmission light intensity of signal light was investigated in the presence or absence of gate light. First, in the absence of gate light, the signal light was absorbed in the EIT layer, and the output intensity of the signal light decreased to about 2% of the input. Then, in the presence of the gate light, the output intensity was about 81% of the input, and, as compared with the case in the absence of the gate light, it was confirmed that the signal light was more likely to pass.

Besides, as level 2, instead of $2_{F7/2}$(B1) level of electron configuration (f), using $^2F_{7/2}$(B4) level of same electron configuration (f) but with symmetry of $\Gamma_6$, and accordingly changing the light energy $\omega_1$ of the gate light to the one corresponding to $^2F_{7/2}$(B4)$\to^2$E(C1) transition between level 1 and level 2, using the light modulating element in the same constitution in other aspects, the transmission light intensity of signal light was investigated in the presence and absence of gate light. Incidentally, $\omega_2 - \omega_1$ was adjusted to 2428 cm$^{-1}$.

First, in the absence of gate light, the output intensity of the signal light similarly decreased to about 2% of the input. Then, in the presence of the gate light, the output intensity was about 24% of the input, and, as compared with the case in the absence of the gate light, it was confirmed that the signal light was more likely to pass.

Hence, when inducing the EIT by Λ type excitation, using the level characterized by electron configuration (d) as level 1, and using the levels characterized by electron configuration (f) as level 2 and level 3, it is known that a greater EIT signal is obtained by selecting level 2 and level 3 of same level symmetry.

COMPARATIVE EXAMPLE 9

The level 1 was changed to level C2 (symmetry $\Gamma_7$) split by the crystal field in $^2$E level of electron configuration (d), level 2 was changed to $^2$E(1) level of same electron configuration (d), and accordingly the light energy $\omega_1$ of the gate light was changed to the one corresponding to $^2$E(C1)$\to^2$E(C2) transition between level 1 and level 2, and also the light energy $\omega_2$ of the signal light was changed to the one corresponding to $^2F_{5/2}$(A1)$\to^2$E(C2) transition between level 1 and level 3, and the transmission light intensity of the signal light was investigated in the presence and absence of gate light.

As a result, in the absence of gate light, the output intensity of the signal light decreased to about 1% of the input.

On the other hand, in the presence of gate light, too, the output intensity of the signal light was about 1% of the input intensity of the signal light, and it was a low value same as in the case of absence of gate light.

Accordingly, in this comparative example, it was known that the signal light hardly passed whether gate light was present or absent. Hence, when inducting the EIT by Λ type exciting by mixing levels characterized by electron configuration (d) and electron configuration (f), it is known extremely important to use the level of electron configuration (d) for level 1 only, and use the level of electron configuration (f) for level 2 and level 3.

Twentieth Embodiment

In this embodiment, in the light modulating element shown in FIG. 18, the EIT layer 11 was composed of $YPO_4$ dispersing 1 mol % of $Ce^{3+}$ as impurity, the gate light source was second harmonic of semiconductor laser, the signal light source was second harmonic of pigment laser, and photodiode 14 was Si photodiode.

Figure 69:
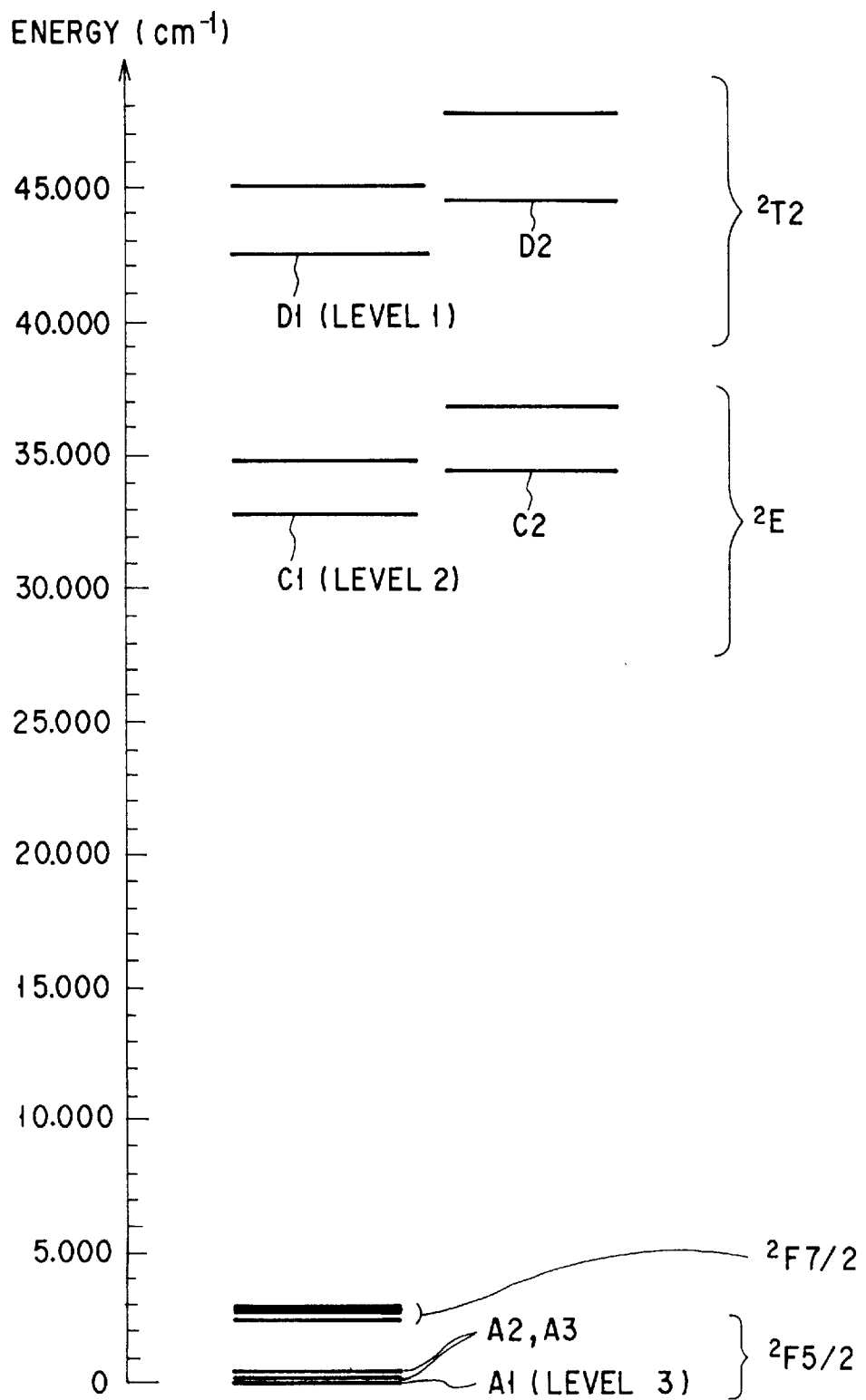
FIG. 69 is a diagram showing energy level of $Ce^{3+}$ impurity in $Ce^{3+}$; $YPO_4$ used as the EIT layer in a light modulating element in a twentieth embodiment of the invention.

Three energy levels were selected from impurity levels of $Ce^{3+}$ in $YPO_4$, that is, as shown in FIG. 69, the highest level 1 was D1 level split by the crystal field in $^2T_2$ level of electron configuration (d), the middle level 2 was C1 level split by the crystal field in $^2E$ level of electron configuration (d), and the lowest level 3 was A1 level split by the crystal field in $^2F_{5/2}$ level of electron configuration (f) in the basal state. The symmetry of each level was $\Gamma_6$ in $^2T_2(D1)$ level, $\Gamma_6$ also in $^2E(C1)$ level, and $\Gamma_7$ in $^2F_{5/2}(A1)$ level.

Accordingly, the $^2E(C1) \rightarrow ^2T_2(D1)$ transition between level 1 and level 2 was composed of $\Gamma_6 \rightarrow \Gamma_6$ transition, and the $^2F_{5/2}(A1) \rightarrow ^2T_2(D1)$ transition between levels 1 and 3 and the $^2F_{5/2}(A1) \rightarrow ^2E(C1)$ transition between levels 2 and 3 were composed of $\Gamma_7 \rightarrow \Gamma_6$ transition. From the selection rule of optical transition concerning electric dipole transition, the transition between level 1 and level 2 is forbidden, and the transition between level 1 and level 3 and between level 2 and level 3 are allowable.

Accordingly, in this light modulating element, concerning the three levels, the light was excited in V type between levels $^2F_{5/2}(A1)$ and $^2T_2(D1)$, and between levels $^2F_{5/2}(A1)$ and $^2E(C1)$. The light energy $\omega_1$ of the gate light was selected to correspond to $^2F_{5/2}(A1) \rightarrow ^2E(C1)$ transition between level 2 and level 3, and the light energy $\omega_2$ of the signal light was selected to correspond to $^2F_{5/2}(A1) \rightarrow ^2T_2(D1)$ transition between level 1 and level 3.

The light energy $\omega_1$ and $\omega_2$ were adjusted so that $\omega_2 - \omega_1$ may coincide with the central value (9590 cm$^{-1}$) of energy between level 1 and level 2. The intensity of the gate light was 0.1 W and the intensity of the signal light entering the EIT layer was 1 mW.

In thus constituted light modulating element, the transmission light intensity of signal light was investigated in the presence or absence of gate light.

As a result, in the absence of gate light, the signal light was absorbed in the EIT layer, and the output intensity of the signal light was about 3% of the input intensity, and decreased to a low value.

On the other hand, in the presence of the gate light, the output intensity was about 64% of the input intensity, and, as compared with the case in the absence of the gate light, it was confirmed that the signal light was more likely to pass.

Besides, as level 2, instead of $^2E(C1)$ level of electron configuration (d), using $^2E(C2)$ level of same electron configuration (d) but with symmetry of $\Gamma_7$, and accordingly changing the light energy $\omega_1$ of the gate light to the one corresponding to $^2F_{5/2}(A1) \rightarrow ^2E(C2)$ transition between level 2 and level 3, using the light modulating element in the same constitution in other aspects, the transmission light intensity of signal light was investigated in the presence and absence of gate light. Incidentally, $\omega_2 - \omega_1$ was adjusted to 7836 cm$^{-1}$.

As a result, in the absence of gate light, the output intensity of the signal light was about 3% of the input intensity, and decreased to a low value.

On the other hand, in the presence of the gate light, the output intensity was about 18% of the input intensity, and, as compared with the case in the absence of the gate light, it was confirmed that the signal light was more likely to pass.

Hence, when inducing the EIT by V type excitation, using the levels characterized by electron configuration (d) as level 1 and level 2, and using the level characterized by electron configuration (f) as level 3, it is known that a greater EIT signal is obtained by selecting level 1 and level 2 of same level symmetry.

COMPARATIVE EXAMPLE 10

The level 2 was changed to level B1 split by the crystal field in $^2F_{7/2}$ level of electron configuration (f), and accordingly the light energy $\omega_1$ of the gate light was changed to the one corresponding to $^2F_{5/2}(A1) \rightarrow ^2F_{7/2}(B1)$ transition between level 2 and level 3, and the transmission light intensity of the signal light was investigated in the presence and absence of gate light.

As a result, in the absence of gate light, the output intensity of the signal light was about 3% of the input intensity of signal light, and decreased to a low value.

On the other hand, in the presence of gate light, too, the output intensity of the signal light was about 3% of the input intensity of the signal light, and decreased to a low value.

Accordingly, in this comparative example, it was known that the signal light hardly passed whether gate light was present or absent. Hence, when inducting the EIT by V type exciting by mixing levels characterized by electron configuration (d) and electron configuration (f), it is known extremely important to use the level of electron configuration (d) for level 1 and level 2, and use the level of electron configuration (f) for level 3 only.

Twenty-first Embodiment

FIG. 70 schematically shows an LWI laser capable of oscillating laser without inversion distribution, by using control light virtually exciting between level 1 and level 2 among $\Lambda$ type three levels, and the pump light for pumping electrons from level 3 to level 2 through level 4, in the optical element of the embodiment.

This LWI laser is composed of an EIT layer 62 enclosed by two confronting mirrors 61, semiconductor laser 63 for control for putting the control light into the EIT layer 62, semiconductor laser 64 for putting the pump light into the EIT layer 62, Si photodiode 65 for detecting the LWI laser light emitted outward from the mirror 61, and a filter 66 installed between the photodiode 65 and mirrors 61 for cutting off the light of the same wavelength as the laser beam of the semiconductor laser 63.

FIG. 71 schematically shows energy levels in the EIT layer 62, two incident light beams, and generated LWI laser beam.

As the material used for the EIT layer 62, a system satisfying the conditions of $\sigma_{23} \leq \sigma_{12}$ and $\sigma_{23} \leq \sigma_{13}$ should be selected, concerning the standard deviation $\sigma_{23}$ of energy between level 2 and level 3, with respect to standard deviations $\sigma_{12}$ and $\sigma_{13}$ of energy between level 1 and level 2, and between level 1 and level 3.

The control light virtually excites between level 1 and level 2, and the pump light pumps electrons to level 2 through level 4. In this constitution, the LWI laser beam is generated according to the control light. This light energy $\omega_2$ is expressed as $\omega_2 = \omega_1 + \omega_{23}$, where $\omega_1$ is the light energy of control light and $\omega_{23}$ is the central value of the energy difference of level 2 and level 3.

The LWI laser of the embodiment is more specifically described below.

The EIT layer 62 is composed of $LiYF_4$ dispersing 1 mol % of $Pr^{3+}$ as impurities, the control light is second harmonic of semiconductor laser, and pump light is fundamental wave of semiconductor laser.

Figure 72:
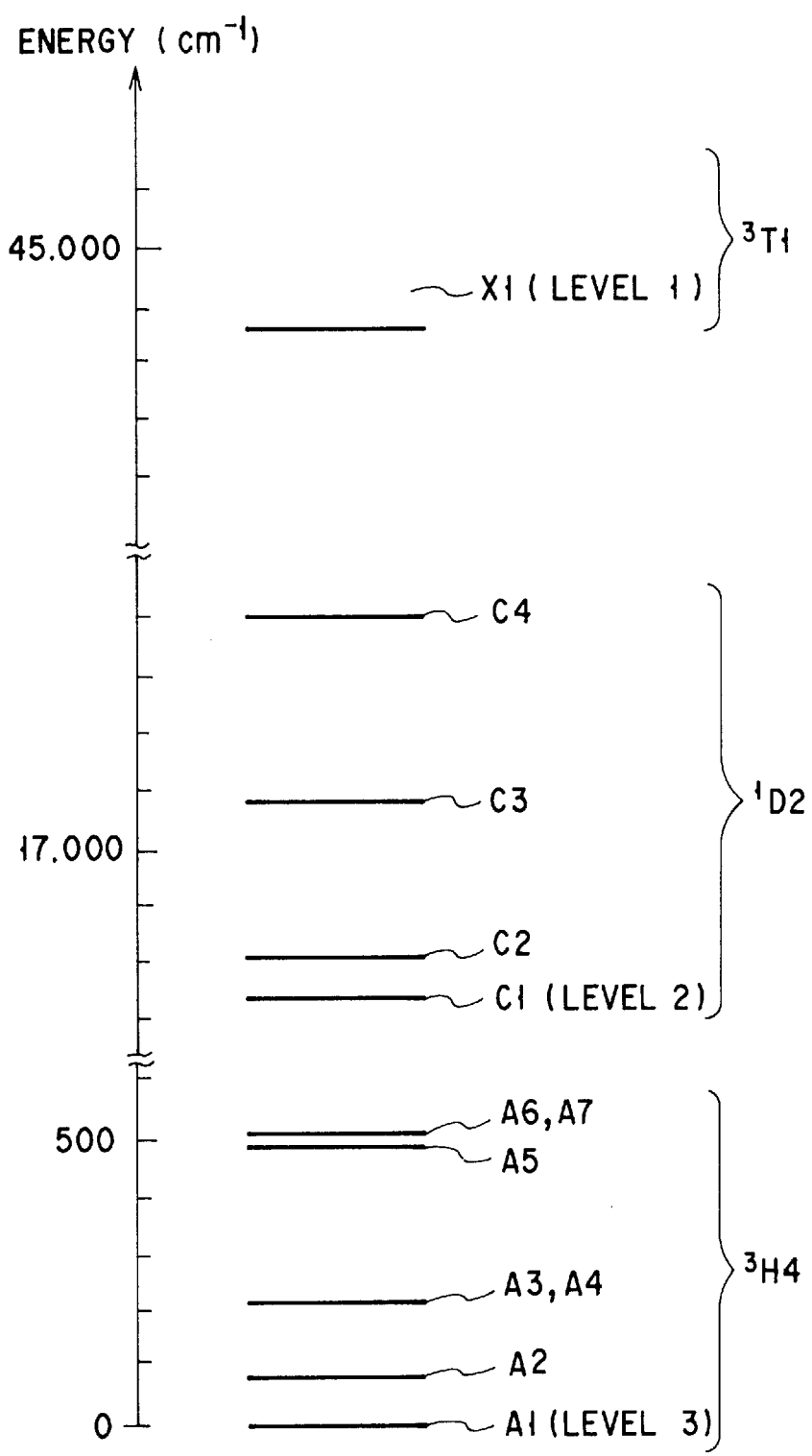
FIG. 72 is a diagram showing energy level of the EIT layer of the LWI laser in the twenty-first embodiment of the invention.

Three energy levels were selected from impurity levels of $Pr^{3+}$ in $LiYF_4$ that is, as shown in FIG. 72, the highest level 1 was X1 level split by the crystal field in $^3T_1$ level of electron configuration (f) (d), the middle level 2 was C1 level split by the crystal field in $^1D_2$ level of electron configuration $(f)^2$, and the lowest level 3 was A1 level split by the crystal field in $^3H_4$ level of electron configuration $(f)^2$ in the basal state.

The symmetry of each level was $\Gamma_3$ in $^3T$ (x1) level, $\Gamma_2$ in $^1D_2$(C1) level, and $\Gamma_2$ also in $^3H_4$(A1) level.

Accordingly, the $^1D_2$(C1)→$^3T_1$ transition between level 1 and level 2 was composed of $\Gamma_2$→$\Gamma_3$ transition, the $^3H_4$(A1)→$^3T_1$(X1) transition between levels 1 and 3 was composed also of $\Gamma_2$→$\Gamma_3$ transition, and the $^3H_4$(A1)→$^1D_2$(C1) transition between levels 2 and 3 was composed of $\Gamma_2$→$\Gamma_2$ transition. From the selection rule of optical transition concerning electric dipole transition, the transitions between level 1 and level 2 and between level 1 and level 3 are allowable, and the transition between level 2 and level 3 is forbidden.

Incidentally, as level 4 for pumping electrons from level 3 to level 2, $^1D_2$(C2) level was selected (symmetry $\Gamma_1$). Since the symmetry of $^1D_2$(C2) level is $\Gamma_1$, according to the selection rule, the $^3H_4$(A1)→$^1D_2$(C2) transition is allowable. The electrons excited at $^1D_2$(C2) level are quickly alleviated to $^1D_2$(C1) level by photon vibration. Therefore, by exciting electrons at $^1D_2$(C2) level, it is possible to form population at $^1D_2$(C1) level.

In this LWI laser, therefore, while exciting light between levels $^1D_2$(C1) and $^3T_1$(X1), electrons were pumped from $^3H_4$(A1) level to $^1D_2$(C1) level. The light energy $\omega_1$ of control light pumped electrons to $^1D_2$(C1) level between level 1 and level 2.

The light energy $\omega_1$ of control light was selected to correspond to $^1D_2$(C1)→$^3T_1$(X1) transition between level 1 and level 2, and the light energy of pump light was selected to correspond to $^3H_4$(A1)→$^1D_2$(C2) transition between levels 4 and 3. The intensity of the control light was 0.1 W, and the intensity of the pump light was 1 W.

Furthermore, by combining the invention with various properties of solid such as magnetism, electric conductivity, and ferrodielectric property, functional elements of new type different from the conventional electron elements can be realized.

On the basis of the above element composition, presence or absence of laser oscillation from $^3T_1$(X1) level to $^3H_4$(A1) level was investigated. As a result, as shown in FIG. 73, near 44840 $cm^{-1}$ corresponding to $^3T_1$(X1)→$^3H_4$(A1) transition, continuous oscillation of laser beam was observed. At this time, the intensity was about 0.05 mW.

Furthermore, from the optical elements of the invention, using the material satisfying the conditions of $\sigma_{12} \leq \sigma_{13}$ and $\sigma_{12} \leq \sigma_{23}$, concerning the standard deviation $\sigma_{12}$ of energy between level 1 and level 2, with respect to standard deviations $\sigma_{13}$ and $\sigma_{23}$ of energy between level 1 and level 3, and between level 2 and level 3, for example, the material system in the twentieth embodiment, as the EIT layer, similar laser beam oscillation was observed by using the control light for exciting between level 2 and level 3 among V type three levels, and the pump light for pumping electrons from level 2 or level 3 to level 1.

The invention is not limited to the illustrated embodiments alone. For example, in the foregoing embodiments, the light modulating elements and short wavelength LWI laser were explained as optical elements, but it can be applied in various optical elements on the basis of quantum coherence.

Moreover, by combining the invention with various properties of solid such as magnetism, electric conductivity, and ferrodielectric property, functional elements of new type different from the conventional electron elements can be realized.

In the embodiments, electric field and magnetic field were mentioned as examples of outer field, but pressure may be used also as other outer field. Still more, these outer fields may be combined.

As the materials, aside from those mentioned in the embodiments, various materials mentioned in the clause of the means may be used. For example, it is possible to semiconductor materials of IV group, III–V group, II–VI group, and others, composed of at least one element selected from the group consisting of C, Si, Ge, B, Al, Ca, In, N, P, As, Sb, Zn, Cd, S, Se, Te, and others, having quantum structure such as superlattice, quantum wire, and quantum box. Besides, various modifications are possible within the technical scope of the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical element comprising:
    a solid containing a number N of impurities characterized by at least three energy levels including a first energy level higher than a second energy level and a third energy level lower than said second energy level, and
    an excitation device configured to irradiate said solid with a first light having a wavelength corresponding to the energy difference between said first level and second level, and a second light having a wavelength corresponding to the energy difference between said first level and third level,
    wherein $\sigma_{23} \leq \sigma_{12}$ and $\sigma_{23} \leq \sigma_{13}$ are satisfied, where $\sigma_{23}$, $\sigma_{12}$ and $\sigma_{13}$ respectively are a standard deviation of an energy difference between the second level and the third level, between the first level and the second level, and between the first level and the third level,
    wherein the energy difference between said first level and second level, the energy difference between said first level and third level, and the energy difference between said second level and third level are respectively $\omega_{12}(i)$, $\omega_{13}(i)$, and $\omega_{23}(i)$ (i=1 to N),
    wherein mean values of said energy differences $\omega_{12}(i)$, $\omega_{13}(i)$, and $\omega_{23}(i)$ are respectively $<\omega_{12}>$, $<\omega_{13}>$, and $<\omega_{23}>$, and
    wherein standard deviations of said energy differences $\omega_{12}(i)$, $\omega_{13}(i)$, and $\omega_{23}(i)$ are respectively $\sigma_{12} = \{(1/N)\Sigma(\omega_{12}(i)-<\omega_{12}>)^2\}^{1/2}$, $\sigma_{13} = \{(1/N)\Sigma(\omega_{13}(i)-<\omega_{13}>)^2\}^{1/2}$, and $\sigma_{23} = \{(1/N)\Sigma(\omega_{23}(i)-<\omega_{23}>)^2\}^{1/2}$.

2. An optical element according to claim 1, wherein said impurities are transition metal ions having n (n=2 to 6)

electrons on d electron orbit, and both said second level and said third level are arranged so that n electrons are put on $t_{2g}$ orbit when said transition metal ions are disposed in a cubic symmetrical crystal field created by ligands.

3. An optical element according to claim 1, wherein said impurities are transition metal ions having n (n=7, 8) electrons on d electron orbit, and both said second level and said third level are arranged so that six electrons are put on $t_{2g}$ orbit and n−6 electrons on $e_g$ orbit when said transition metal ions are disposed in a cubic symmetrical crystal field created by ligands.

4. An optical element according to claim 1, wherein said impurities are rare earth ions having n (n=1 to 13) electrons on f electron orbit, said first level has n−1 electrons accommodated in f electron orbit, and one electron accommodated in d electron orbit, and said second level and third level have both n electrons accommodated in f electron orbit.

5. An optical element comprising:
   a solid containing a number N of impurities characterized by at least three energy levels including a first energy level higher than a second energy level and a third energy level lower than said second energy level, and
   an excitation device configured to irradiate said solid with a first light having a wavelength corresponding to the energy difference between said second level and third level, and a second light having a wavelength corresponding to the energy difference between said first level and third level,
   wherein $\sigma_{12} \leq \sigma_{13}$ and $\sigma_{12} \leq \sigma_{23}$ are satisfied, where $\sigma_{23}$, $\sigma_{12}$ and $\sigma_{13}$ respectively are a standard deviation of an energy difference between the second level and the third level, between the first level and the second level, and between the first level and the third level,
   wherein the energy difference between said first level and second level, the energy difference between said first level and third level, and the energy difference between said second level and third level are respectively $\omega_{12}(i)$, $\omega_{13}(i)$, and $\omega_{23}(i)$ (i=1 to N),
   wherein mean values of said energy differences $\omega_{12}(i)$, $\omega_{13}(i)$, and $\omega_{23}(i)$ are respectively $<\omega_{12}>$, $<\omega_{13}>$, and $<\omega_{23}>$, and
   wherein standard deviations of said energy differences $\omega_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$.

6. An optical element according to claim 5, wherein said impurities are transition metal ions having n (n=2 to 6) electrons on d electron orbit, and both said second level and said third level are arranged so that n−1 electrons are put on $t_{2g}$ orbit, and one electron on $e_g$ orbit when said transition metal ions are disposed in a cubic symmetrical crystal field created by ligands.

7. An optical element according to claim 5, wherein said impurities are transition metal ions having n (n=7, 8) electrons on d electron orbit, and both said first level and said second level are arranged so that five electrons are put on $t_{2g}$ orbit and n−5 electrons on $e_g$ orbit when said transition metal ions are disposed in a cubic symmetrical crystal field created by ligands.

8. An optical element according to claim 5, wherein said impurities are rare earth ions having n (n=1 to 13) electrons on f electron orbit, said first level and second level have n−1 electrons accommodated in f electron orbit, and one electron accommodated in d electron orbit, and said third level has n electrons accommodated in f electron orbit.

9. An optical element comprising:
   a solid containing a number N of impurities characterized by at least three energy levels including a first energy level higher than a second energy level and a third energy level lower than said second energy level, and
   an excitation device configured to irradiate said solid with a first light having a wavelength corresponding to the energy difference between said first level and second level, and a second light having a wavelength corresponding to the energy difference between said second level and third level,
   wherein $\sigma_{13} \leq \sigma_{12}$ and $\sigma_{13} \leq \sigma_{23}$ are satisfied, where $\sigma_{23}$, $\sigma_{12}$ and $\sigma_{13}$ respectively are a standard deviation of an energy difference between the second level and the third level, between the first level and the second level and between the first level and the third level,
   wherein the energy difference between said first level and second level, the energy difference between said first level and third level, and the energy difference between said second level and third level are respectively $\omega_{12}(i)$, $\omega_{13}(i)$, and $\omega_{23}(i)$ (i=1 to N),
   wherein mean values of said energy differences $\omega_{12}(i)$, $\omega_{13}(i)$, and $\omega_{23}(i)$ are respectively $<\omega_{12}>$, $<\omega_{13}>$, and $<\omega_{23}>$, and
   wherein standard deviations of said energy differences $\omega_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$.

10. An optical element according to claim 9, wherein said impurities are transition metal ions having n (n=2 to 6) electrons on d electron orbit, and both said first level and said third level are arranged so that n electrons are put on $t_{2g}$ orbit when said transition metal ions are disposed in a cubic symmetrical crystal field created by ligands.

11. An optical element according to claim 9, wherein said impurities are transition metal ions having n (n=7, 8) electrons on d electron orbit, and both said first level and said third level are arranged so that six electrons are put on $t_{2g}$ orbit and n−6 electrons on $e_g$ orbit when said transition metal ions are disposed in a cubic symmetrical crystal field created by ligands.

12. An optical element comprising:
   a solid laser medium containing a number N of impurities characterized by at least three energy levels including a first energy level higher than a second energy level and a third energy level lower than said second energy level,
   a light irradiating device configured to irradiate said solid laser medium with a first light having a wavelength corresponding to the energy difference between said first level and second level, and
   a pumping device configured to excite electrons from said third level into at least one of said first level and second level,
   wherein $\sigma_{23} \leq \sigma_{12}$ and $\sigma_{23} \leq \sigma_{13}$ are satisfied, where $\sigma_{23}$, $\sigma_{12}$ and $\sigma_{13}$ respectively are a standard deviation of an energy difference between the second level and the third level, between the first level and the second level, and between the first level and the third level,
   wherein the energy difference between said first level and second level, the energy difference between said first level and third level, and the energy difference between said second level and third level are respectively $\omega_{12}(i)$, $\omega_{13}(i)$, and $\omega_{23}(i)$ (i=1 to N), wherein mean values of said energy differences $\omega_{12}(i)$, $\omega_{13}(i)$, and $\omega_{23}(i)$ are respectively $<\omega_{12}>$, $<\omega_{13}>$, and $<\omega_{23}>$, wherein standard deviations of said energy differences $\omega_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$, and wherein a second light lases as a result of stimulated emission due to electrons transiting between said first level and said third level.

13. An optical element according to claim 12, wherein said impurities contained in said solid last medium are rare earth ions having n (n=1 to 13) electrons on f electron orbit, said first level has n−1 electrons accommodated in f electron orbit, and one electron accommodated in d electron orbit, and said second level and third level have n electrons accommodated in f electron orbit, and moreover said pumping means possesses means for irradiating said solid with at least one of electron beam and electromagnetic wave.

14. An optical element comprising:

a solid laser medium containing a number N of impurities characterized by at least three energy levels including a first energy level higher than a second energy level and a third energy level lower than said second energy level, a light irradiating device configured to irradiate said solid laser medium with a first light having a wavelength corresponding to the energy difference between said second level and third level, and a pumping device configured to excite electrons into said first level from at least one of said second level and third level, wherein $\sigma_{12} \leq \sigma_{13}$ and $\sigma_{12} \leq \sigma_{23}$ are satisfied, where $\sigma_{23}$, $\sigma_{12}$ and $\sigma_{13}$ respectively are a standard deviation of an energy difference between the second level and the third level, between the first level and the second level, and between the first level and the third level, wherein the energy difference between said first level and second level, the energy difference between said first level and third level, and the energy difference between said second level and third level are respectively $\omega_{12}(i)$, $\omega_{13}(i)$, and $\omega_{23}(i)$ (i=1 to N), wherein mean values of said energy differences $\omega_{12}(i)$, $\omega_{13}(i)$, and $\omega_{23}(i)$ are respectively $<\omega_{12}>$, $<\omega_{13}>$, and $<\omega_{23}>$, wherein standard deviations of said energy differences $\omega_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$, and wherein a second light lases as a result of stimulated emission due to electrons transiting between said first level and said third level.

15. An optical element according to claim 14, wherein said impurities contained in said solid are rare earth ions having n (n=1 to 13) electrons on f electron orbit, said first level and second level have n−1 electrons accommodated in f electron orbit, and one electron accommodated in d electron orbit, and said third level has n electrons accommodated in f electron orbit, and moreover said pumping means possesses means for irradiating said solid with at least one of electron beam and electromagnetic wave.

16. An optical element comprising:

a solid having N quantum structures selected from the group consisting of a quantum well, a quantum wire and a quantum box, characterized by at least three energy levels including a first level higher than a second energy level and a third energy level lower than said second level, and an excitation device configured to irradiate said solid with a first light having a wavelength corresponding to the energy difference between said first level and second level, and a second light having a wavelength corresponding to the energy difference between said first level and third level, wherein $\sigma_{23} \leq \sigma_{12}$ and $\sigma_{23} \leq \sigma_{13}$ are satisfied, where $\sigma_{23}$, $\sigma_{12}$ and $\sigma_{13}$ respectively are a standard deviation of an energy difference between the second level and the third level, between the first level and the second level, and between the first level and the third level, wherein the energy difference between said first level and second level, the energy difference between said first level and third level, and the energy difference between said second level and third level are respectively $\omega_{12}(i)$, $\omega_{13}(i)$, and $\omega_{23}(i)$ (i=1 to N), wherein mean values of said energy differences $\omega_{12}(i)$, $\omega_{13}(i)$, and $\omega_{23}(i)$ are respectively $<\omega_{12}>$, $<\omega_{13}>$, and $<\omega_{23}>$, and wherein standard deviations of said energy differences $\omega_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$.

17. An optical element comprising:

a solid having N quantum structures selected from the group consisting of a quantum well, a quantum wire and a quantum box, characterized by at least three energy levels including a first level located above a Fermi level of said quantum structure higher than a second energy level located above said Fermi level and a third energy level located below said Fermi level lower than said second level, and an excitation device configured to irradiate said solid with a first light having a wavelength corresponding to the energy difference between said first level and second level, and a second light having a wavelength corresponding to the energy difference between said first level and third level, wherein $\sigma_{23} \leq \sigma_{12}$ and $\sigma_{23} \leq \sigma_{13}$ are satisfied, where $\sigma_{23}$, $\sigma_{12}$ and $\sigma_{13}$ respectively are a standard deviation of an energy difference between the second level and the third level, between the first level and the second level, and between the first level and the third level, wherein the energy difference between said first level and second level, the energy difference between said first level and third level, and the energy difference between said second level and third level are respectively $\omega_{12}(i)$, $\omega_{13}(i)$, and $\omega_{23}(i)$ (i=1 to N), wherein mean values of said energy differences $\omega_{12}(i)$, $\omega_{13}(i)$, and $\omega_{23}(i)$ are respectively $<\omega_{12}>$, $<\omega_{13}>$, and $<\omega_{23}>$, and wherein standard deviations of said energy differences $\omega_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$.

18. An optical element comprising:

a solid having N quantum structures selected from the group consisting of quantum well, a quantum wire and a quantum box, characterized by at least three energy levels including a first level higher than a second energy level and a third energy level lower than said second level, and an excitation device configured to irradiate said solid with a first light having a wavelength corresponding to the energy difference between said second level and third level, and a second light having a wavelength corresponding to the energy difference between said first level and third level, wherein $\sigma_{12} \leq \sigma_{13}$ and $\sigma_{12} \leq \sigma_{23}$ are satisfied, where $\sigma_{23}$, $\sigma_{12}$ and $\sigma_{13}$ respectively are a standard deviation of an energy difference between the second level and the third level, between the first level and the second level, and between the first level and the third level, wherein the energy difference between said first level and second level, the energy difference between said first level and third level, and the energy difference between said second level and third level are respectively $\omega_{12}(i)$, $\omega_{13}(i)$, and $\omega_{23}(i)$ ($i=1$ to N), wherein mean values of said energy differences $\omega_{12}(i)$, $\omega_{13}(i)$, and $\omega_{23}(i)$ are respectively $<\omega_{12}>$, $<\omega_{13}>$, and $<\omega_{23}>$, and wherein standard deviations of said energy differences $\omega_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$.

19. An optical element comprising:

a solid having N quantum structures selected from the group consisting of a quantum well, a quantum wire and a quantum box, characterized by at least three energy levels including a first level located above a Fermi level of said quantum structure higher than a second energy level located below said Fermi level and a third energy level located below said Fermi level lower than said second level, and an excitation device configured to irradiate said solid with a first light having a wavelength corresponding to the energy difference between said second level and third level, and a second light having a wavelength corresponding to the energy difference between said first level and third level, wherein $\sigma_{12} \leq \sigma_{13}$ and $\sigma_{12} \leq \sigma_{23}$ are satisfied, where $\sigma_{23}$, $\sigma_{12}$ and $\sigma_{13}$ respectively are a standard deviation of an energy difference between the second level and the third level, between the first level and the second level, and between the first level and the third level, wherein the energy difference between said first level and second level, the energy difference between said first level and third level, and the energy difference between said second level and third level are respectively $\omega_{12}(i)$, $\omega_{13}(i)$, and $\omega_{23}(i)$ ($i=1$ to N), wherein mean values of said energy differences $\omega_2(i)$, $\omega_{13}(i)$, and $\omega_{23}(i)$ are respectively $<\omega_{12}>$, $<\omega_{13}>$, and $<\omega_{23}>$, and wherein standard deviations of said energy differences $\omega_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$.

20. An optical element comprising:

a solid containing impurities characterized by at least three energy levels including a first energy level higher than a second energy level and a third energy level degenerate with said second energy level in the absence of an outer field, a field source configured to provide said solid with at least one outer field from the group consisting of an electric field, a magnetic field, and a pressure field, thereby lifting the degeneracy between said second and third levels so that said second level is higher than said third level, and an excitation device configured to irradiate said solid with a first light having a wavelength corresponding to the energy difference between said first level and second level, and a second light having a wavelength corresponding to the energy difference between said first level and third level said solid.

21. An optical element according to claim 20, wherein the energy of said first light is $\omega_1$, the energy of said second light is $\omega_2$, an energy difference of said second level and third level is $\omega_{23}$, and the magnitude of said outer field is set so as to satisfy the condition of $\omega_{23}=\omega_2-\omega_1$.

22. An optical element comprising:

a solid having quantum structures selected from the group consisting of a quantum well, a quantum wire and a quantum box, characterized by at least three energy levels including a first level higher than a second energy level and a third energy level degenerate with said second level in the absence of an outer field, a field source configured to provide said solid with at least one outer field from the group consisting of an electric field, a magnetic field, and a pressure field, thereby lifting the degeneracy between said second and third levels so that said second level is higher than said third level, and an excitation device configured to irradiate said solid with a first light having a wavelength corresponding to the energy difference between said first level and second level, and a second light having a wavelength corresponding to the energy difference between said first level and third level said solid.

23. An optical element according to claim 22, wherein the energy of said first light is $\omega_1$, the energy of said second light is $\omega_2$, an energy difference of said second level and third level is $\omega_{23}$, and the magnitude of said outer field is set so as to satisfy the condition of $\omega_{23}=\omega_2-\omega_1$.

24. An optical element comprising:

a solid containing impurities, characterized by at least three energy levels including a first energy level degenerate with a second energy level in the absence of an outer field and a third energy level being lower than said second energy level, a field source configured to provide said solid with at least one outer field from the group consisting of an electric field, a magnetic field, and a pressure field, thereby lifting the degeneracy between said first and second levels so that said first level is higher than said second level, and an excitation device configured to irradiate said solid with a first light having a wavelength corresponding to the energy difference between said second level and third level, and a second light having a wavelength corresponding to the energy difference between said first level and third level.

25. An optical element according to claim 24, wherein the energy of said first light is $\omega_1$, the energy of said second light is $\omega_2$, an energy difference of said first level and second level is $\omega_{12}$, and the magnitude of said outer field is set so as to satisfy the condition of $\omega_{12}=\omega_2-\omega_1$.

26. An optical element comprising:

a solid having quantum structures selected from the group consisting of a quantum well, a quantum wire and a quantum box, characterized by at least three energy levels including a first level degenerate with a second energy level in the absence of an outer field and a third energy level lower than said second level, a field source configured to provide said solid with at least one outer field from the group consisting of an electric field, a magnetic field, and a pressure field, thereby lifting the degeneracy between said first and second levels so that said first level is higher than said second level, and an excitation device configured to irradiate said solid with a first light having a wavelength corresponding to the energy difference between said second level and third level, and a second light having a wavelength corresponding to the energy difference between said first level and third level.

27. An optical element according to claim 26, wherein the energy of said first light is $\omega_1$, the energy of said second light is $\omega_2$, an energy difference of said first level and second level is $\omega_{12}$, and the magnitude of said outer field is set so as to satisfy the condition of $\omega_{12}=\omega_2-\omega_1$.

28. An optical element as recited in claim 16 wherein said first energy level is located in a conductive band of said quantum structure, and said second and third energy levels are located in a valance band of said quantum structure.

29. An optical element as recited in claim 16 wherein said first, second and third energy levels are located in a conductive band of said quantum structure.

30. An optical element as recited in claim 18 wherein said first and second energy levels are located in a conductive band of said quantum structure, and said third energy level is located in a valance band of said quantum structure.

31. An optical element as recited in claim 18 wherein said first, second and third energy levels are located in a conductive band of said quantum structure.

32. A method of electromagnetically inducing, transparency in a solid containing a number N of sites characterized by at least three energy levels including a first energy level higher than a second energy level and a third energy level lower than said second level, wherein the energy difference between said first level and second level, the energy difference between said first level and third level, and the energy difference between said second level and third level are respectively $\omega_{12}(i)$, $\omega_{13}(i)$, and $\omega_{23}(i)(i=1$ to N), wherein mean values of said energy differences $\omega_{12}(i)$, $\omega_{13}(i)$, and $\omega_{23}(i)$ are respectively $<\omega_{12}>$, $<\omega_{13}>$, and $<\omega_{23}>$, wherein standard deviations of said energy differences $\omega_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$, said method comprising:
selecting a solid in which $\sigma_{23} \leq \sigma_{12}$ and $\sigma_{23} \leq \sigma_{13}$ are satisfied, irradiating said solid with a first light having a wavelength corresponding to the energy difference between said first energy level and said second energy level; and irradiating said solid with a second light having a wavelength corresponding to the energy difference between said first energy level and said third energy level.

33. A method of electromagnetically inducing transparency in a solid containing a number N of sites characterized by at least three energy levels including a first energy level higher than a second energy level and a third energy level lower than said second level, wherein the energy difference between said first level and second level, the energy difference between said first level and third level, and the energy difference between said second level and third level are respectively $\omega_{12}(i)$, $\omega_{13}(i)$, and $\omega_{23}(i)(i=1$ to N), wherein mean values of said energy differences $\omega_{12}(i)$, $\omega_{13}(i)$, and $\omega_{23}(i)$ are respectively $<\omega_{12}>$, $<\omega_{13}>$, and $<\omega_{23}>$, wherein standard deviations of said energy differences $\omega_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{23}>]^2\}^{1/2}$, said method comprising:
selecting a solid in which $\sigma_{12} \leq \sigma_{13}$ and $\sigma_{12} \leq \sigma_{23}$ are satisfied, irradiating said solid with a first light having a wavelength corresponding to the energy difference between said second energy level and said third energy level; and irradiating said solid with a second light having a wavelength corresponding to the energy difference between said first energy level and said third energy level.

34. A method of electromagnetically inducing transparency in a solid containing a number N of sites characterized by at least three energy levels including a first energy level higher than a second energy level and a third energy level lower than said second level, wherein the energy difference between said first level and second level, the energy difference between said first level and third level, and the energy difference between said second level and third level are respectively $\omega_{12}(i)$, $\omega_{13}(i)$, and $\omega_{23}(i)(i=1$ to N), wherein mean values of said energy differences $\omega_{12}(i)$, $\omega_{13}(i)$, and $\omega_{23}(i)$ are respectively $<107_{12}>$, $<\omega_{13}>$, and $<\omega_{23}>$, wherein standard deviations of said energy differences $107_{12}(i)$, $\omega_{13}(i)$, and $\omega_{23}(i)$ are respectively $\sigma_{12}=\{(1/N)\Sigma[\omega_{12}(i)-<\omega_{12}>]^2\}^{1/2}$, $\sigma_{13}=\{(1/N)\Sigma[\omega_{13}(i)-<\omega_{13}>]^2\}^{1/2}$, and $\sigma_{23}=\{(1/N)\Sigma[\omega_{23}(i)-<\omega_{13}>]^2\}^{1/2}$, said method comprising:
selecting a solid in which $\sigma_{13} \leq \sigma_{12}$ and $\sigma_{13} \leq \sigma_{23}$ are satisfied, irradiating said solid with a first light having a wavelength corresponding to the energy difference between said first energy level and said second energy level; and irradiating said solid with a second light having a wavelength corresponding to the energy difference between said second energy level and said third energy level.

\* \* \* \* \*